(12) United States Patent
Suzuki et al.

(10) Patent No.: US 9,116,622 B2
(45) Date of Patent: Aug. 25, 2015

(54) STORAGE SYSTEM HAVING NONVOLATILE SEMICONDUCTOR STORAGE DEVICE WITH NONVOLATILE SEMICONDUCTOR MEMORY

(75) Inventors: Susumu Suzuki, Ooiso (JP); Shigeo Homma, Odawara (JP); Yuko Matsui, Odawara (JP)

(73) Assignee: Hitachi, Ltd., Tokyo (JP)

( * ) Notice: Subject to any disclaimer, the term of this patent is extended or adjusted under 35 U.S.C. 154(b) by 9 days.

(21) Appl. No.: 13/499,260

(22) PCT Filed: Mar. 13, 2012

(86) PCT No.: PCT/JP2012/001743
§ 371 (c)(1),
(2), (4) Date: Mar. 29, 2012

(87) PCT Pub. No.: WO2013/136362
PCT Pub. Date: Sep. 19, 2013

(65) Prior Publication Data
US 2013/0246722 A1    Sep. 19, 2013

(51) Int. Cl.
*G06F 12/02* (2006.01)
*G06F 3/06* (2006.01)

(52) U.S. Cl.
CPC ............ *G06F 3/0608* (2013.01); *G06F 3/0616* (2013.01); *G06F 3/0652* (2013.01); *G06F 3/0688* (2013.01)

(58) Field of Classification Search
USPC ................................................. 711/162, 103
See application file for complete search history.

(56) References Cited

U.S. PATENT DOCUMENTS

2006/0174075 A1*  8/2006  Sutoh ............................. 711/162
2007/0271413 A1   11/2007  Fujibayashi et al.
2008/0005508 A1   1/2008  Asano et al.
(Continued)

FOREIGN PATENT DOCUMENTS

EP         1 927 920 A2    6/2008
JP         2007-115232 A   5/2007
(Continued)

OTHER PUBLICATIONS

International Search Report and Written Opinion mailed Aug. 14, 2012 in corresponding PCT Application No. PCT/JP2012/001743; 11 pages.
Japan Patent Office Notification of Reasons for Refusal on application 2014-528734 dispatced Mar. 10, 2015; pp. 1-3 (with partial English translation).
(Continued)

*Primary Examiner* — Aimee Li
*Assistant Examiner* — Trang Ta
(74) *Attorney, Agent, or Firm* — Foley & Lardner LLP

(57) ABSTRACT

A storage system coupled to a host has a nonvolatile semiconductor storage device that includes a nonvolatile semiconductor memory configured by a plurality of pages, and a storage controller coupled to the semiconductor storage device. In the case where data stored in the plurality of pages become unnecessary, with this plurality of pages being the basis of a region of a logical volume based on the nonvolatile semiconductor storage device, the storage controller transmits, to the nonvolatile semiconductor storage device, an unnecessary reduction request for reducing the number of pages that are the basis of the region having the unnecessary data stored therein. On the basis of the unnecessary reduction request, the nonvolatile semiconductor storage device invalidates the plurality of pages that are the basis of the region having the unnecessary data stored therein.

15 Claims, 45 Drawing Sheets

(56) References Cited

U.S. PATENT DOCUMENTS

| | | |
|---|---|---|
| 2008/0126712 A1* | 5/2008 | Mizushima ............... 711/141 |
| 2009/0287878 A1 | 11/2009 | Yamamoto et al. |
| 2010/0131727 A1* | 5/2010 | Eguchi et al. ............ 711/162 |
| 2011/0167215 A1* | 7/2011 | Eguchi et al. ............ 711/114 |
| 2011/0231594 A1* | 9/2011 | Sugimoto et al. ......... 711/103 |
| 2012/0159058 A1* | 6/2012 | Yonezawa et al. ........ 711/104 |
| 2012/0272123 A1* | 10/2012 | Yeh ........................... 714/773 |

FOREIGN PATENT DOCUMENTS

| | | |
|---|---|---|
| JP | 2008-015623 A | 1/2008 |
| JP | 2008-159013 A | 7/2008 |
| JP | 2009-301525 A | 12/2009 |
| WO | WO 2011/024239 A1 | 3/2011 |

* cited by examiner

FIG. 24

| Logical address | Validity | FM number | Block number | Page number | Data pattern |
|---|---|---|---|---|---|
| 0x1000 0000 | Valid | 0 | 0 | 0 | NULL |
| 0x1000 2000 | Valid | 0 | 1 | 1 | NULL |
| 0x1000 4000 | invalid | NULL | NULL | NULL | NULL |
| 0x1000 6000 | Valid | 0 | 1 | 0 | NULL |
| 0x1000 8000 | Valid | 0 | 2 | 1 | NULL |
| ... | ... | ... | ... | ... | ... |
| 0x2000 0000 | Valid | 1 | 0 | 0 | 0 |
| 0x2000 2000 | Valid | 1 | 0 | 0 | 0 |
| 0x2000 4000 | Valid | 1 | 0 | 0 | 0 |
| 0x2000 6000 | invalid | NULL | NULL | NULL | NULL |
| ... | ... | ... | ... | ... | ... |

FIG. 26

| Pool number | Device type | Logical VOL number | Logical address | Physical VOL number | Physical address | State |
|---|---|---|---|---|---|---|
| 0 | SSD | 0x1000 | 0x10000000 | 0 | NULL | Valid |
| 0 | SSD | 0x1000 | 0x10002000 | 0 | NULL | Blank |
| 0 | SSD | 0x1000 | 0x10004000 | 0 | NULL | Blank |
| 0 | SSD | 0x1000 | 0x10006000 | 0 | NULL | Blank |
| ... | ... | ... | ... | ... | ... | ... |
| 0 | SAS | 0x2000 | 0x20000000 | 4 | 0x0000 | Valid |
| 0 | SAS | 0x2000 | 0x20002000 | 4 | 0x2000 | Blank |
| 0 | SAS | 0x2000 | 0x20004000 | 4 | 0x4000 | Blank |
| 0 | SAS | 0x2000 | 0x20006000 | 4 | 0x6000 | Valid |
| ... | ... | ... | ... | ... | ... | ... |

FIG. 27

| Virtual VOL number (352a) | Host logical address (352b) | State (352c) | Extent ID (352d) | Pool number (352e) | Logical VOL number (352f) | Logical address (352g) |
|---|---|---|---|---|---|---|
| 0x0000 | 0x00000000 | Allocated | 0 | 0 | 0x1000 | 0x10000000 |
| 0x0000 | 0x00002000 | Allocated | 0 | 0 | 0x1000 | 0x10002000 |
| 0x0000 | 0x00004000 | Unallocated | 0 | NULL | NULL | NULL |
| 0x0000 | 0x00006000 | Allocated | 0 | 0 | 0x1000 | 0x10006000 |
| 0x0000 | 0x00008000 | Allocated | 1 | 0 | 0x1000 | 0x10008000 |
| 0x0000 | 0x0000A000 | Unallocated | 1 | NULL | NULL | NULL |
| 0x0000 | 0x0000C000 | Unallocated | 1 | NULL | NULL | NULL |
| 0x0000 | 0x0000E000 | Unallocated | 1 | NULL | NULL | NULL |
| 0x0000 | 0x00010000 | Unallocated | 2 | NULL | NULL | NULL |
| ... | ... | ... | ... | ... | ... | ... |

FIG. 28

| Virtual VOL number | Host logical address | State | Extent ID | Pool number | Logical VOL number | Logical address |
|---|---|---|---|---|---|---|
| 0x0000 | 0x00000000 | Allocated | 0 | 0 | 0x1000 | 0x10000000 |
| 0x0000 | 0x00008000 | Allocated | 1 | 0 | 0x1000 | 0x10008000 |
| 0x0000 | 0x00010000 | Unallocated | 2 | NULL | NULL | NULL |
| . . . | . . . | . . . | . . . | . . . | . . . | . . . |

FIG. 29

| Virtual VOL number | Host logical address | Current device type | Access frequency |
|---|---|---|---|
| 0x0000 | 0x00000000 | SSD | Low |
| 0x0000 | 0x00002000 | SAS | High |
| 0x0000 | 0x00004000 | SATA | Medium |
| . . . | . . . | . . . | . . . |

| Snapshot VOL number | Host logical address | State | Pool number | Logical VOL number | Logical address |
|---|---|---|---|---|---|
| 0x1001 | 0x00000000 | Allocated | 0 | 0x1000 | 0x10000000 |
| 0x1001 | 0x00002000 | Allocated | 0 | 0x2000 | 0x20000000 |
| 0x1001 | 0x00004000 | Unallocated | NULL | NULL | NULL |
| . . . | . . . | . . . | . . . | . . . | . . . |

STORAGE SYSTEM HAVING NONVOLATILE SEMICONDUCTOR STORAGE DEVICE WITH NONVOLATILE SEMICONDUCTOR MEMORY

TECHNICAL FIELD

The present invention relates to a storage system that has a nonvolatile semiconductor storage device with a nonvolatile semiconductor memory.

BACKGROUND ART

A storage system generally provides a higher-level device (e.g., host) with a logical volume that is created based on a RAID (Redundant Array of Independent Disks) group configured by a plurality of storage devices. In recent years, a nonvolatile semiconductor storage device with a plurality of nonvolatile memory chips is employed as each of the storage devices, in addition to or in place of an HDD (Hard Disk Drive). For example, a flash memory device with a plurality of flash memory chips ("FM chips," hereinafter) is employed as the nonvolatile semiconductor storage device. The technology described in Patent Literature 1, for example, is known as a storage system having such a flash memory device.

CITATION LIST

Patent Literature

[PTL 1]
US Patent Application No. 2011/0231594 (Specification)

SUMMARY OF INVENTION

Technical Problem

In a flash memory device, for example, data (valid data) of a page associated with a logical address data to be refreshed or reclaimed. In other words, a process of reading the valid data from the page and then writing the valid data into other page is executed.

In some cases, the valid data becomes unnecessary in a higher-level device of the flash memory device. The flash memory device itself, however, cannot grasp such a case and continues to manage the unnecessary data as the valid data. In other words, although the valid data is no longer necessary, the data is managed as the data to be refreshed and reclaimed. This causes the unnecessary data to be written into a page, reducing the operating life of the flash memory device.

The problem described above applies to a storage system that has a nonvolatile semiconductor storage device other than the flash memory device.

Solution to Problem

A storage system coupled to a host has a nonvolatile semiconductor storage device that includes a nonvolatile semiconductor memory configured by a plurality of pages, and a storage controller coupled to this semiconductor storage device. When data stored in the plurality of pages are not necessary, the plurality of pages being the basis of regions of a logical volume based on the nonvolatile semiconductor storage device, the storage controller transmits, to the nonvolatile semiconductor storage device, an unnecessary reduction request for reducing the number of pages that are the basis of the regions in which the unnecessary data are stored. In response to this unnecessary reduction request, the nonvolatile semiconductor storage device invalidates the plurality of pages that are the basis of the regions in which the unnecessary data are stored.

BRIEF DESCRIPTION OF DRAWINGS

FIG. 24 shows an example of a logical-physical conversion table according to the embodiment.
FIG. 26 shows an example of a pool management table according to the embodiment.

FIG. 27 shows an example of a dynamic region allocation table according to the embodiment.

FIG. 28 shows an example of a dynamic extent region allocation table according to the embodiment.

FIG. 29 shows an example of an access frequency table according to the embodiment.

FIG. 31 shows an example of a snapshot data allocation table according to the embodiment.

DESCRIPTION OF EMBODIMENTS

Figure 1:
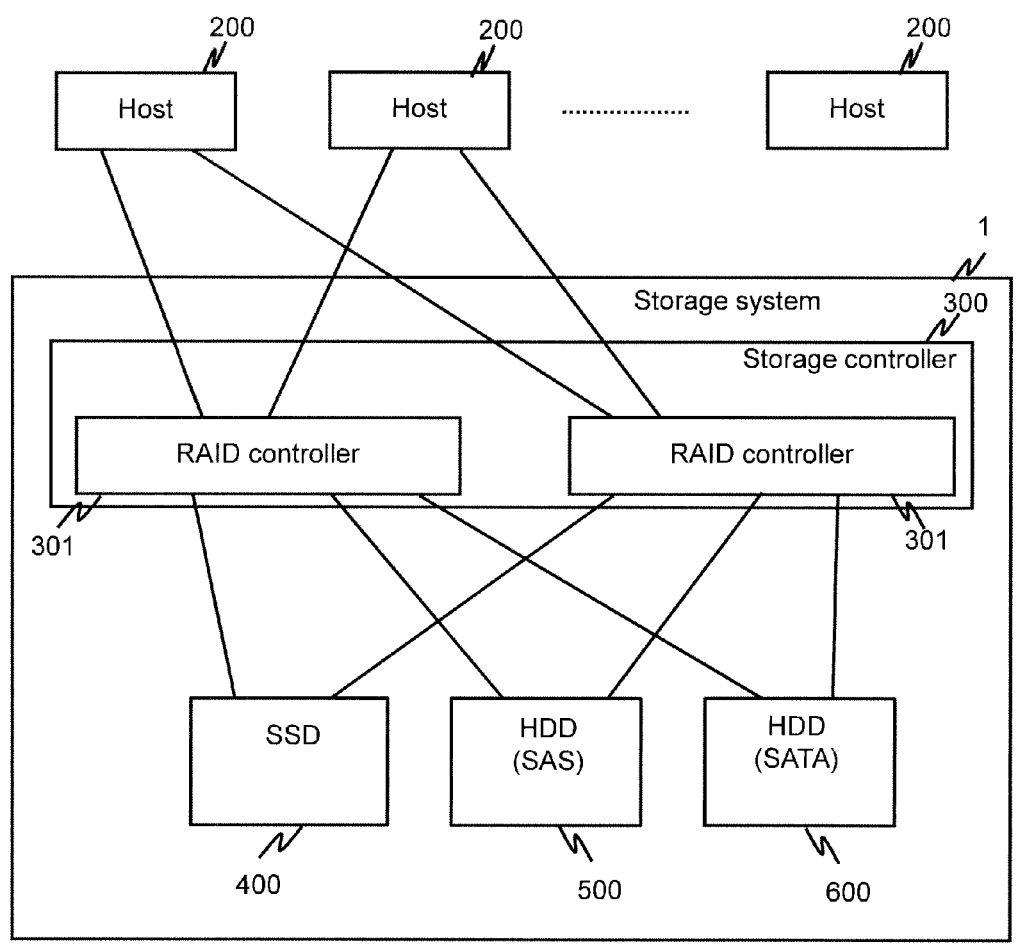
FIG. 1 shows a configuration example of a computer system according to an embodiment.

An embodiment of the present invention is now described hereinafter with reference to the drawings.

Identification information items that include numbers for specifying the elements (e.g., pages, blocks, flash memory chips (FM chips), switches (SW), pools, physical volumes, logical volumes, virtual volumes, etc.) are used in the following description, but information items without such numbers may be used as the identification information items.

When the elements of the same type are distinguished in the following description, a combination of an element name and an identification information item is often used in place of a combination of an element name and a reference numeral. For instance, a block with identification information (identification number) "0" is written as "block #0."

Moreover, in the following description, an interface device is often abbreviated as "I/F."

In the following description, a nonvolatile semiconductor memory is referred to as "flash memory" (FM). The flash memory is a flash memory, in which data are deleted per block and accessed per page—typically a NAND-type flash memory. The flash memory may also be other type of flash memory (e.g., a NOR-type flash memory) in place of a NAND-type flash memory. In addition, other type of nonvolatile semiconductor memory, such as a phase-change memory, may be used in place of the flash memory.

As described above, the nonvolatile semiconductor memory is a NAND-type flash memory in the following description. Thus, terms such as "page" and "block" are used. In the case where a certain logical region ("target logical region" in this paragraph) is a write destination, where a page is already allocated to the target logical region ("first page" in this paragraph), and where data is stored in the first page, a blank page ("second page" in this paragraph), in place of the first page, is allocated to the target logical region and data is written to the second page. The data written to the second page is the latest data for the target logical region, and the data stored in the first page becomes old data for the target logical region. In the following description, the latest data and the old data of each logical region are often referred to as "valid data" and "invalid data," respectively. In addition, a page storing the valid data therein and a page storing the invalid data therein are often referred to as "valid page" and "invalid page," respectively.

The term "host" means a higher-level device (e.g., a computer) of a storage system.

The term "virtual volume (virtual VOL)" means a virtual logical volume (logical VOL). The virtual VOL can be recognized by, for example, the host. The virtual VOL may be, for example, a volume based on Thin Provisioning or a snapshot VOL described hereinafter.

The term "logical volume (logical VOL)" means a volume that includes a storage region allocated to the virtual VOL, and may be based on a RAID group (a plurality of flash memory devices) of the storage system having the logical VOL, or may be based on a storage device of an external storage system coupled to the aforementioned storage system.

The term "pool" means a region having one logical VOL or having a collection of a plurality of logical VOLs.

The term "primary volume (primary VOL)" means an original logical VOL designated based on an I/O request from the host.

The term "snapshot volume (snapshot VOL)" means a virtual VOL that expresses an image of a snapshot of the primary VOL.

The term "physical volume (physical VOL)" means a physical storage device, such as an SSD (Solid State Device).

The term "logical address" means an address of a logical (or virtual) region (e.g., a logical region provided by the virtual VOL, logical VOL, or physical VOL).

The term "physical address" means an address of a physical region (e.g., a physical region that is allocated to the logical region provided by the physical VOL).

The term "extent" means a logical region allocated to the virtual VOL. The logical VOLs configuring the pool is divided into two or more extents. The extents are allocated from the pool to the virtual VOLs. The plurality of extents may be of the same size or different sizes. The size of each extent is typically greater than the size of data (unit size) according to a read request or a write request from the host.

Figure 45:
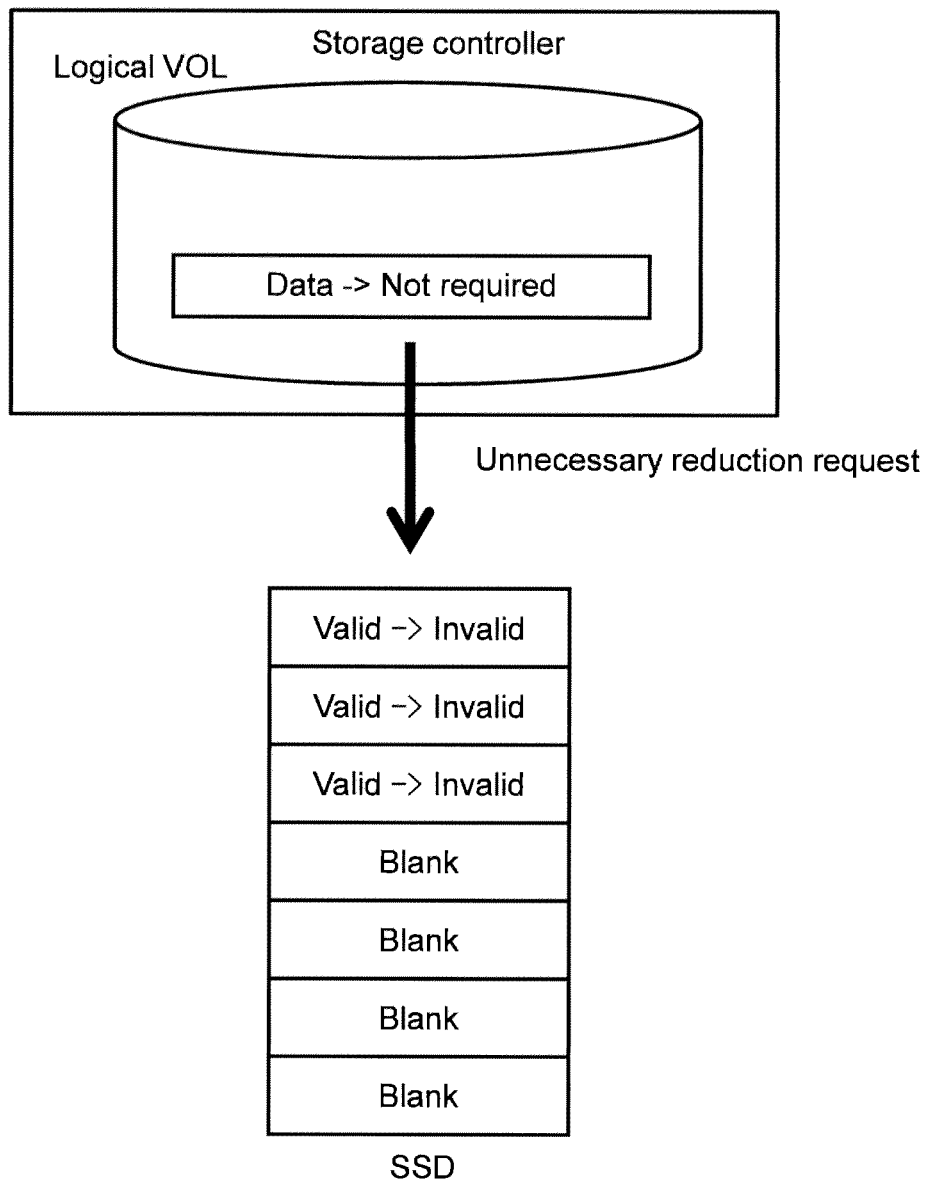
FIG. 45 shows an outline of the embodiment.

FIG. 45 shows an outline of the present embodiment.

A storage system has an SSD, a logical VOL based on the SSD, and a storage controller coupled to the SSD. Data stored in the logical VOL are stored in the SSD. An input/output size, which is a unit size of data input to and output from the logical VOL, is greater than the size of each of the pages configuring a flash memory of the SSD. For example, the input/output size is an integral multiple of (N times greater than (where N is an integer of 2 or more)) the page size. Specifically, the input/output size is three times greater than the page size.

Data inside a logical region of the logical VOL becomes unnecessary to a host of the storage system when a certain event occurs. Examples of the certain event include an event where the data is moved from the logical region to other logical region and an event where a virtual VOL, to which is allocated an extent having the data stored therein, is deleted.

Upon this certain event, the storage controller transmits an unnecessary reduction request to the SSD that is the basis of the logical region storing the data unnecessary to the host. The unnecessary reduction request is a request for reducing the number of pages that are the basis of the logical region storing the data unnecessary to the host. When the SSD receives the unnecessary reduction request, the SSD changes the state of at least one of the plurality of pages from "valid" to "invalid," the plurality of pages being the basis of the logical region storing the data unnecessary to the host.

The present embodiment is now described hereinafter in detail.

FIG. 1 shows a configuration example of a computer system according to the present embodiment.

The computer system has a storage system 1 and a host 200. There can be one or more of the storage systems 1 and the hosts 200. The storage system 1 and the host 200 are coupled to each other by a communication network (e.g., a SAN (Storage Area Network)). The storage system 1 is for storing data used by the host 200. The host 200 executes various processes to read the data from the storage system 1 or write data into the storage system 1.

The storage system 1 has a plurality of physical VOLs, and a storage controller 300 coupled to the plurality of physical VOLs.

The plurality of physical VOLs include a plurality of types of physical VOLs. There may be one or more of at least one type of physical VOL. Examples of the physical VOLs include an SSD 400, an HDD (Hard Disk Drive) device (SAS: Serial Attached SCSI) 500, and an HDD (SATA: Serial ATA) 600.

The storage controller 300 has a plurality of RAID (Redundant Array of Independent (or Inexpensive) Disks) controllers 301. Each of the RAID controllers 301 is coupled to the SSD 400, the HDD (SAS) 500, and the HDD (SATA) 600 via internal buses.

Note that each RAID controller 301 is merely an example of a higher-level device of the SSD 400, the HDD (SAS) 500, and the HDD (SATA) 600. The RAID controller 301 receives an I/O command from a higher-level device of the RAID controller 301 (e.g., the host 200), and controls access to the SSD 400, the HDD (SAS) 500, or the HDD (SATA) 600 in response to the I/O command. The RAID controller 301 may perform a process for managing the extents of the SSD 400, the HOD (SAS) 500 and the HDD (SATA) 600 as storage tiers (tiers) that are different from one another, and allocating the extent of any of the storage tiers to a logical region to which data is written. In other words, each tier is configured by two or more extents based on the physical VOLs of the same type. Although not shown, the storage system 1 may have a RAID group configured by a plurality of the SSDs 400, a RAID group configured by a plurality of the HDDs (SAS) 500, and a RAID group configured by a plurality of HDDs (SATA) 600.

Figure 2:
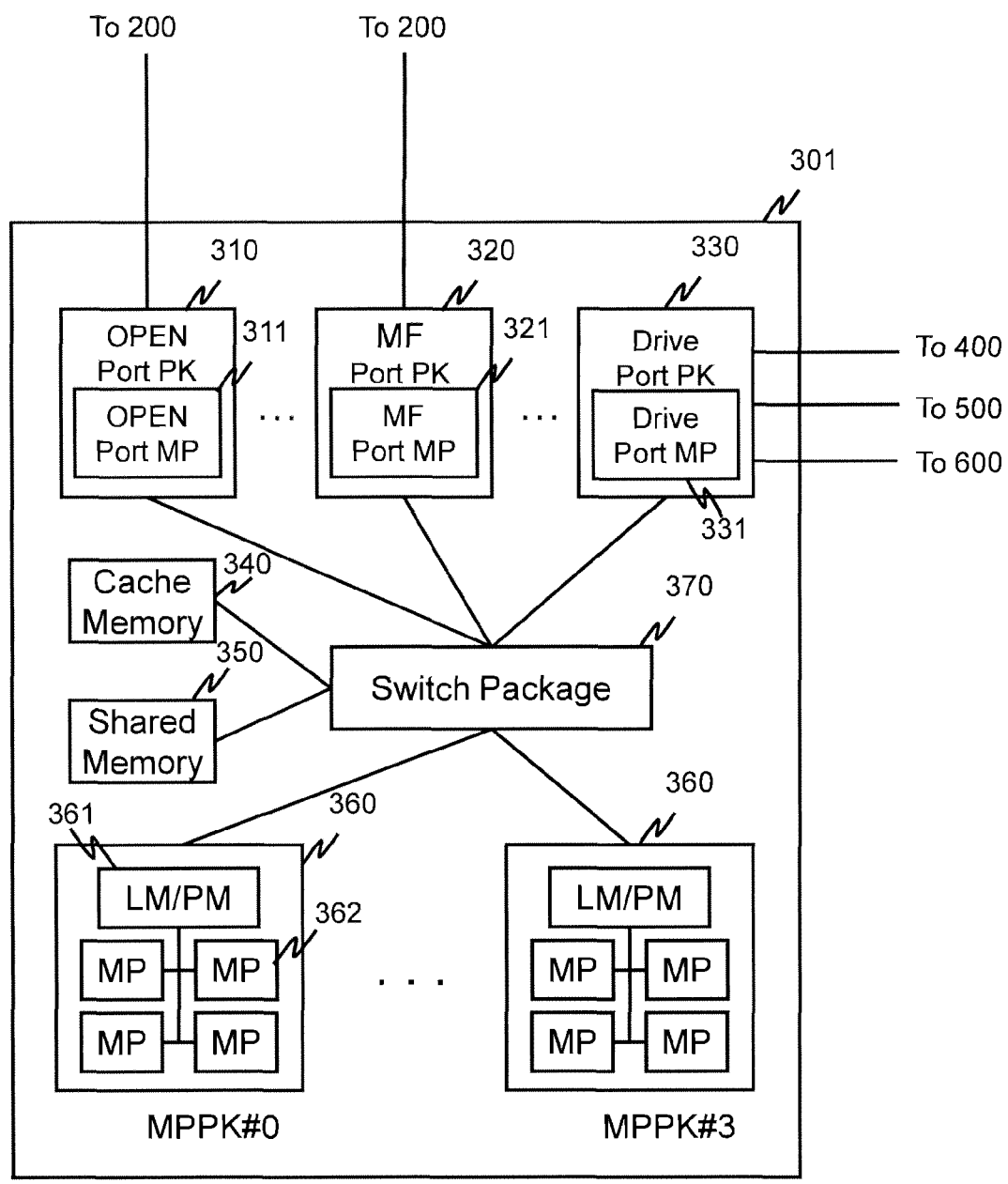
FIG. 2 shows a configuration example of a RAID controller according to the embodiment.

FIG. 2 shows a configuration of the RAID controller according to the embodiment.

The RAID controller 301 has an open port package 310, a mainframe package 320, a drive port package 330, a cache memory 340, a shared memory 350, one or more microprocessor packages (MPPK) 360, and a switch package 370. The open port package 310, the mainframe package 320, the drive port package 330, the cache memory 340, the shared memory 350, and the one or more microprocessor packages (MPPK) 360 are coupled to one another via the switch package 370.

The open port package 310 has an open package microprocessor (Open Port MP) 311, which is a port enabling the communication with the host 200 of an open system. The mainframe package 320 has a mainframe microprocessor (MF Port MP) 321, which is a port enabling the communication with the mainframe host 200. The drive port package 330 has a drive package port microprocessor (Drive Port MP) 331, which is a port enabling the exchange of data with the physical VOLs 400, 500, 600.

The cache memory 340 temporarily stores data to be read or written. The shared memory 350 stores various information items used by MP 362 of each MPPK 360. In the present embodiment, the shared memory 350 stores a pool management table (see FIG. 26), a dynamic region allocation table (see FIG. 27), a dynamic extent region allocation table (see FIG. 28), an access frequency table (see FIG. 29), a pair management table (see FIG. 30), a snapshot data allocation table (see FIG. 31), and the like. These tables are described hereinafter.

Each MPPK 360 has a local memory and program memory (LM/PM) 361, and one or more microprocessors (MP) 362. The LM/PM 361 is for storing data and programs used by the MP 362. The MP 362 executes the programs stored in the LM/PM 361 to execute various processes by using the data stored in the LM/PM 361 and/or the data stored in the shared memory 350.

Figure 3:
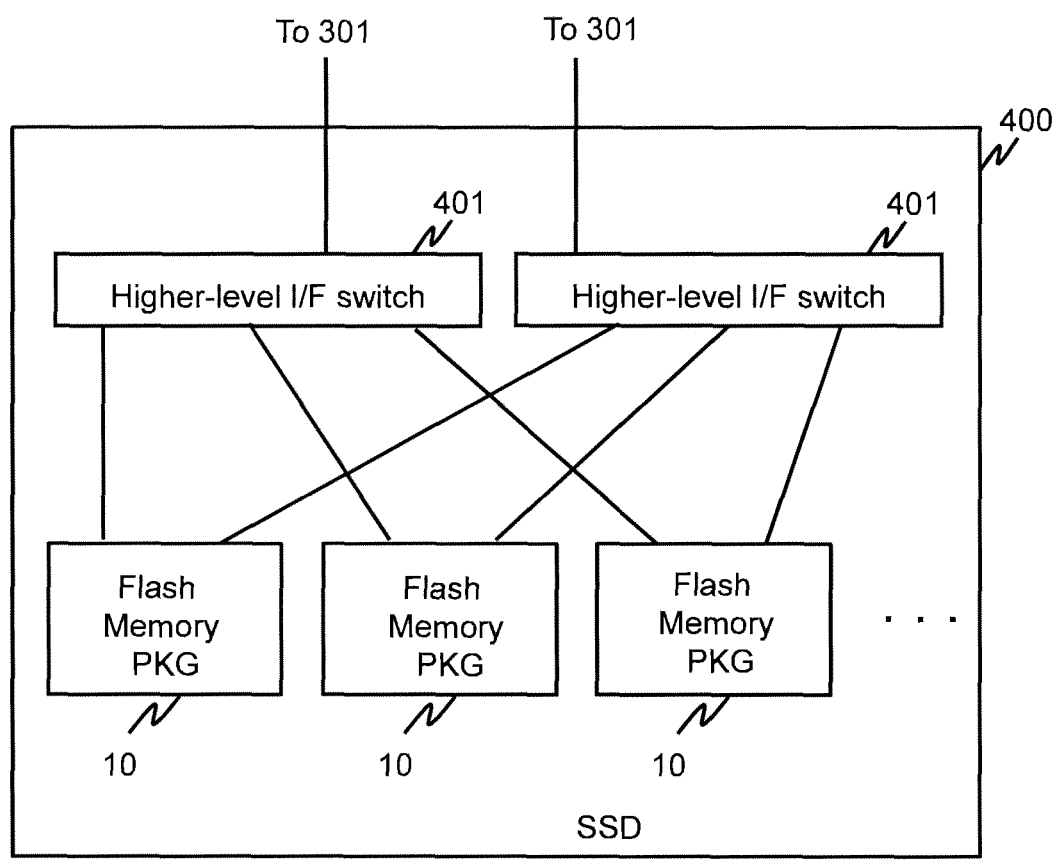
FIG. 3 shows a configuration example of a flash memory device according to the embodiment.

FIG. 3 shows a configuration example of the SSD according to the present embodiment.

The SSD 400 has one or more higher-level I/F switches (higher-level I/F Switch) 401 and one or more flash memory packages (PKG) 10. The higher-level I/F switches 401 relay data between the RAID controllers 301 and the plurality of flash memory PKGs 10.

Figure 4:
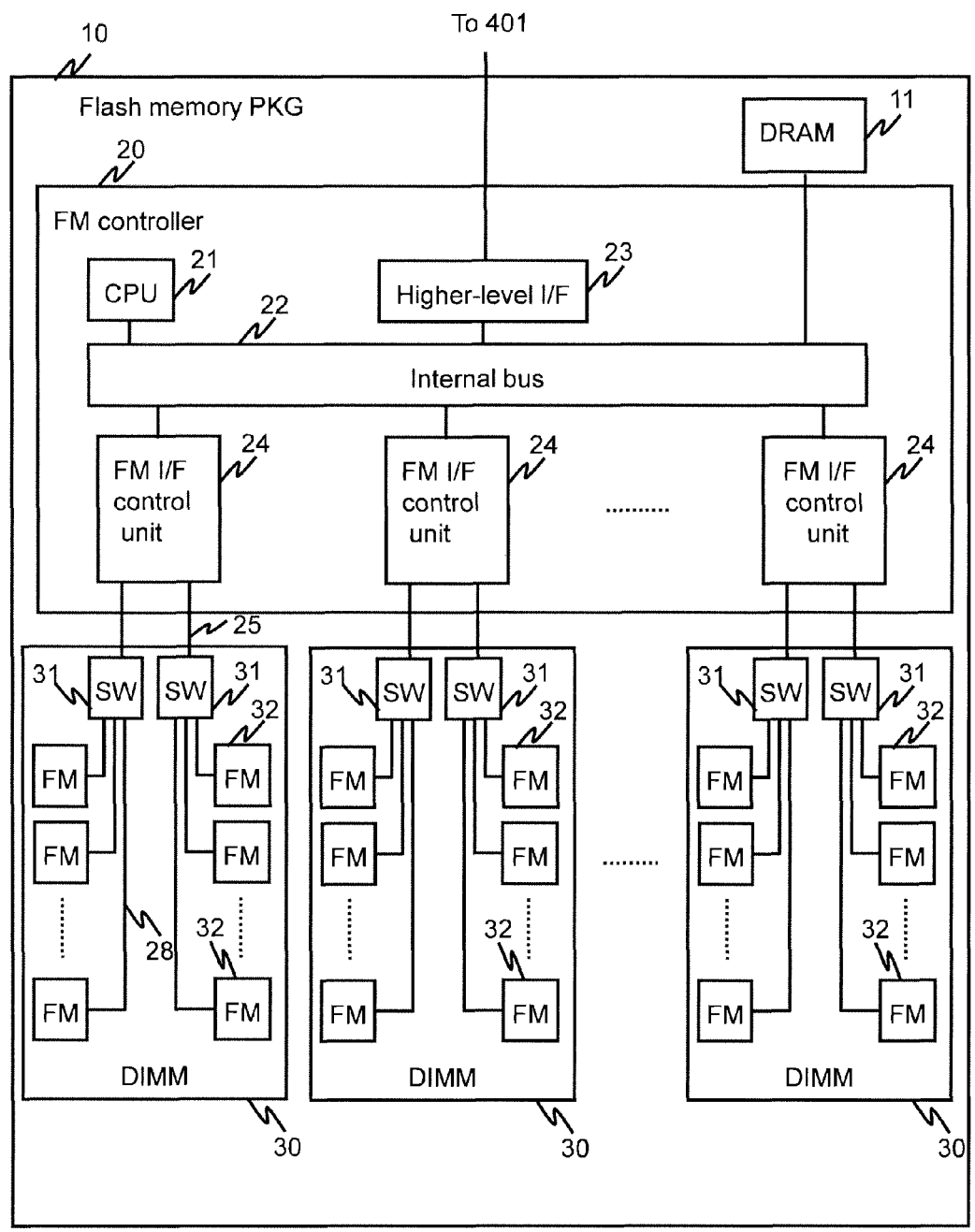
FIG. 4 shows a configuration example of a flash memory package according to the embodiment.

FIG. 4 shows a configuration example of the flash memory package according to the present embodiment.

Each flash memory PKG 10 has a DRAM (Dynamic Random Access Memory) 11, an example of a main storage memory. The flash memory PKG 10 also has an FM controller 20 and a plurality of (or one) DIMM (Dual Inline Memory Module) 30. The DRAM 11 stores data and the like used by the FM controller 20. The DRAM 11 may be mounted in the FM controller 20 or in a member different from the FM controller 20. In the present embodiment, the DRAM 11 stores a logical-physical conversion table 110 (see FIG. 24), a physical-logical conversion table 111 (see FIG. 25) and the like. These tables are described hereinafter.

The FM controller 20 is configured by, for example, a single ASIC (Application Specific Integrated Circuit), and has a CPU 21, an internal bus 22, a higher-level I/F (interface) 23, and a plurality of (or one) FM I/F control units 24. The internal bus 22 couples the CPU 21, the higher-level I/F 23, the DRAM 11, and the FM I/F control units 24 to one another in a manner as to enable the communication therebetween.

The higher-level I/F 23 is coupled to the higher-level I/F switch 401 to mediate the communication with the higher-level device thereof. The higher-level I/F 23 is, for example, an I/F of the SAS. Each FM I/F control unit 24 mediates the exchange of data between the FM controller 20 and a plurality of FM chips 32. In the present embodiment, the FM I/F control unit 24 has a plurality of sets of buses (data buses, etc.) for executing the exchange of data with the FM chips 32, and mediates the exchange of data with the plurality of FM chips 32 by using the plurality of buses. In the present embodiment, the FM I/F control unit 24 is provided to its corresponding DIMM 30. The FM I/F control unit 24 mediates the communication with the plurality of FM chips 32 of the DIMM 30 coupled to this FM I/F control unit 24. The FM I/F control unit 24 may be in charge of two or more of the DIMMs 30. The CPU 21 can execute programs stored in the DRAM 11 (or other storage region, not shown) to execute various processes. There may be more than one CPUs 21, and the plurality of CPUs 21 may share various processes. The processes performed by the CPU 21 are described specifically hereinafter.

Each DIMM 30 has one or more SWs 31 and the plurality of FM chips 32. The FM chips 32 are each an MLC (Multi Level Cell)-type NAND flash memory chip, for example. An MLC-type FM chip has less number of rewriting times than an SLC-type FM chip but is characterized in having a high memory capacity per cell.

The SWs 31 are coupled to the FM I/F control unit 24 via buses 25 including the data buses. In the present embodiment, each of the SWs 31 is provided in a manner as to correspond to a set of buses 25 including the data buses that are coupled to the FM I/F control unit 24. The SW 31 is also coupled to the plurality of FM chips 32 by buses 28 including the data buses. The SW 31 can be coupled to the FM I/F control unit 24 and the FM chips 32 by selectively switching between the bus 25 and any of the buses 28. Because the DIMM 30 is provided with the SWs 31 and the plurality of FM chips 32 that are wired, it is not necessary to prepare connectors for coupling them, and a reduction in the number of required connectors can be expected.

As shown in FIG. 4, the FM chips 32 are coupled to each SW 31 without having another FM chip 32 therebetween; however, the FM chips 32 may be coupled to the SW 31 by another FM chip 32. In other words, two or more of serially arranged FM chips 32 may be coupled to the SW 31.

Figure 5:
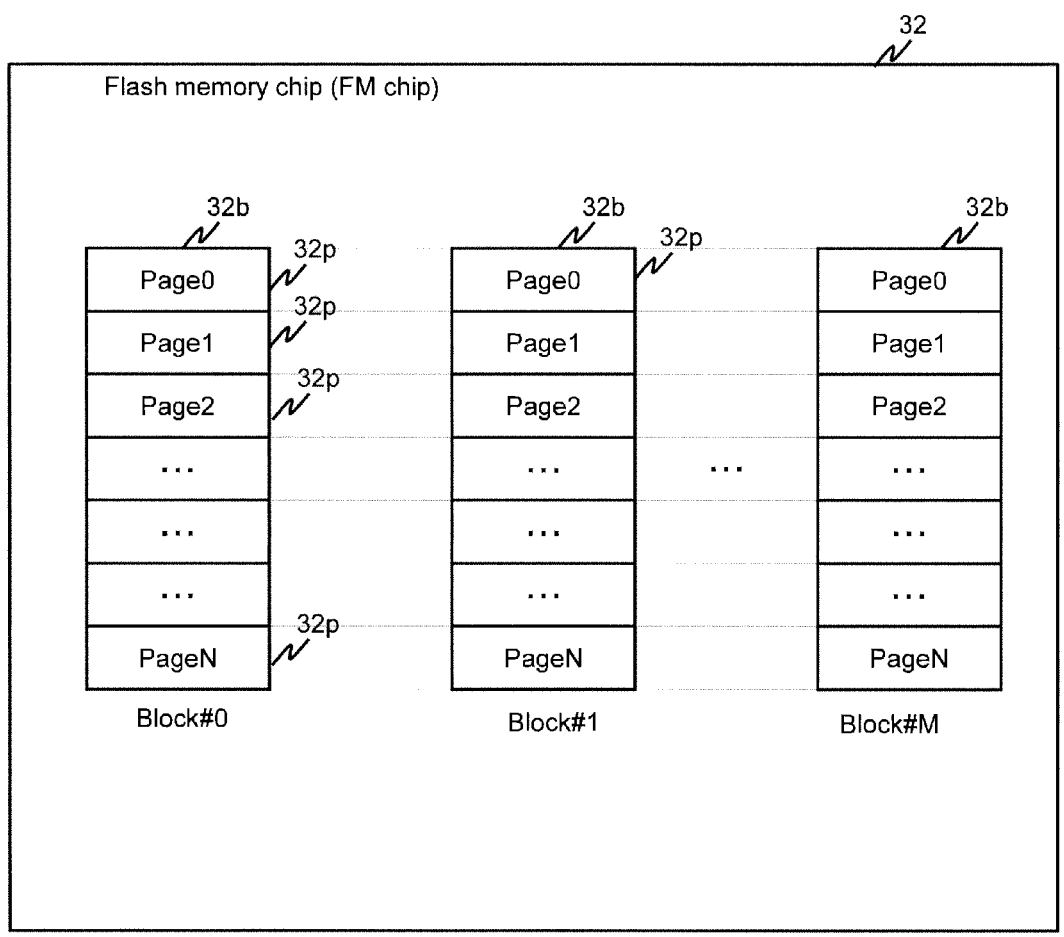
FIG. 5 shows a configuration example of a flash memory chip according to the embodiment.

FIG. 5 shows a configuration example of the flash memory chip according to the embodiment.

Each of the flash memory chips (FM chips) 32 has a plurality of blocks 32b. Each of the blocks 32b has a plurality of pages 32p. Each page 32p represents a unit by which data is read/written from/to the FM chip 32. In the present embodiment, the size of the page 32p is 8 KB. Note, however, that the size of the page 32p is not limited thereto.

Figure 6:
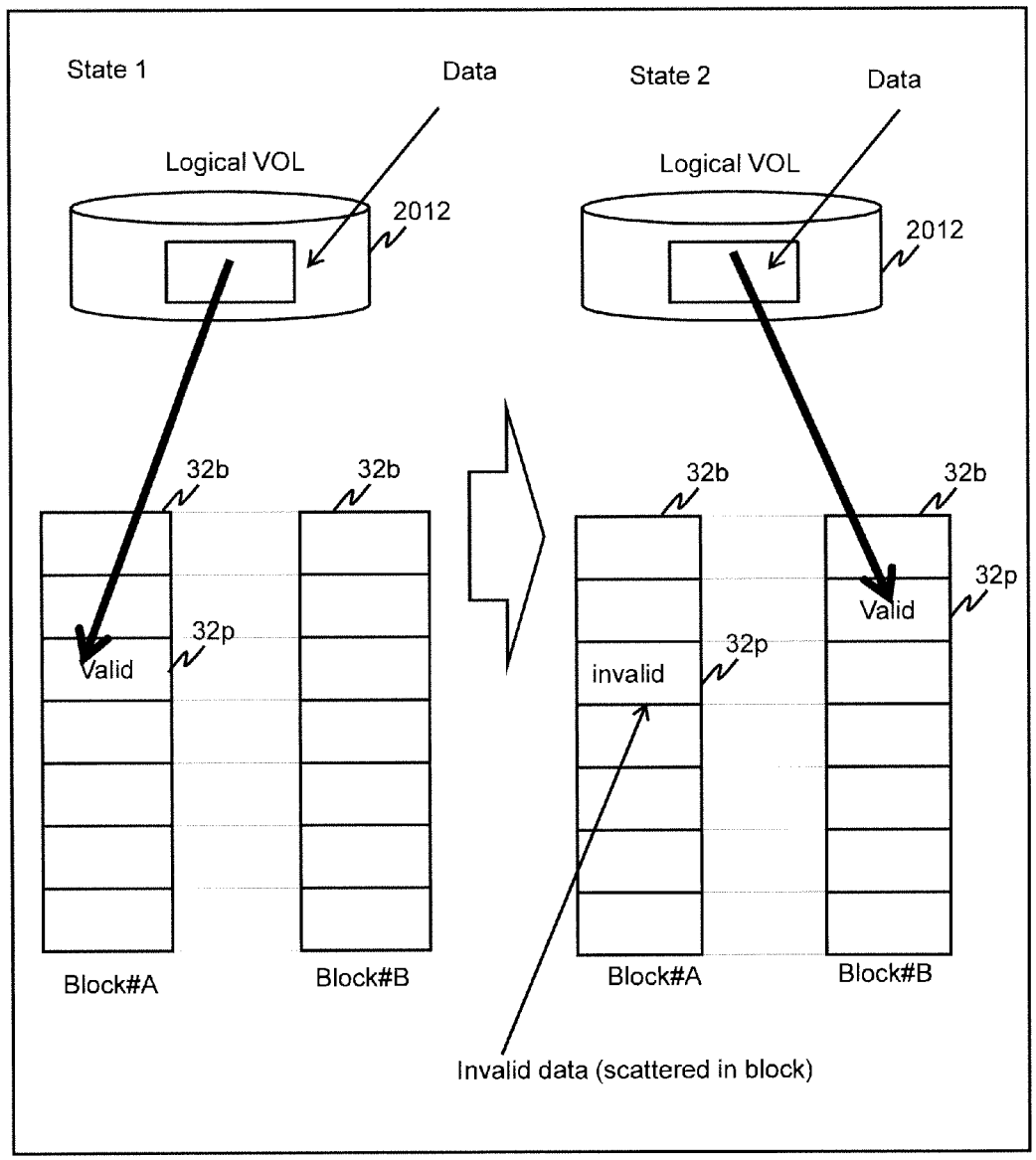
FIG. 6 is a diagram for illustrating how data of the flash memory chip according to the embodiment are updated.

FIG. 6 is a diagram for illustrating how data of the flash memory chip according to the embodiment are updated.

When data is written into a logical VOL 2012, in the FM chip 32 the data is stored in a page 32p of the block 32b of the FM chip 32, the page 32p being associated with a region of the logical VOL 2012 in which the data is stored, as shown in a state 1. In this case, the page 32p is set and managed as a valid page, which means that valid data is stored therein.

When new data (updated data) is written to the same region of the logical VOL 2012, the updated data is stored in other page 32p, as shown in a state 2, and the page 32p in which the data prior to update (old data) is stored is set and managed as an invalid page, which means that invalid data is stored therein. Once various data are updated in this manner, the invalid pages 32p end up being scattered in the block 32b.

Figure 7:
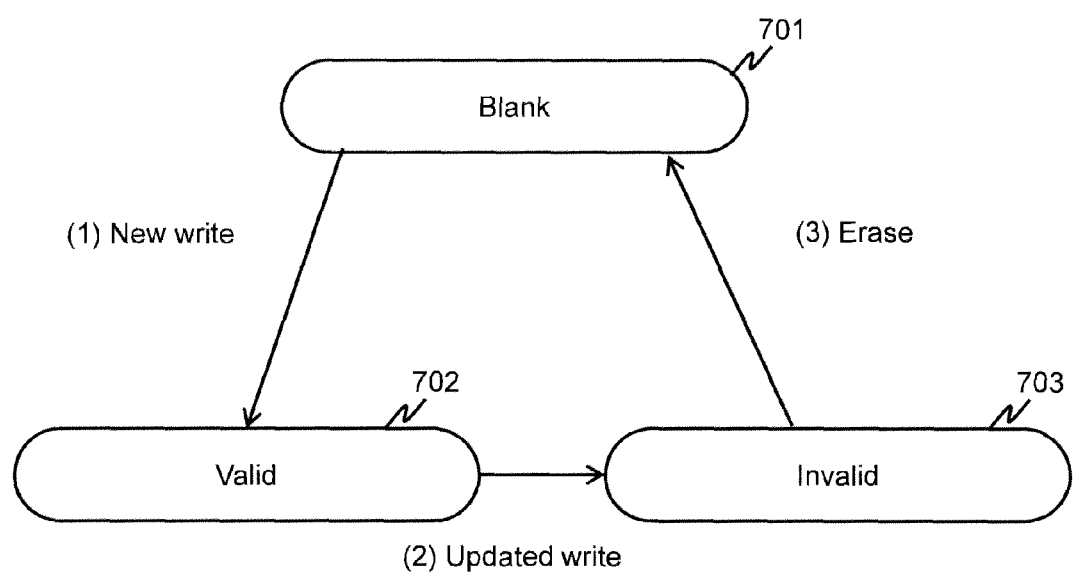
FIG. 7 is a diagram for illustrating a state transition of a page according to the embodiment.

FIG. 7 is a diagram for illustrating a state transition of a page according to the embodiment.

When new data is written into one of the pages 32p, which is in a blank state 701 where data can be stored therein ((1) in FIG. 7), writing the data into the page 32p causes the page 32p to enter a valid state 702. Subsequently, when the data stored in this page 32p is updated ((2) in FIG. 7), the page 32p enters an invalid state 703. When the page 32p in the invalid state 703 is erased (the data within the page 32p is erased) ((3) in FIG. 7), the page 32p returns to the blank state 701.

Figure 8:
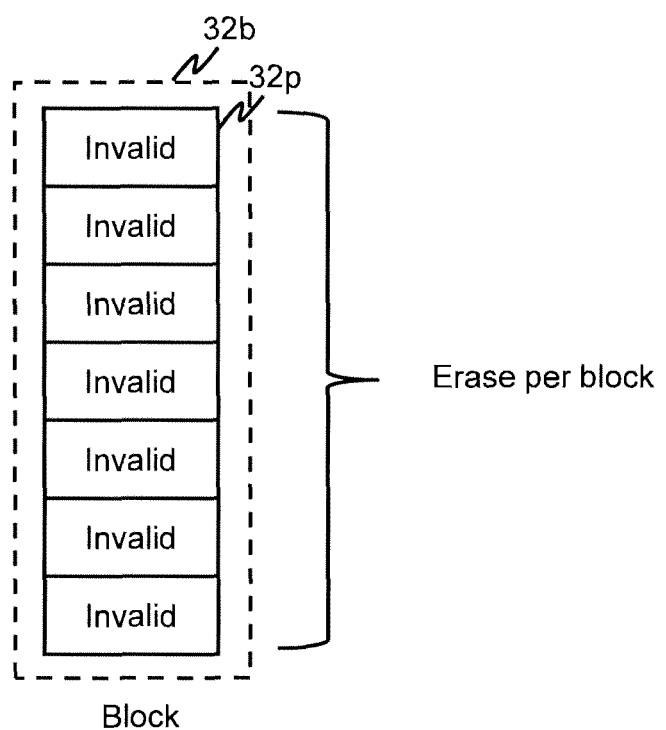
FIG. 8 is a diagram for illustrating how the data of the flash memory chip according to the embodiment are erased.

FIG. 8 is a diagram for illustrating how the data of the flash memory chip according to the embodiment are erased.

In the FM chip 32, the data stored in each block 32b can be erased per block. In the present embodiment, therefore, the data are erased after all of the pages 32p belonging to the block 32b become invalid. Note that erasing the data of each block is also referred to as "erasing the block."

Figure 9:
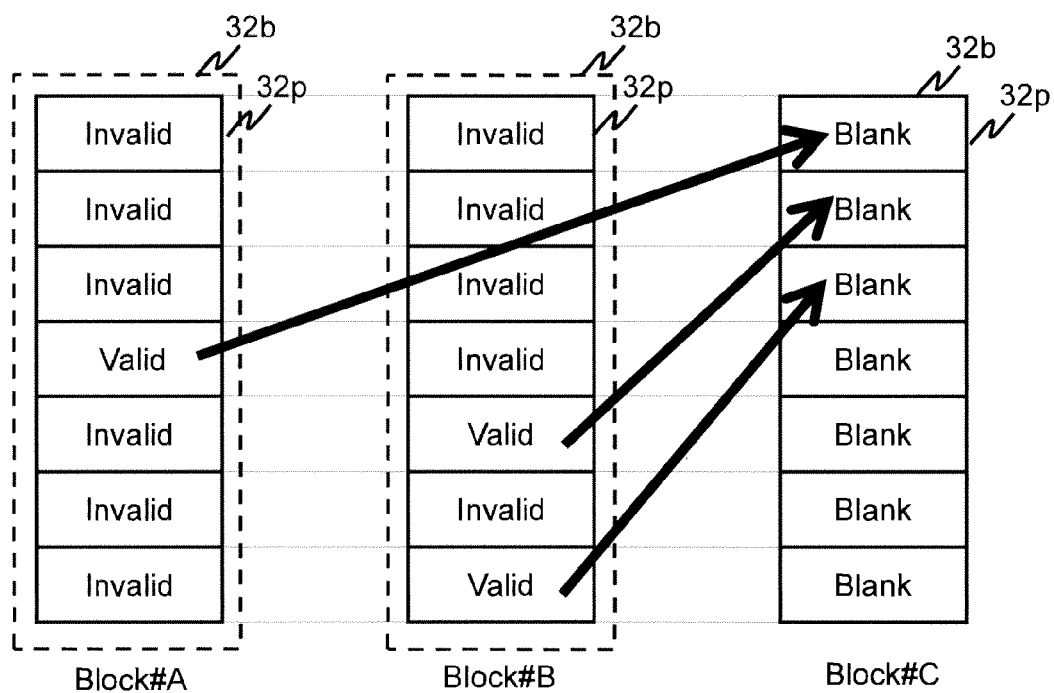
FIG. 9 is a diagram for illustrating reclamation according to the embodiment.

FIG. 9 is a diagram for illustrating reclamation according to the embodiment.

Reclamation is a process for generating a block that can be erased. In this reclamation process, as shown in FIG. 9, the data of the valid pages 32p of the blocks 32b having a predetermined number or more of invalid pages (a block #A, a block #B) are copied to other block 32b having a blank page (a block #C in this example), and the copy-source valid pages are set as invalid pages. As a result, all of the pages 32p of the copy-source blocks 32b (the block #A, the block #B) become invalid pages, and the copy-source blocks 32b become the blocks that can be erased. This makes it possible for the blocks 32b to be erased in subsequent processes.

Figure 10:
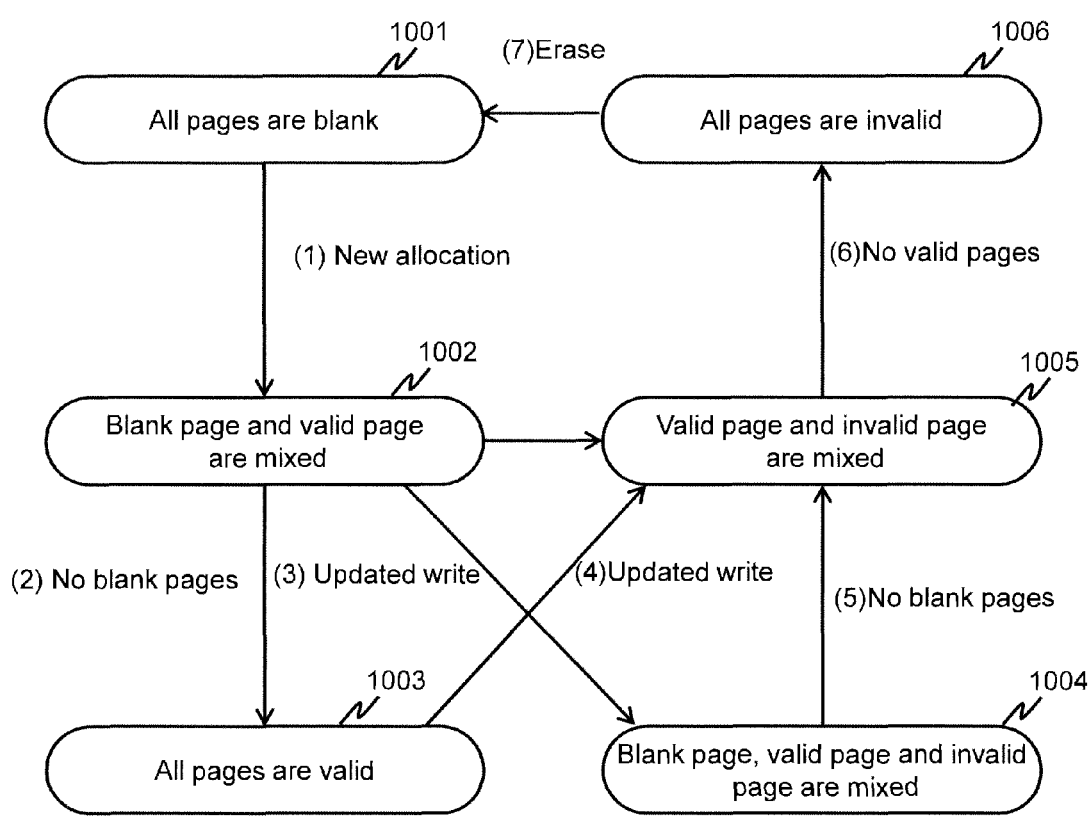
FIG. 10 is a diagram for illustrating a state transition of a block according to the embodiment.

FIG. 10 is a diagram for illustrating a state transition of a block according to the embodiment.

Regarding the block 32b in a state 1001 where all of the pages 32p are blank, when the pages 32p of this block 32b are newly allocated to logical regions and data are written thereto ((1) in FIG. 10), this block 32b enters a state 1002 in which the blank pages and the valid pages are mixed. In the block 32b in this state 1002, when all of the blank pages are newly allocated and data are written thereto, and hence there are no more blank pages ((2) in FIG. 10), the block 32b enters a state 1003 in which all of the pages are valid pages.

When updating the valid pages of the block 32b in the state 1002 where the blank and valid pages are mixed ((3) in FIG. 10), the valid pages become invalid pages, and consequently the block 32b enters a state 1004 where the blank, valid and invalid pages are mixed.

Furthermore, when updating the valid pages of the block 32b in the state 1003 where all of the pages are valid pages ((4) in FIG. 10), the valid pages become invalid pages, and consequently the block 32b enters a state 1005 in which the valid pages and the invalid pages are mixed.

In the block 32b in the state 1004 where the blank, valid and invalid pages are mixed, when all of the blank pages are newly allocated and data are written thereto, and hence there are no more blank pages ((5) in FIG. 10), the block 32b enters the state 1005 where the valid pages and the invalid pages are mixed.

In the block 32b in the state 1005 where the valid pages and the invalid pages are mixed, when updating the valid pages or the data of the valid pages are moved due to reclamation, and hence there are no more valid pages ((6) in FIG. 10), the block 32b enters a state 1006 where all of the pages are invalid pages. When the block 32b in the state 1006 is erased ((7) in FIG. 10), the block 32b returns to the state 1001 where all of the pages are blank.

Figure 11:
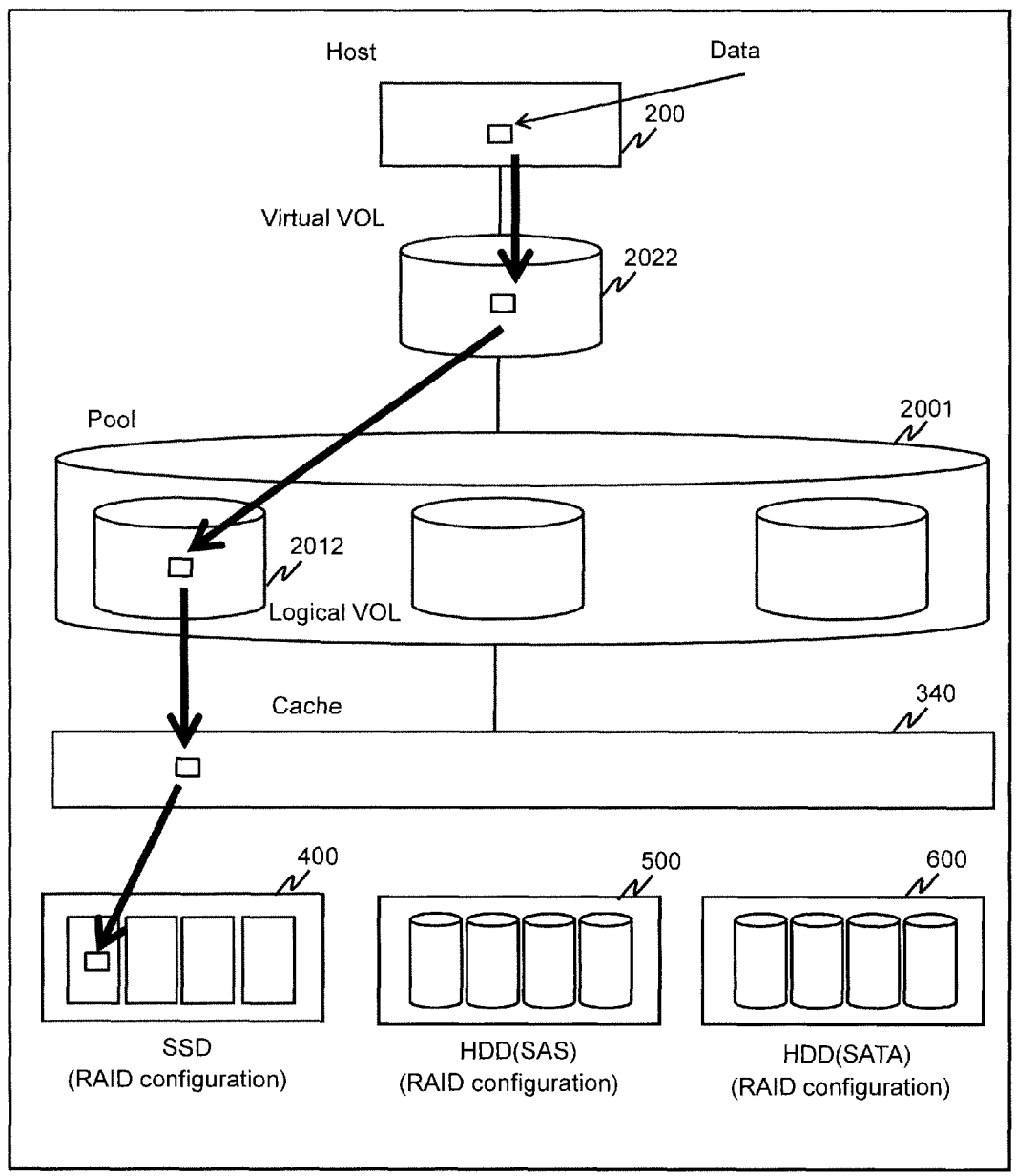
FIG. 11 is a diagram for illustrating a dynamic region allocation process according to the embodiment.

FIG. 11 is a diagram for illustrating a dynamic region allocation process according to the embodiment.

The host 200 transmits a write request designating a region (a write region) of a virtual VOL 2022. The size of data according to which the host 200 conforms to the write request ("write data" hereinafter) is, for example, an integral multiple of (e.g., N times greater than (where N is an integer of 2 or more)) the page volume of the SSD 400. In the present embodiment, for example, the size of each page is 8 KB, and the size of the write data is 24 KB, which is three times greater than the aforementioned page size. In the storage system 1, once the write request is received, in the case where the region of the logical VOL 2012 of a pool 2001 is not allocated to the write region of the virtual VOL 2022, the region of the logical VOL 2012 of the pool 2001 that is the same size as that of the write region is allocated. As a result, when the allocated region of the logical VOL 2012 corresponds to a region of the SSD 400, the write data is written to the region (page) of the SSD 400 via the cache 340.

In place of this dynamic region allocation process, a dynamic extent region allocation process described below may be performed.

Figure 12:
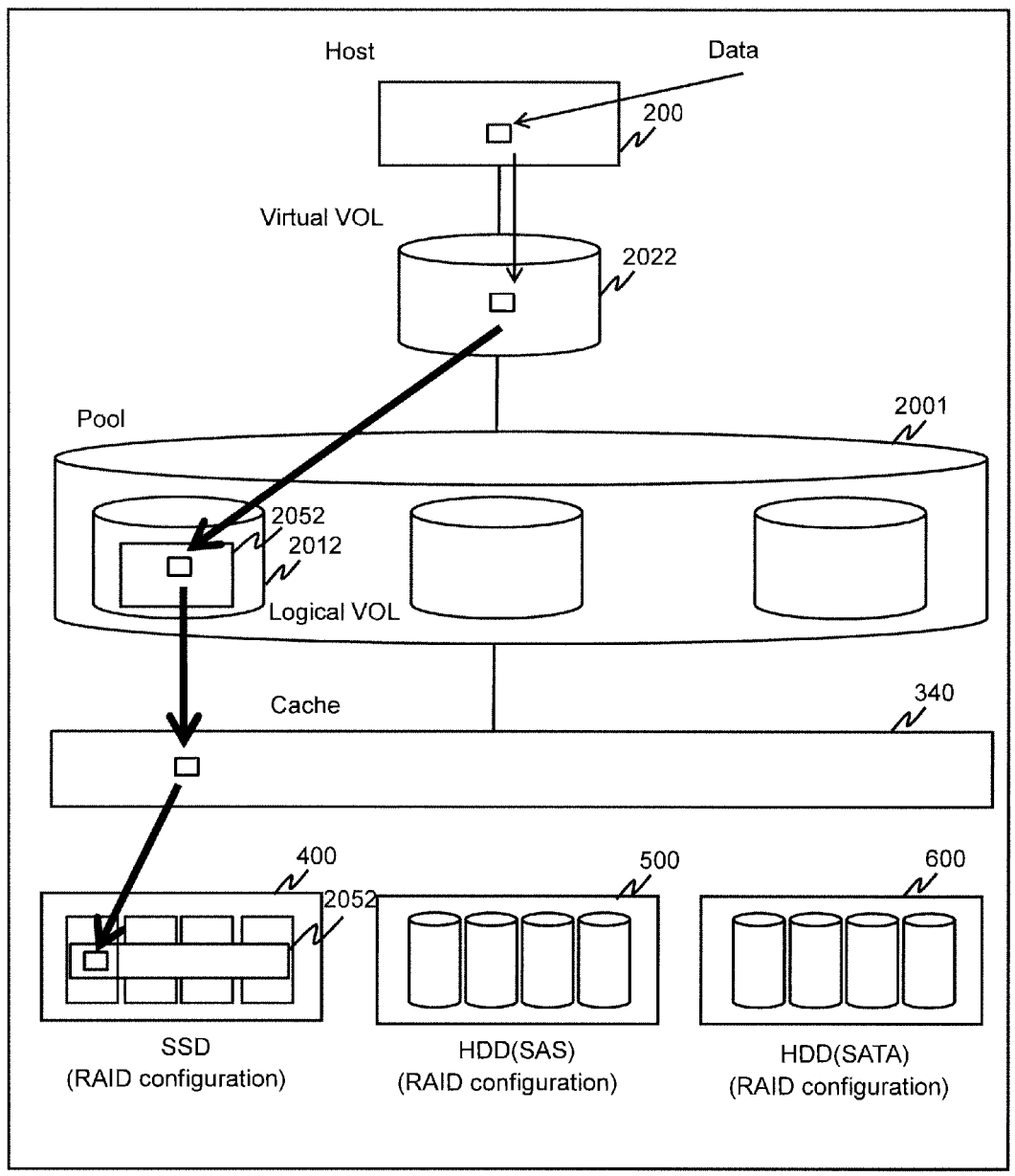
FIG. 12 is a diagram for illustrating a dynamic extent region allocation process according to the embodiment.

FIG. 12 is a diagram for illustrating a dynamic extent region allocation process according to the embodiment.

In the dynamic extent region allocation process, in the case where the region of the logical VOL 2012 of the pool 2001 is not allocated to the write region of the virtual VOL 2022, an extent 2052, which is a region larger than the write region, is allocated. Allocating the extent 2052 larger than the write region can reduce the amount of data related to management information used for managing the region allocation.

In the dynamic extent region allocation process shown in FIG. 12 and the dynamic region allocation process shown in FIG. 11, the logical region (extent) inside the pool is allocated to the region of the virtual VOL. Thus, the following descriptions of the dynamic extent region allocation process and the dynamic region allocation process describe the allocation of "extents."

Next is described an inter-tier dynamic migration as an example where unnecessary data are generated in the SSD 400 of the storage system according to the present embodiment.

Figure 13:
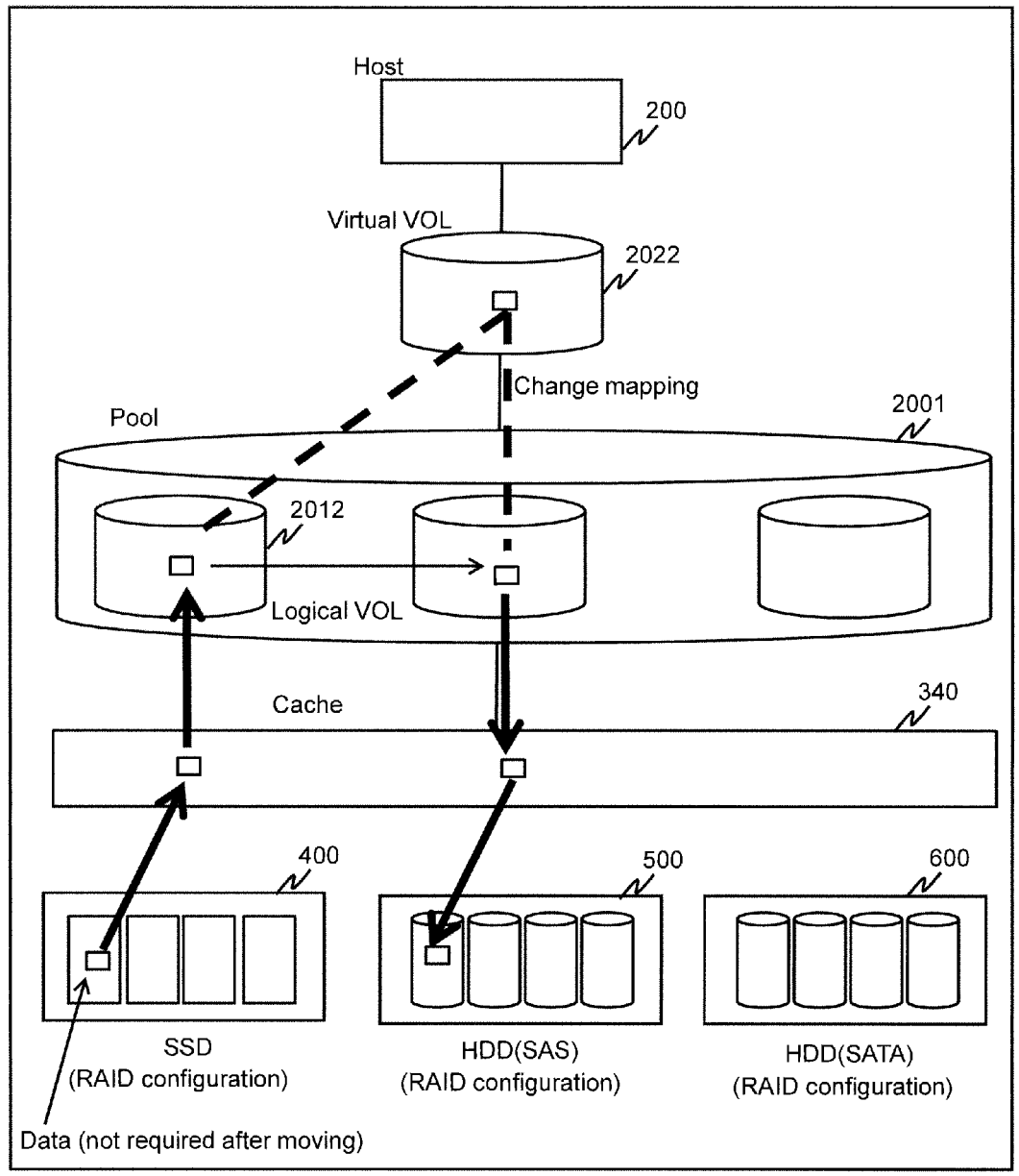
FIG. 13 is a diagram for illustrating an inter-tier dynamic migration according to the embodiment.

FIG. 13 is a diagram for illustrating the inter-tier dynamic migration according to the embodiment.

The inter-tier dynamic migration means that an extent in which data is stored is changed to other tier extent, based on the frequency of access to a virtual region of the virtual VOL or an extent allocated to the virtual region. In other words, the inter-tier dynamic migration is to move the data from an extent to an extent of other tier.

When moving data stored in the extent of the SSD 400 to an extent of other tier (the extent of the HDD (SAS) 500 in this example), the storage system 1 allocates the extent of the destination tier, from the pool 2001 to the abovementioned region, reads the corresponding data from the SSD 400 into the cache 340, and moves this data to the allocated extent of the destination tier (the extent of the HDD (SAS) 500 in this example). The storage system 1 then changes the mapping of the dynamic region allocation table and the like so as to make the region of the virtual VOL 2022 having the data correspond to the extent of the tier to which the data was moved.

After the execution of this inter-tier dynamic migration, the data stored in the storage regions of the SDD 400 are no longer referenced by the host 200 and hence become unnecessary. In the SSD 400, however, the plurality of pages having these data stored therein remain managed as the valid pages in which valid data are stored.

In the present embodiment, for example, a fixed-pattern data write process described hereinafter is executed as a method for reducing the regions storing the unnecessary data.

Figure 14:
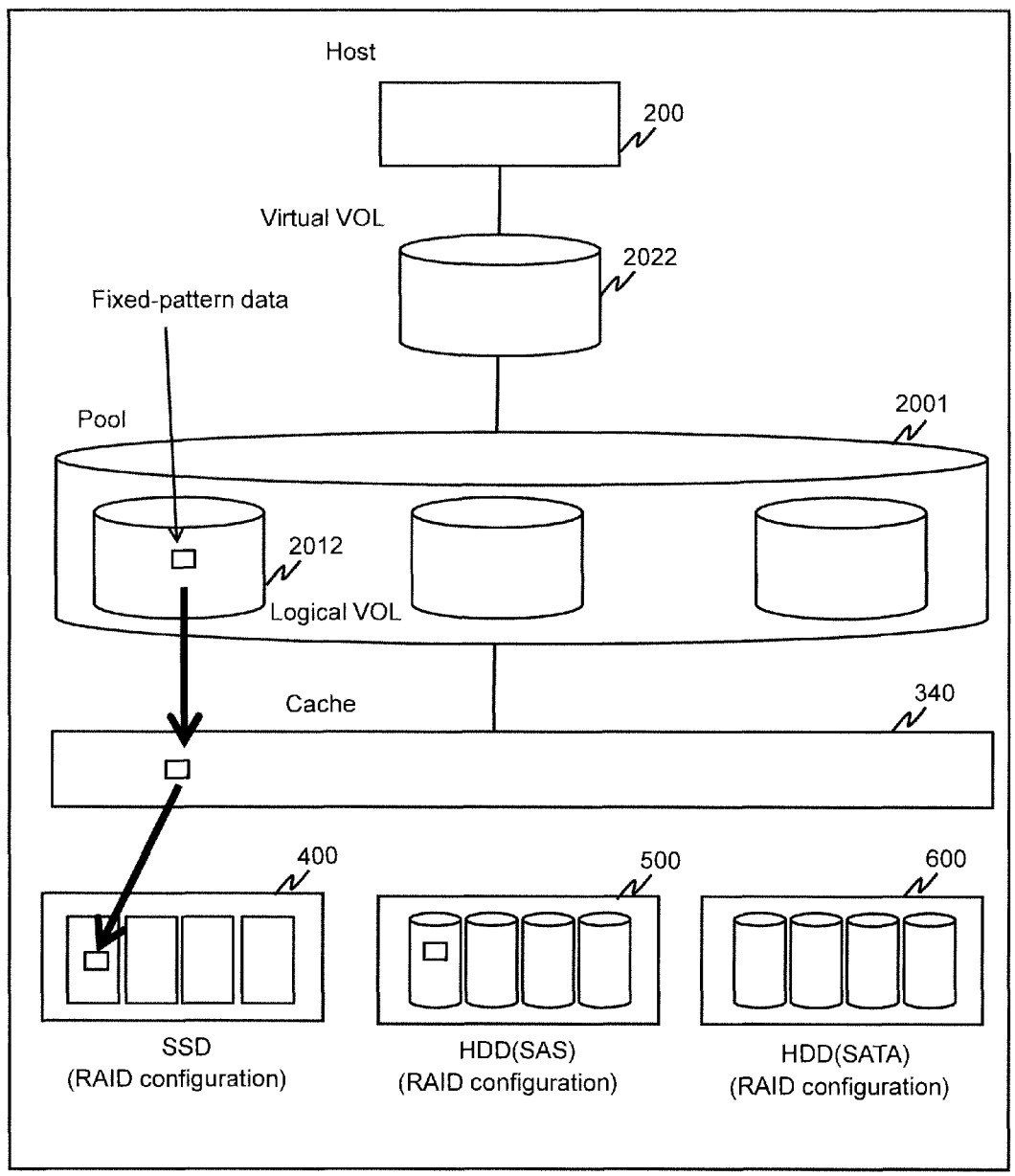
FIG. 14 is a diagram for illustrating a fixed-pattern data write process performed after the inter-tier dynamic migration according to the embodiment.

FIG. 14 is a diagram for illustrating a fixed-pattern data write process performed after the inter-tier dynamic migration according to the embodiment.

Here, "fixed-pattern data" means data of the same size as the write data, and a plurality of partial data obtained as a result of separating the write data into the pages 32p are the data of the same data pattern. The fixed-pattern data may be, for example, data whose bits are all "0" or "1."

The fixed-pattern data write process is executed subsequent to the inter-tier dynamic migration (after the data is moved to an extent of other tier), and, for example, before an extent to be mapped (a source extent) to a virtual region where the moved data is stored (a region in the virtual VOL) is changed to other extent (a destination extent). In the fixed-pattern data write process, the storage system 1 writes the fixed-pattern data (e.g., data whose bits are all "0") to a plurality of pages (the plurality of pages of the SSD 400 in which the data before migration are stored) corresponding to the extent (the source extent) in which the unnecessary data are stored.

FIGS. 15 to 18 show first to fourth examples of the fixed-pattern data write process.

Figure 15:
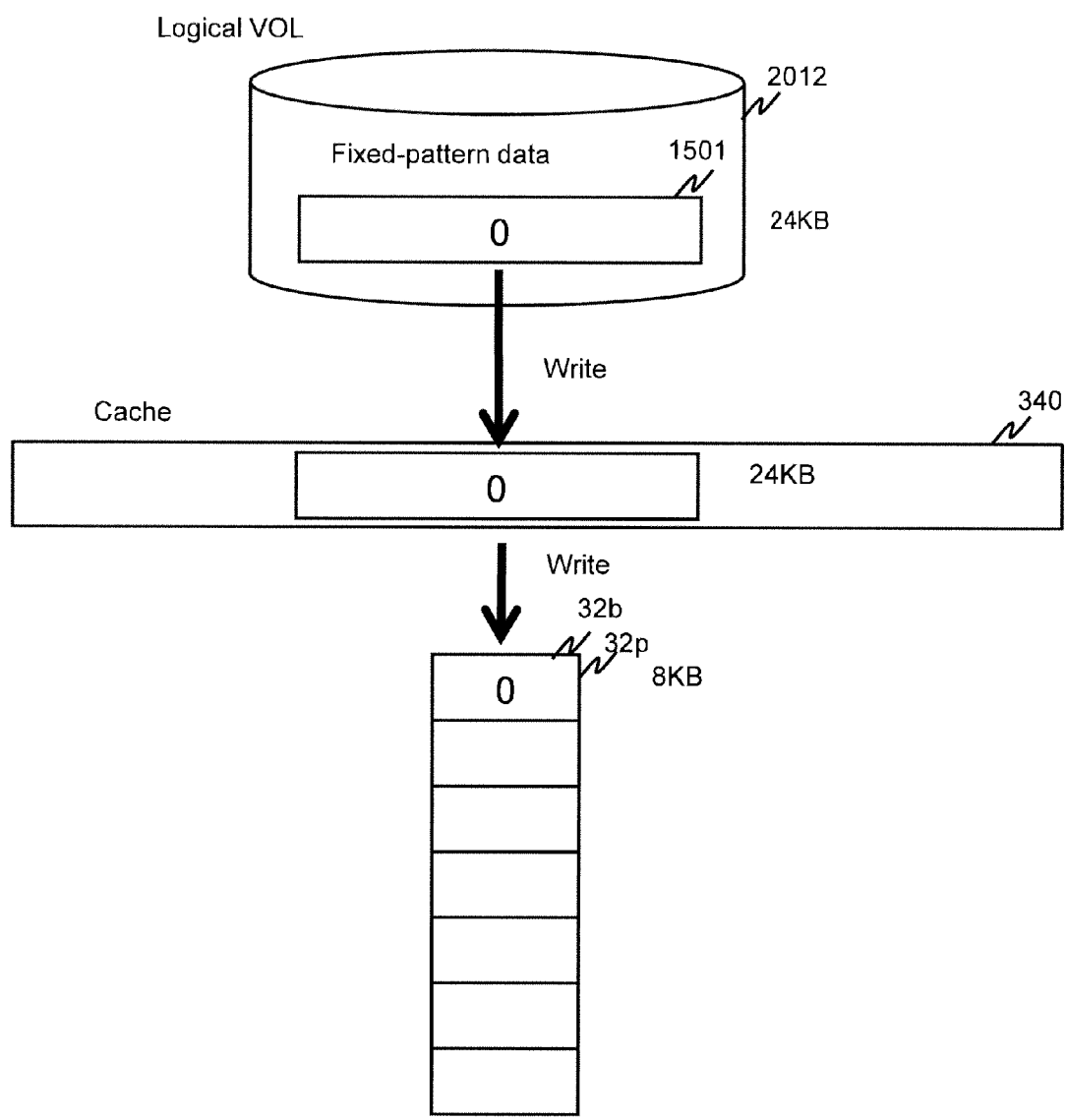
FIG. 15 is a diagram for illustrating a first example of the fixed-pattern data write process according to the embodiment.

FIG. 15 is a diagram for illustrating the first example of the fixed-pattern data write process according to the embodiment.

In the fixed-pattern data write process according to the first example, the RAID controller 301 transmits, to the SSD 400 (the flash memory package 10 of the SSD 400), a write request for writing fixed-pattern data 1051 of the unit size of the write data (e.g., 24 KB) into extents in which unnecessary data are stored (regions of the logical VOL 2012 configuring the pool). As a result, the fixed-pattern data 1051 is transmitted to the SSD 400 via the cache 340. The SSD 400 sets a plurality of (three, in this example) pages in which the unnecessary data were stored, as invalid pages. The SSD 400 then stores partial data of the fixed-pattern data 1051, the size of which is equivalent to that of one page, into a single page 32p, and updates the information of the logical-physical conversion table 110 and of the physical-logical conversion table 111 so as to make each of the regions divided (compressed) according to the page size of the regions of the logical volume (the regions equivalent to the write data size) correspond to this page 32p. In this manner, the number of valid pages having the unnecessary data stored therein can be reduced. For instance, in the case of one write data point, the number of valid pages can be reduced from three to one.

Figure 16:
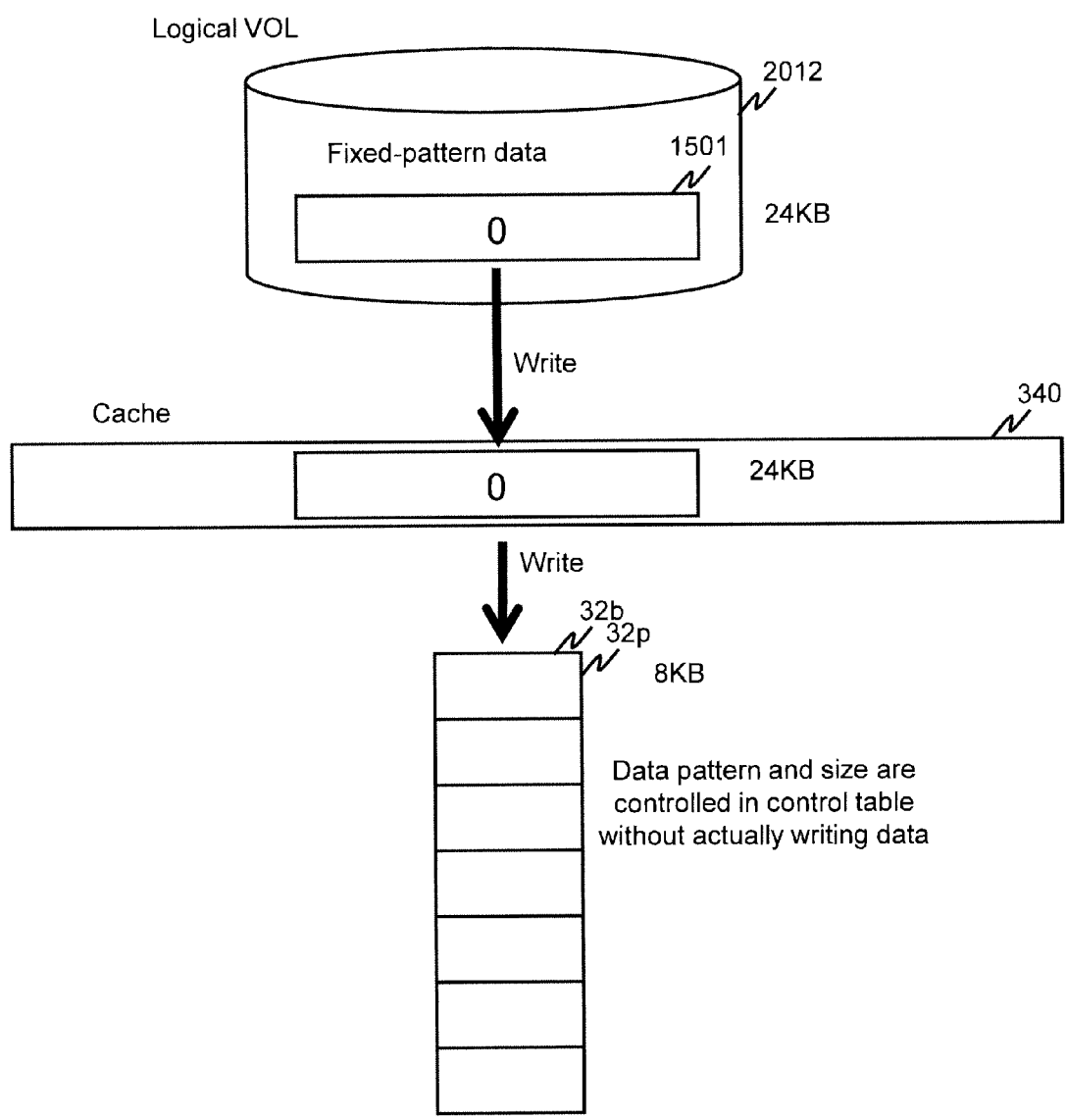
FIG. 16 is a diagram for illustrating a second example of the fixed-pattern data write process according to the embodiment.

FIG. 16 is a diagram for illustrating the second example of the fixed-pattern data write process according to the embodiment.

In the fixed-pattern data write process according to the second example, the RAID controller 301 transmits, to the SSD 400, a request for writing the fixed-pattern data 1051 of the unit size of the write data (e.g., 24 KB) into the regions of the logical VOL 2012 in which unnecessary data are stored. As a result, the fixed-pattern data 1051 is transmitted to the SSD 400 via the cache 340. The SSD 400 sets a plurality of (three, in this example) pages in which the unnecessary data were stored, as invalid pages. The SSD 400 then updates the information of the logical-physical conversion table 110 and of the physical-logical conversion table 111 so as to make each of the regions divided (compressed) according to the page size of the region of the logical volume (the regions equivalent to the write data size) correspond to another page 32p, and so as to make a data pattern for specifying the fixed-pattern data (e.g., "0," if the data pattern is fixed-pattern data whose bits are all "0") correspond to each of the regions. In this manner, the number of valid pages having the unnecessary data stored therein can be reduced. For instance, in the case of one write data point, the number of valid pages can be reduced from three to one. In addition, it is not necessary to store the data in the pages.

Figure 17:
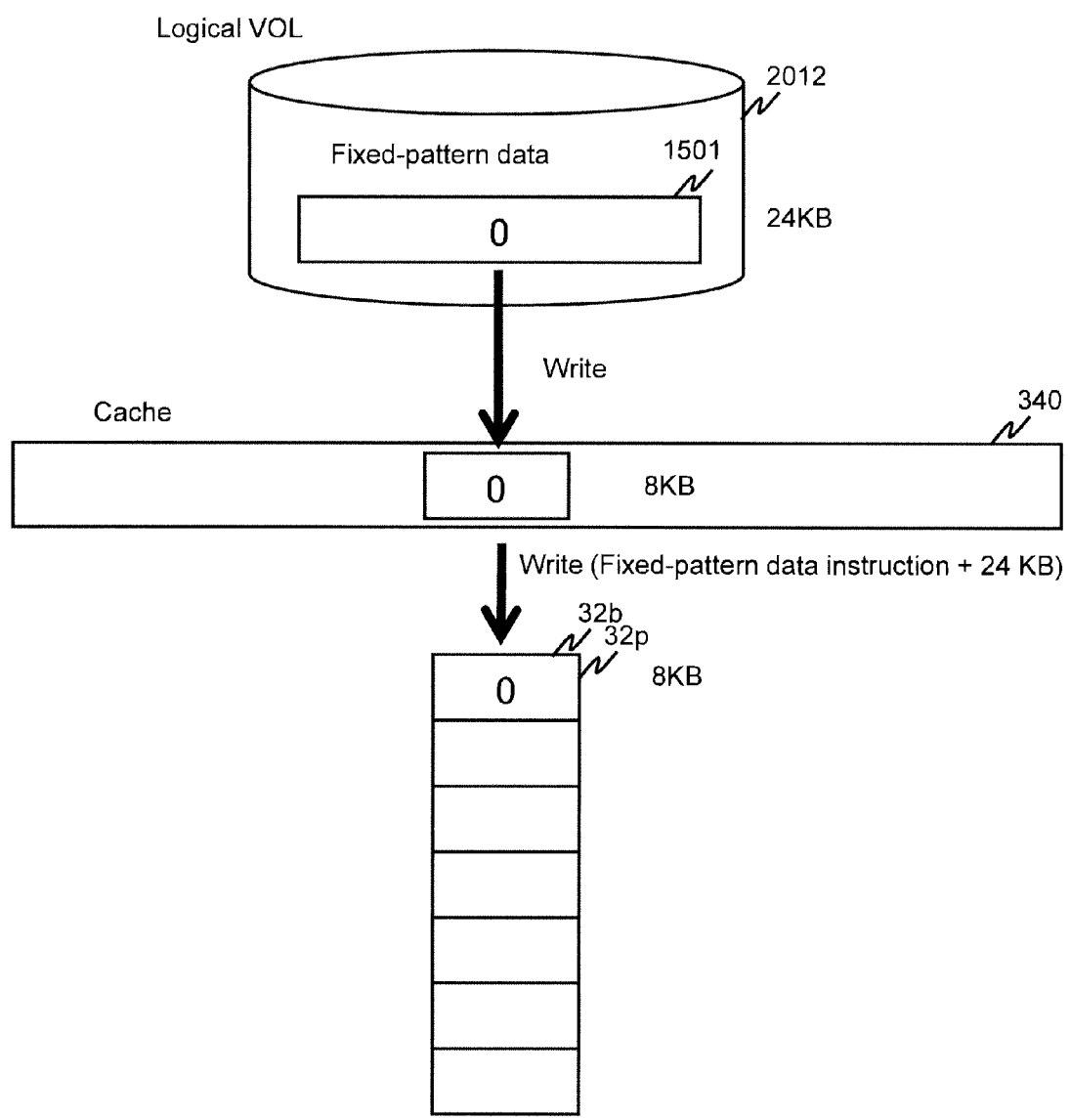
FIG. 17 is a diagram for illustrating a third example of the fixed-pattern data write process according to the embodiment.

FIG. 17 is a diagram for illustrating the third example of the fixed-pattern data write process according to the embodiment.

In the fixed-pattern data write process according to the third example, the RAID controller 301 transmits, to the SSD 400, a write request (a write request with fixed-pattern data instruction) that includes partial data of the page size and size information indicating the size of the fixed-pattern data 1051, the partial data being obtained by dividing (compressing) the fixed-pattern data 1051, as a request for writing the fixed-pattern data 1051 of the unit size of the write data (e.g., 24 KB) into the regions of the logical VOL 2012 in which unnecessary data are stored. As a result, the partial data are transmitted to the SSD 400 via the cache 340. The SSD 400 specifies a plurality of (three, in this example) pages in which the unnecessary data are stored, based on the size information, and then sets the pages as invalid pages. The SSD 400 then stores the partial data in a single page 32$p$, and updates the information of the logical-physical conversion table 110 and of the physical-logical conversion table 111 so as to make each of the regions divided according to the page size of the regions of the logical volume (the regions equivalent to the write data size) correspond to this page 32$p$. In this manner, the number of valid pages in which the unnecessary data are stored can be reduced. For instance, in the case of one write data point, the number of valid pages can be reduced from three to one.

Figure 18:
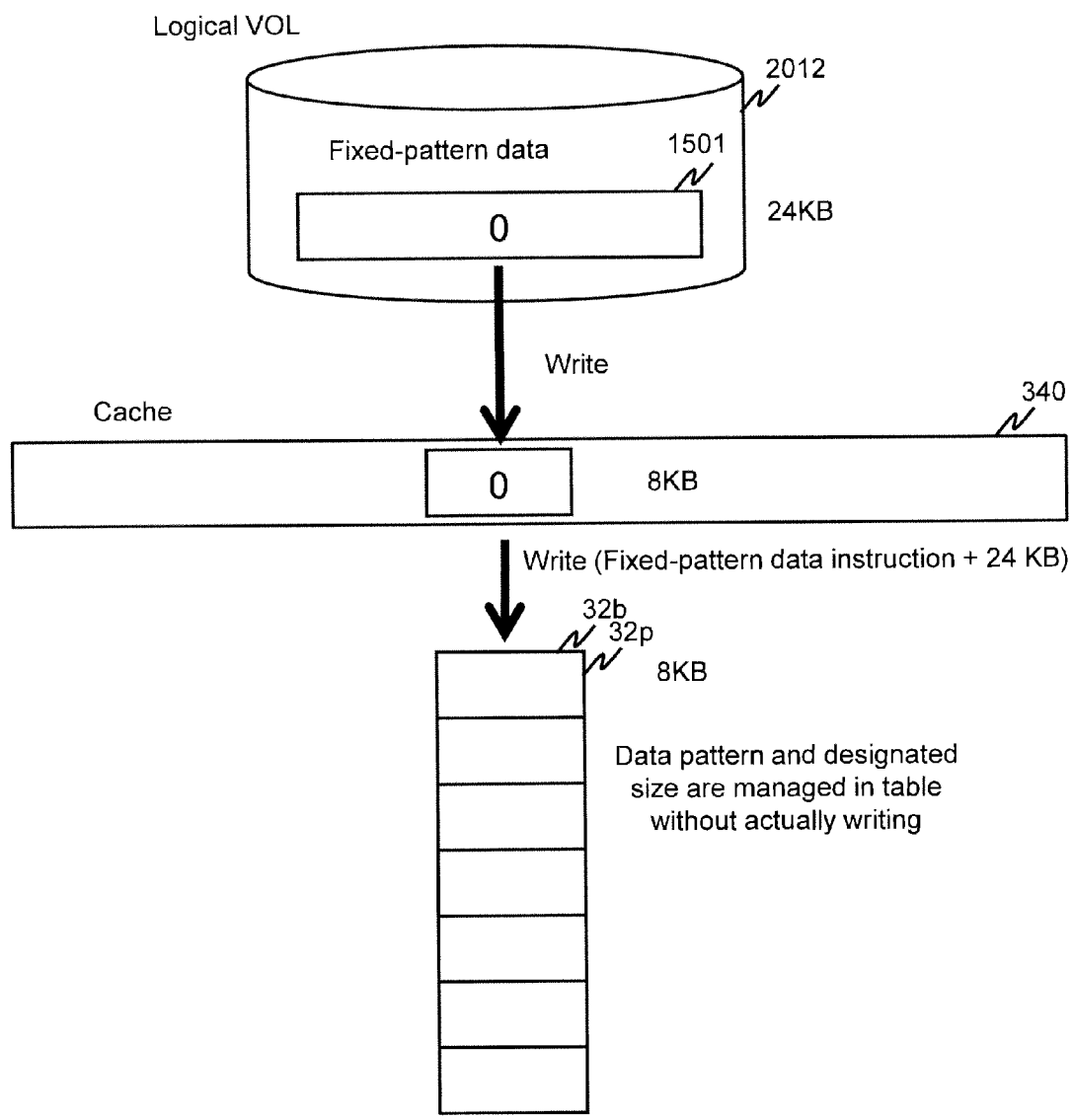
FIG. 18 is a diagram for illustrating a fourth example of the fixed-pattern data write process according to the embodiment.

FIG. 18 is a diagram for illustrating the fourth example of the fixed-pattern data write process according to the embodiment.

In the fixed-pattern data write process according to the fourth example, the RAID controller 301 transmits, to the SSD 400, a write request that includes partial data of the page size and size information (e.g., 24 KB) indicating the size of the fixed-pattern data 1051, the partial data being obtained by dividing (compressing) the fixed-pattern data 1051, as a request for writing the fixed-pattern data 1051 of the size of the write data (e.g., 24 KB) into the regions of the logical VOL 2012 in which unnecessary data are stored. As a result, the partial data are transmitted to the SSD 400 via the cache 340. The SSD 400 specifies a plurality of (three, in this example) pages in which the unnecessary data were stored, based on the size information, and then sets the pages as invalid pages. The SSD 400 then updates the information of the logical-physical conversion table 110 and of the physical-logical conversion table 111 so as to make each of the regions divided according to the page size of the regions of the logical volume (the regions equivalent to the write data size) correspond to another page 32$p$ and so as to make a data pattern for specifying the fixed-pattern data (e.g., "0," if the data pattern is fixed-pattern data whose bits are all "0") correspond to each of the regions. In this manner, the number of valid pages in which the unnecessary data are stored can be reduced. For instance, in the case of one write data point, the number of valid pages can be reduced from three to one. In addition, it is not necessary to store the data in the pages.

Moreover, a process using an unmap request, according to a fifth example described hereinafter, may be executed as another method for reducing the number of regions (pages) in which unnecessary data are stored.

Figure 19:
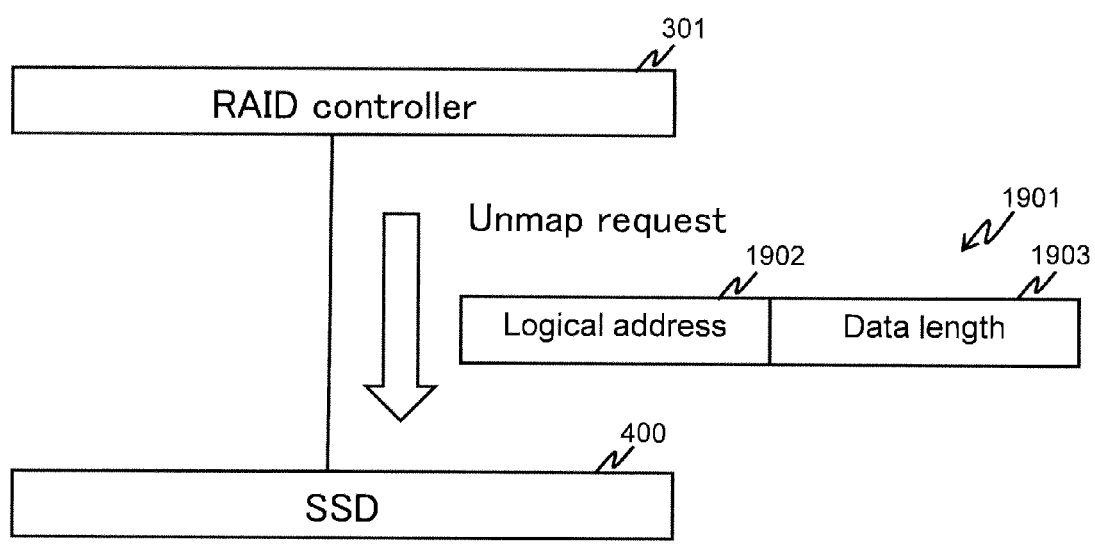
FIG. 19 is a diagram for illustrating an unmap request according to the embodiment.

FIG. 19 is a diagram for illustrating an unmap request according to the embodiment.

An unmap request 1901 has the fields of a logical address 1902 and a data length 1903. The logical address 1902 is for storing a logical address indicating the top page to be invalidated. The data length 1903 is for storing a data length from the top logical address of a logical address range including the page to be invalidated.

When using the unmap request 1901, the RAID controller 301 specifies a range of logical addresses in which the unnecessary data are stored, sets the top logical address in the logical address 1902, sets the data length of the range of logical addresses in the data length 1903, and then transmits the unmap request 1901 to the SSD 400. Once the flash memory package 10 of the SSD 400 acquires the unmap request 1901, the flash memory package 10 specifies a range of corresponding logical addresses based on the values of the logical address 1902 and the data length 1903 of the unmap request 1901, and updates the information of the logical-physical conversion table 110 and of the physical-logical conversion table 111 so as to manage a plurality of pages associated with the range of the logical addresses, as invalid pages. As a result, all of the pages in which the unnecessary data are stored become invalid, and subsequently the pages can be used as blank pages.

Next is described a snapshot creation process and a snapshot deletion process that are performed in the storage system of the present embodiment as other examples where unnecessary data are generated in the SSD 400.

Figure 20:
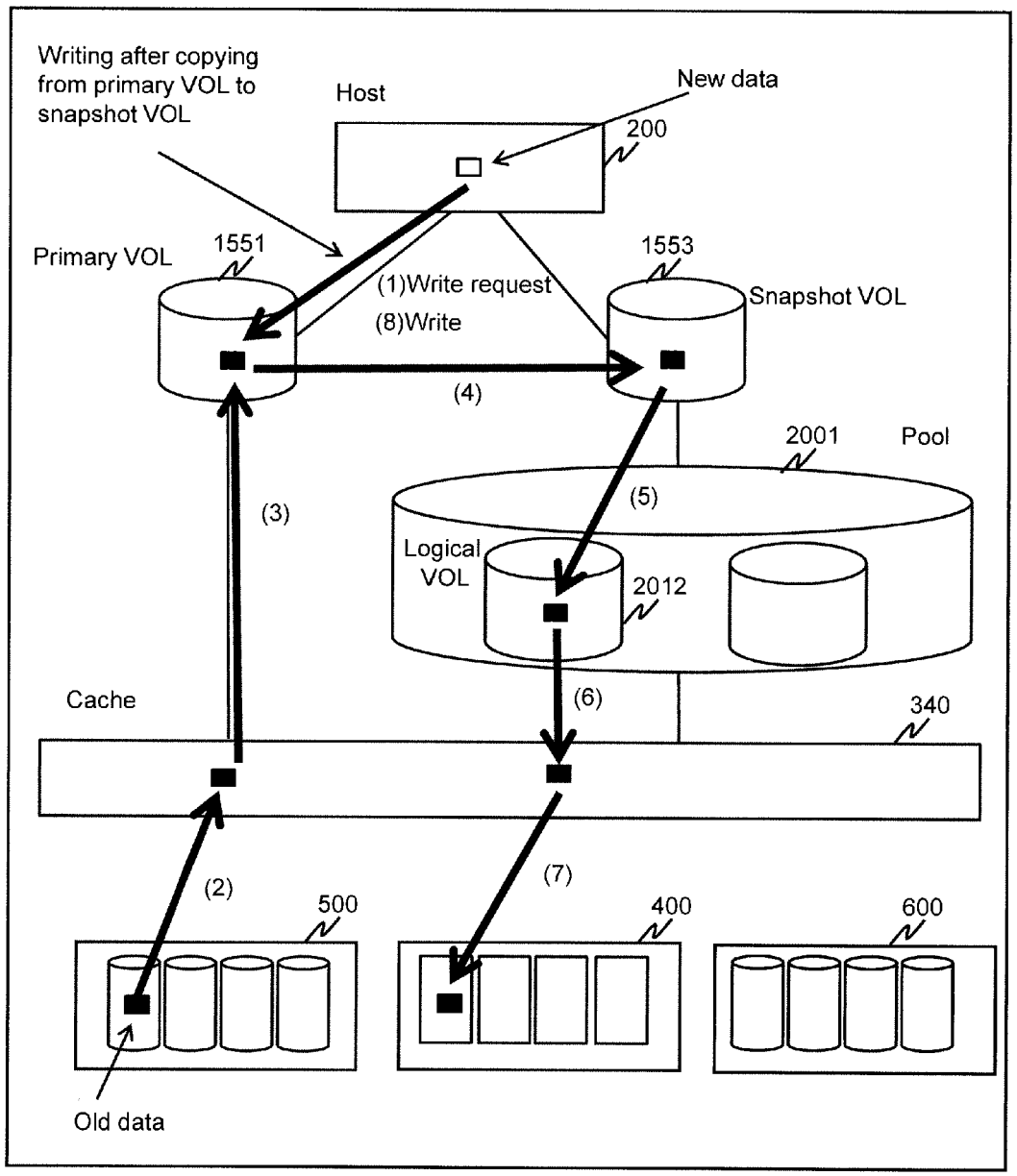
FIG. 20 is a diagram for illustrating a snapshot creation process according to the embodiment.

FIG. 20 is a diagram for illustrating the snapshot creation process according to the embodiment.

In the snapshot creation process, when the host 200 transmits a write request for writing new data (data for updating the data (old data) stored in a corresponding region) into a predetermined region (write region) of a copy-target primary VOL 1551 ((1) in FIG. 20), the RAID controller 301 reads the old data from a physical region (a physical region of the HDD (SAS) 500 in the example shown in FIG. 20) ((2) in FIG. 20), which is the basis of the write region of the primary VOL 1551, acquires the old data via the cache 340 ((3) in FIG. 20), and writes the old data into a copy-destination region of a snapshot VOL 1553 (a region having the same address as the write region of the primary VOL 1551) ((4) in FIG. 20). In this process, the RAID controller 301 writes the old data into the extent (the logical region of the logical VOL 2012 of the pool 2001) allocated to the copy-destination region of the snapshot VOL 1553 ((5) in FIG. 20).

In the case where a region of the SSD 400 is allocated to the write-destination extent to which the old data is written (the extent allocated to the copy-destination region), the RAID controller 301 designates the write-destination extent, and transmits a write request for writing the old data to the SSD 400 which is the basis of the region allocated to the write-destination extent. The old data is transmitted to the SSD 400 via the cache 340 ((6) in FIG. 20). The SSD 400 then stores the old data in a storage region (one or more pages) of the FM chip that corresponds to the write-destination extent ((7) in FIG. 20). New data is stored in the primary VOL 1551 ((8) in FIG. 20).

Figure 21:
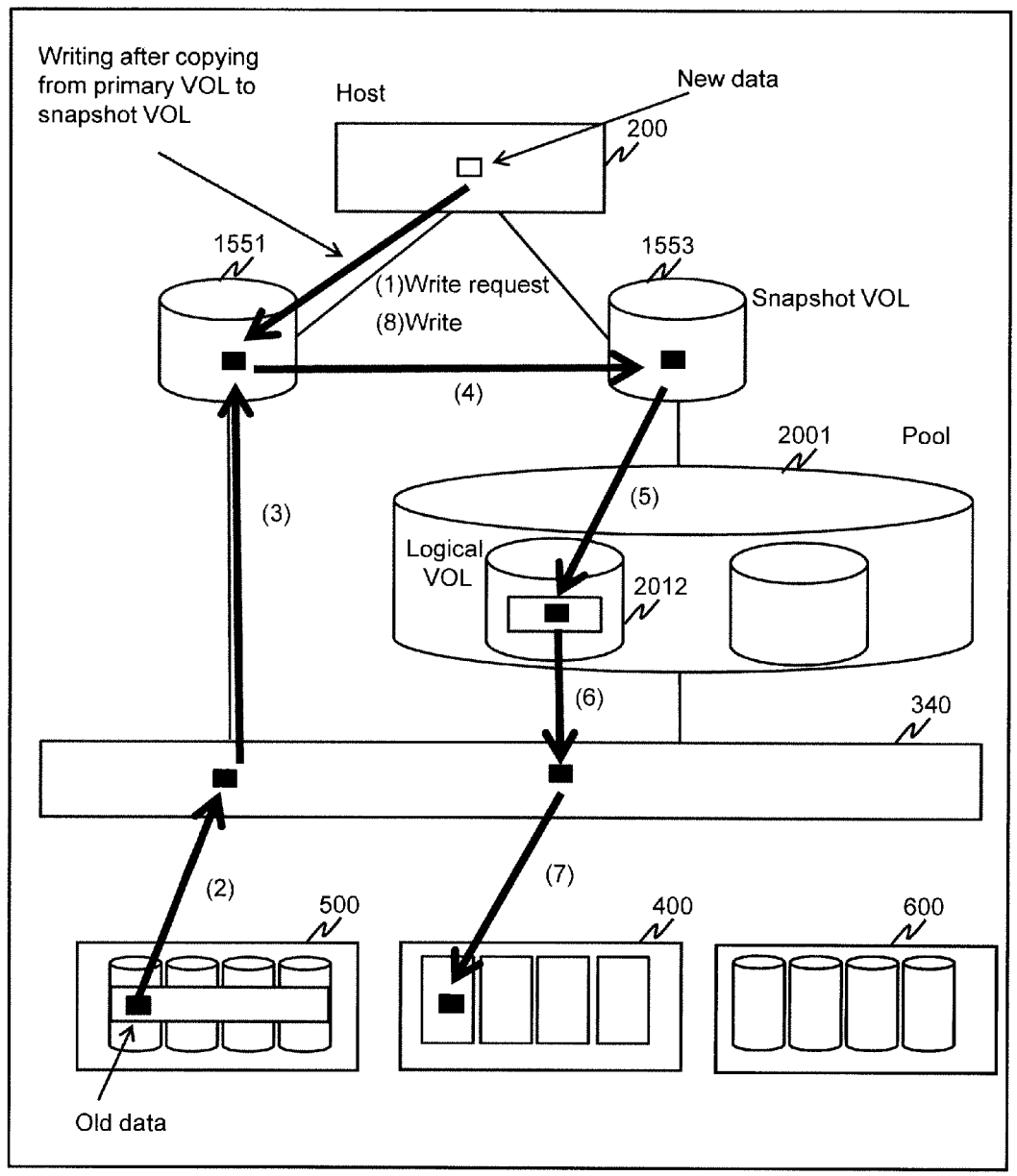
FIG. 21 is a diagram for illustrating another example of the snapshot creation process according to the embodiment.

FIG. 21 is a diagram for illustrating another example of the snapshot creation process according to the embodiment.

In (5) shown in FIG. 20, the RAID controller 301 allocates a new extent from the pool 2001 to the copy-destination region of the snapshot VOL 1553, and writes the old data to this extent ((5) in FIG. 21).

Figure 22:
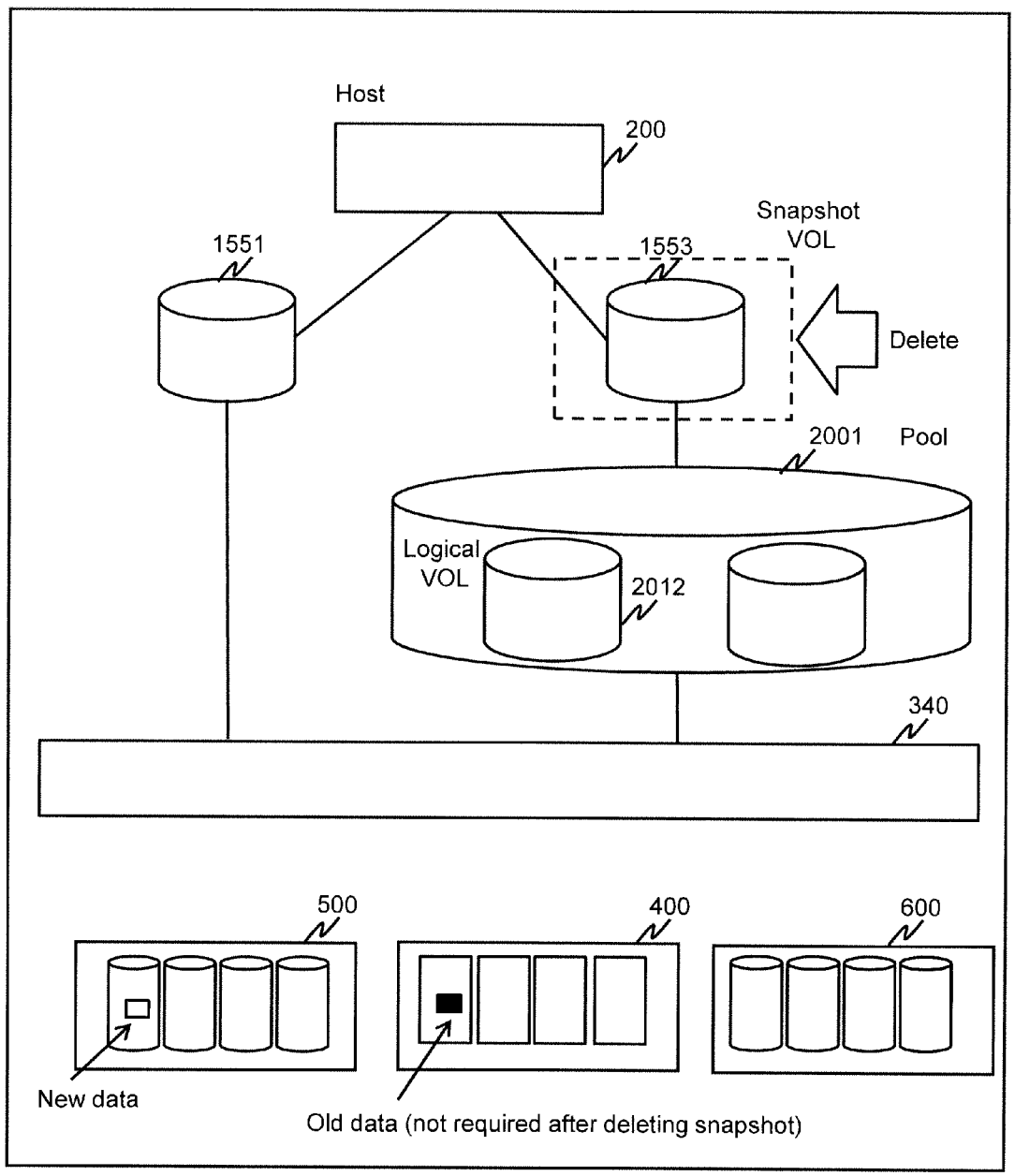
FIG. 22 is a diagram for illustrating unnecessary data generated upon snapshot deletion according to the embodiment.

FIG. 22 is a diagram for illustrating unnecessary data generated upon snapshot deletion according to the embodiment.

After the snapshot creation process is executed, there is a case where, for example, the storage system 1 receives from the host 200 a request for deleting the snapshot VOL 1553. In such a case, the RAID controller 301 of the storage system 1 deletes the snapshot VOL 1553 that is requested to be deleted.

When deleting the snapshot VOL 1553, information and the like related to the snapshot VOL 1553, which are managed by the RAID controller 301, are deleted.

In this case, the plurality of pages of the SSD 400 in which the old data are stored remain managed as valid pages in which valid data are stored.

Now, in the present embodiment, the fixed-pattern data write process described hereinafter is executed as a method for reducing the number of regions in which unnecessary data are stored.

Figure 23:
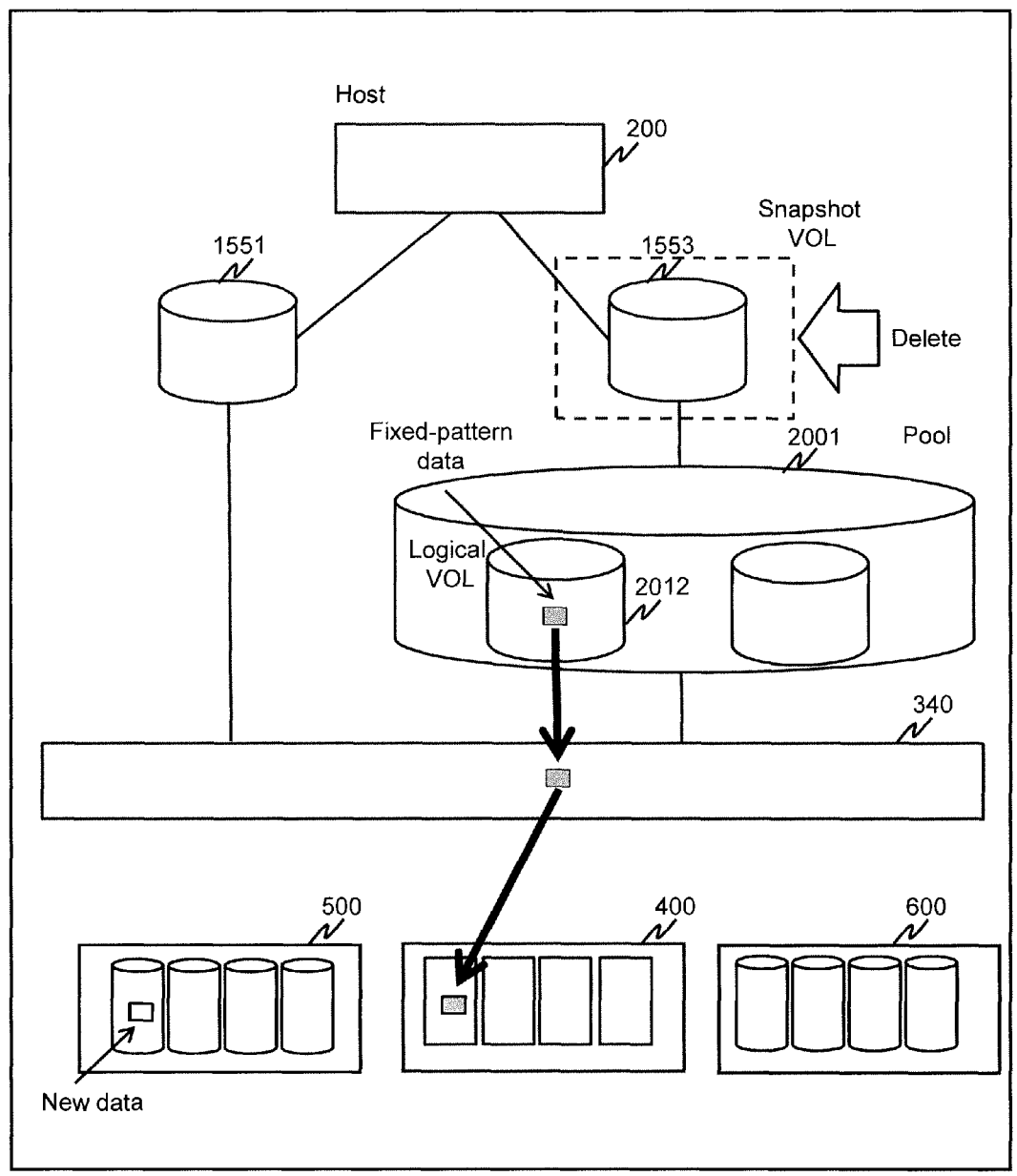
FIG. 23 is a diagram for illustrating the fixed-pattern data write process performed after the snapshot deletion according to the embodiment.

FIG. 23 is a diagram for illustrating the fixed-pattern data write process performed after the snapshot deletion according to the embodiment.

The fixed-pattern data write process shown in FIG. 23, which is performed after the snapshot deletion, is similar to the fixed-pattern data write process shown in FIG. 14, which is performed after the inter-tier dynamic migration, except that a write-destination extent to which the fixed-pattern data is written is taken as the extent allocated to the snapshot VOL 1553.

The fixed-pattern data write process performed after the snapshot deletion is similar to the aforementioned first to fourth examples of the fixed-pattern data write process shown in FIGS. 15 to 18.

In addition, the process using an unmap request, according to a fifth example shown in FIG. 19, may be executed as another method for reducing the number of regions in which unnecessary data are stored.

Next, various tables of the storage system 1 are described in detail.

FIG. 24 shows an example of the logical-physical conversion table according to the embodiment.

The logical-physical conversion table 110 is a table stored in the DRAM 11 of the flash memory package 10, and manages records that have the fields of a logical address 110a, validity 110b, FM number 110c, block number 110d, page number 110e, and data pattern 110f.

Logical addresses are stored in the logical address 110a. In the present embodiment, these logical addresses are the logical addresses of the logical VOLs 2012 of the pool 2001. However, in place of these logical addresses, logical addresses of logical spaces of the SSD 400 that correspond to the logical addresses of the logical VOLs 2012 may be stored in the logical address 110a. The validity of data of a corresponding logical address, which indicates, for example, whether the data is valid (present in the flash memory package 10) or invalid (not present in the flash memory package 10) is stored in the validity 110b. The number of the FM chip 32 (FM number) having the data of the corresponding logical address stored therein is stored in the FM number 110c. The number of a block (block number) in the FM chip 32 that has the data of the corresponding logical address stored therein is stored in the block number 110d. The number of a page (page number) in the block that has the data of the corresponding logical address stored therein is stored in the page number 110e.

The data pattern 110f is a field that is used when data is not actually written to a corresponding page in the fixed-pattern data write process, which is, in other words, a field that is used when the second and fourth examples of the fixed-pattern data write process shown in FIGS. 16 and 18 are executed. The data pattern 110f may not be provided in other cases. A data pattern that is used for specifying the data of a corresponding logical address, or a NULL indicating that there are no data patterns stored, is stored in the data pattern 110f. When a data pattern is stored, the data of the corresponding logical address can be generated based on this data pattern. The size of the generated data is an integral multiple of (N times greater than (where N is an integer of 2 or more)) the size of the data pattern.

According to the record showing "0x10000000" as the logical address 110a in the logical-physical conversion table 110, data of this logical address is stored in a page #0 of a block #0 of an FM chip #0, and a data pattern is not stored for this logical address.

The records showing "0x20000000," "0x20002000," and "0x20004000" as the logical address 110a show the states of corresponding logical addresses that are obtained, for example, after the execution of the second or fourth example of the fixed-pattern data write process (FIG. 16 or FIG. 18). A page #0 of a block #0 of an FM chip #1 corresponds a region indicated by each of the logical addresses, and the data pattern of each of the logical addresses is "0." Therefore, it is clear that all bits of the data corresponding to each of the logical address is "0."

Figure 25:
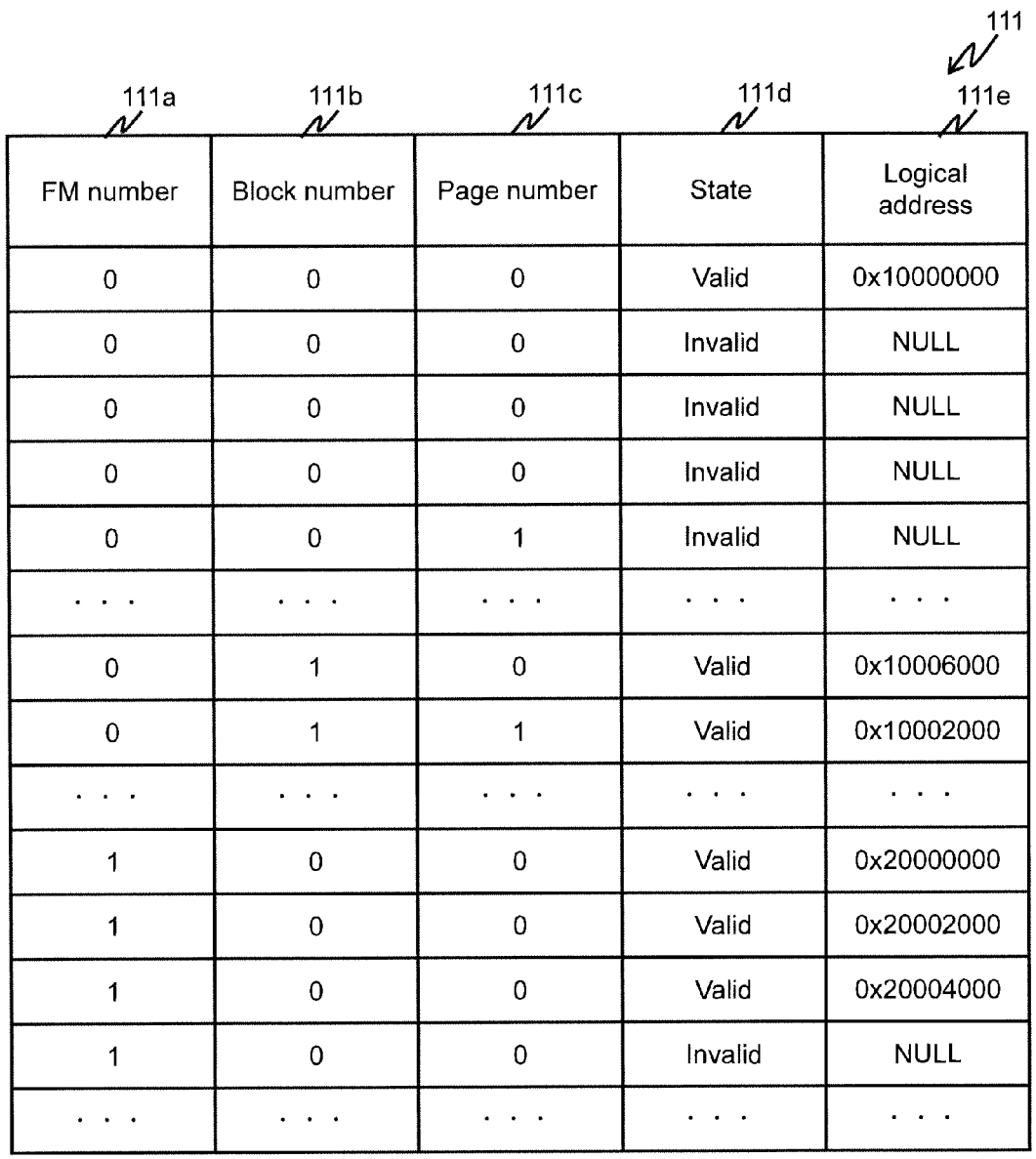
FIG. 25 shows an example of a physical-logical conversion table according to the embodiment.

FIG. 25 shows an example of the physical-logical conversion table according to the embodiment.

The physical-logical conversion table 111 is a table stored in the DRAM 11 of the flash memory package 10, and manages records that have the fields of an FM number 111a, block number 111b, page number 111c, state 111d, and logical address 111e.

The FM number of each FM chip 32 is stored in the FM number 111a. The number of a block in the FM chip 32 is stored in the block number 111b. The number of a page in a corresponding block is stored in the page number 111c. The state of a corresponding page is stored in the state 111d. The state of a page can be "valid," which indicates that the data corresponding to a logical address is stored, "invalid," which indicates that the data corresponding to a logical address is not stored, meaning that unnecessary data is stored, and "blank," which indicates that no data are stored. The logical addresses of the logical VOLs 2012 of the pool 2001, which corresponds to the data stored in the corresponding pages, are stored in the logical address 111e.

In the present embodiment, the physical-logical conversion table 111 manages a plurality of (e.g., four in FIG. 25) records for one page. This is because one common page is allocated to a plurality of partial regions that are obtained by dividing a logical region having the write data (a plurality of page sizes) stored therein, with respect to each page size in the fixed-pattern data write process. By managing the records in this manner, a correspondence relationship between one page and a plurality of corresponding partial regions thereof can be managed properly. The number of records provided for one page may be determined based on the multiple of the maximum size of the write data to the page size.

According to the top four records of the physical-logical conversion table 111, a page #0 of a block #0 of an FM chip #0 is valid, and only data of a logical address "0x10000000" is stored therein.

Furthermore, according to the four records with FM chip #1, block #0 and page #0, it can be seen that the data of logical addresses "0x20000000," "0x20002000" and "0x20004000" are stored in the relevant page. For example, in the fixed-pattern data write process (FIGS. 15 to 18), in the case where fixed-pattern data is written, the data are updated to the states shown by these four records. In this manner, in the case of the fixed-pattern data, the number of pages associated with a logical region corresponding to the plurality of page sizes can be reduced to 1.

FIG. 26 shows an example of the pool management table according to the embodiment.

A pool management table 351 is a table stored in, for example, the shared memory 350 of the RAID controller 301, and manages records that have the fields of a pool number 351a, device type 351b, logical VOL number 351c, logical address 351d, physical VOL number 351e, physical address 351f, and state 351g.

The number of a pool (pool number) of the storage system 1 is stored in the pool number 351a. The type of a physical VOL (device type) is stored in the device type 351b. The number of a corresponding logical VOL (logical VOL number) is stored in the logical VOL number 351c. The logical address belonging to the corresponding logical VOL is stored in the logical address 351d. The number of a physical VOL (physical VOL number) that is the basis of a region of the corresponding logical address is stored in the physical VOL number 351e. The address of a corresponding physical VOL (physical address) is stored in the physical address 351f. In the case where the device type corresponds to a device such as the SSD that uses the FM chips, NULL is set in the physical address 351f. The state of the region of the corresponding logical address is stored in the state 351g. The state stored therein can be, for example, "valid," which indicates that the region of the logical address is allocated to a region of a virtual VOL, "blank," which indicates that the region of the logical address is not allocated to the region of the virtual VOL, and the like.

According to the top record of the pool management table 351, the region corresponding to a logical address #0x10000000 of a logical VOL #0x1000 of a pool #0 is based on an SSD #0 and is allocated to the region of the virtual VOL.

FIG. 27 shows an example of the dynamic region allocation table according to the embodiment.

A dynamic region allocation table 352 is a table stored in, for example, the shared memory 350 of the RAID controller 301, and manages records that have the fields of a virtual VOL number 352a, host logical address 352b, state 352c, extent ID 352d, pool number 352e, logical VOL number 352f, and logical address 352g.

The number of a virtual VOL (virtual VOL number) for specifying a virtual VOL is stored in the virtual VOL number 352a. The logical address that belongs to the virtual VOL and can be recognized by the host (host logical address) is stored in the host logical address 352b. The state 352c has stored therein information indicating whether or not a region of a logical VOL is allocated to a region of a corresponding virtual VOL indicated by the host logical address. For instance, in the case where the region of the logical VOL is allocated to the region of the corresponding virtual VOL indicated by the host logical address, "allocated" is set. In the case where the region of the logical VOL is not allocated, "unallocated" is set. The ID of an extent is stored in the extent ID 352d. The pool number of a pool is stored in the pool number 352e. The logical VOL number of a logical VOL is stored in the logical VOL number 352f. The address of a region of a logical VOL (logical address) is stored in the logical address 352g.

According to the top record of the dynamic region allocation table 352, an extent #0 (the region indicated by the logical address #0x10000000" of the logical VOL #0x1000 of the pool #0) is already allocated to the region corresponding to a host logical address "0x00000000" of a virtual VOL "0x0000."

FIG. 28 shows an example of the dynamic extent region allocation table according to the embodiment.

A dynamic extent region allocation management table 353 is a table stored in, for example, the shared memory 350 of the RAID controller 301 and used in the case where an extent, a region larger than write data from the host 200, is allocated to a region for storing the write data from the host 200.

The dynamic extent region allocation management table 353 manages records that have the fields of a virtual VOL number 353a, host logical address 353b, state 353c, extent ID 353d, pool number 353e, logical VOL number 353f, and logical address 353g.

The virtual VOL number for specifying a virtual volume is stored in the virtual VOL number 353a. The host logical address belonging to the virtual volume, which can be recognized by the host, is stored in the host logical address 353b. The state 353c has stored therein information indicating whether or not a region of a logical volume is allocated to a region of a corresponding virtual volume indicated by the host logical address. For instance, in the case where the region of the logical volume is allocated to the region of the corresponding virtual volume indicated by the host logical address, "allocated" is set to the state 353c. In the case where the region of the logical volume is not allocated, "unallocated" is set to the state 353c. The ID of an extent allocated to a corresponding region is stored in the extent ID 353d. The pool number of a pool allocated to the corresponding region is stored in the pool number 353e. The logical VOL number of a logical volume allocated to the corresponding region is stored in the logical VOL number 353f. The logical address of the logical volume allocated to the corresponding region is stored in the logical address 353g.

According to the top record of the dynamic extent region allocation management table 353, the extent #0 (the region indicated by the logical address #0x10000000" of the logical VOL #0x1000 of the pool #0) is already allocated to the region corresponding to the host logical address "0x00000000" of the virtual VOL "0x0000."

When allocating a region using the dynamic extent region allocation management table 353, in the case of the virtual VOL number "0x0000" and host logical address "0x00002000," the RAID controller refers to the record showing virtual VOL number "0x0000" and host logical address "0x00000000," and determines a logical VOL having pool number "0" and logical VOL number "0x0000" as a destination of allocation. The RAID controller further determines, as a logical address of a logical volume to be allocated to a region corresponding to a virtual volume, an address "0x10002000" that is obtained by adding "0x00002000," which is a difference between the allocation target host logical address "0x00002000" and the host logical address "0x00000000" of the record, to the logical address "0x10000000" of the record.

FIG. 29 shows an example of the access frequency table according to the embodiment.

An access frequency table 354 is a table stored in, for example, the shared memory 350 of the RAID controller 301, and manages records that have the fields of a virtual VOL number 354a, host logical address 354b, current device type 354c, and access frequency 354d.

The virtual VOL number for specifying a virtual volume is stored in the virtual VOL number 354a. The host logical address belonging to the virtual volume, which can be recognized by the host, is stored in the host logical address 354b.

The device type of a storage region that is currently allocated to a region of a corresponding host logical address is stored in the current device type 354c. Information on the frequency of access to the region of the corresponding host logical address is stored in the access frequency 354d. In the present embodiment, the information on access frequency is set as "high," "medium," and "low," in descending order of access frequency. In the present embodiment, in the case where the access frequency is "high," data needs to be moved to a tier configured by the extent of the SSD 400, and in the case where the access frequency is "medium," data needs to be moved to a tier configured by the extent of the HDD (SAS) 500. In the case where the access frequency is "low," data needs to be moved to a tier configured by the extent of the HDD (SATA) 600. Note that in the access frequency table 354, on top of the access frequency or in place of the access frequency, the RAID controller may manage a last access time and/or a data storage time and determine which one of these values and which data of the extents to move to an extent of a certain tier.

According to the top record of the access frequency table 354, a region of a current SSD device is allocated to the region corresponding to the virtual VOL number "0x0000" and the host logical address "0x00000000," and the frequency of access to this region is "low."

Figure 30:
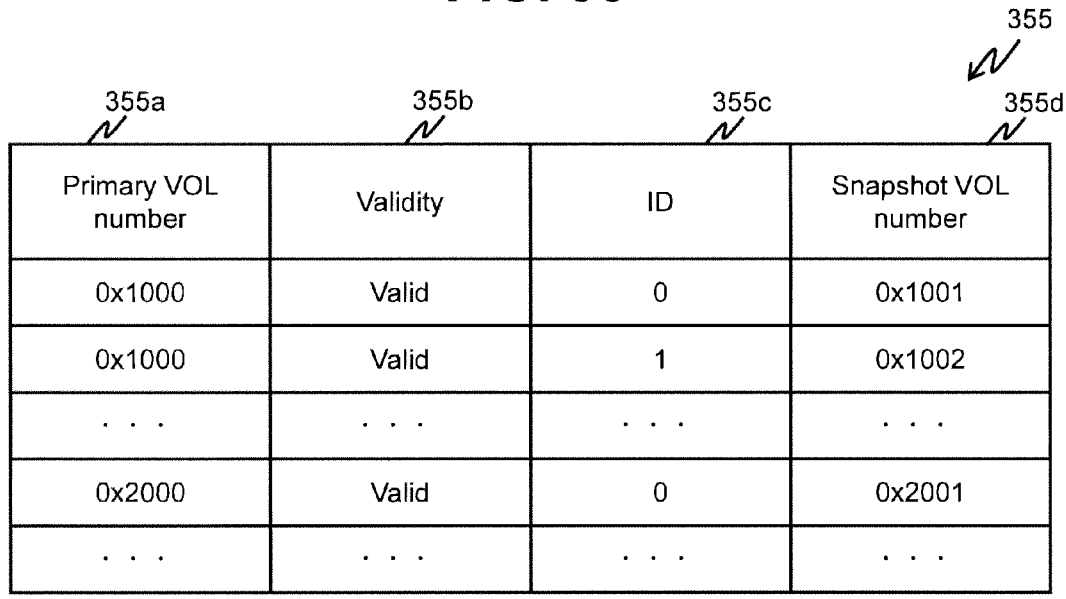
FIG. 30 shows an example of a pair management table according to the embodiment.

FIG. 30 shows an example of the pair management table according to the embodiment.

A pair management table 355 is a table stored in, for example, the shared memory 350 of the RAID controller 301, and manages records that have the fields of a primary VOL number 355*a*, validity 355*b*, ID 355*c*, and snapshot VOL number 355*d*.

The number of a primary VOL (primary VOL number) for creating a snapshot is stored in the primary VOL number 355*a*. The validity indicating whether a copy of a corresponding record is valid or not is stored in the validity 355*b*. The number (ID) for identifying a snapshot is stored in the ID 355*c*. A plurality of snapshots can be created based on the same primary volume, and the snapshots (generations of the snapshots) can be identified based on the numbers. The numbers may be equivalent to, for example, the values of the generations. The number of a snapshot VOL (snapshot VOL number) is stored in the snapshot VOL number 355*d*.

According to the top record of the pair management table 355, a snapshot for primary VOL number "0x1000" is stored in a virtual volume corresponding to snapshot VOL number "0x1001," and the number of this snapshot is "0," which means that this snapshot is valid.

FIG. 31 shows an example of the snapshot data allocation table according to the embodiment.

A snapshot data allocation table 356 is a table stored in, for example, the shared memory 350 of the RAID controller 301, and manages records that have the fields of a snapshot VOL number 356*a*, host logical address 356*b*, state 356*c*, pool number 356*d*, logical VOL number 356*e*, and logical address 356*f*.

The snapshot VOL number of a snapshot volume in which a snapshot is stored is stored in the snapshot VOL number 356*a*. The host logical address belonging to a virtual volume, which can be recognized by the host, is stored in the host logical address 356*b*. The state 356*c* has stored therein information indicating whether or not a logical volume is allocated to a region indicated by a corresponding host logical address. For instance, in the case where a region of a logical volume is allocated to the region of a corresponding virtual volume indicated by the host logical address, "allocated" is set in the state 356*c*. In the case where the region of the logical volume is not allocated, "unallocated" is set. The pool number of a pool allocated to the corresponding region is stored in the pool number 356*d*. The logical VOL number of a logical volume allocated to the corresponding region is stored in the logical VOL number 356*e*. The logical address of the logical volume allocated to the corresponding region is stored in the logical address 356*f*.

Next, processes performed by the storage system according to the present embodiment are described in detail with reference to the flowcharts.

Figure 32:
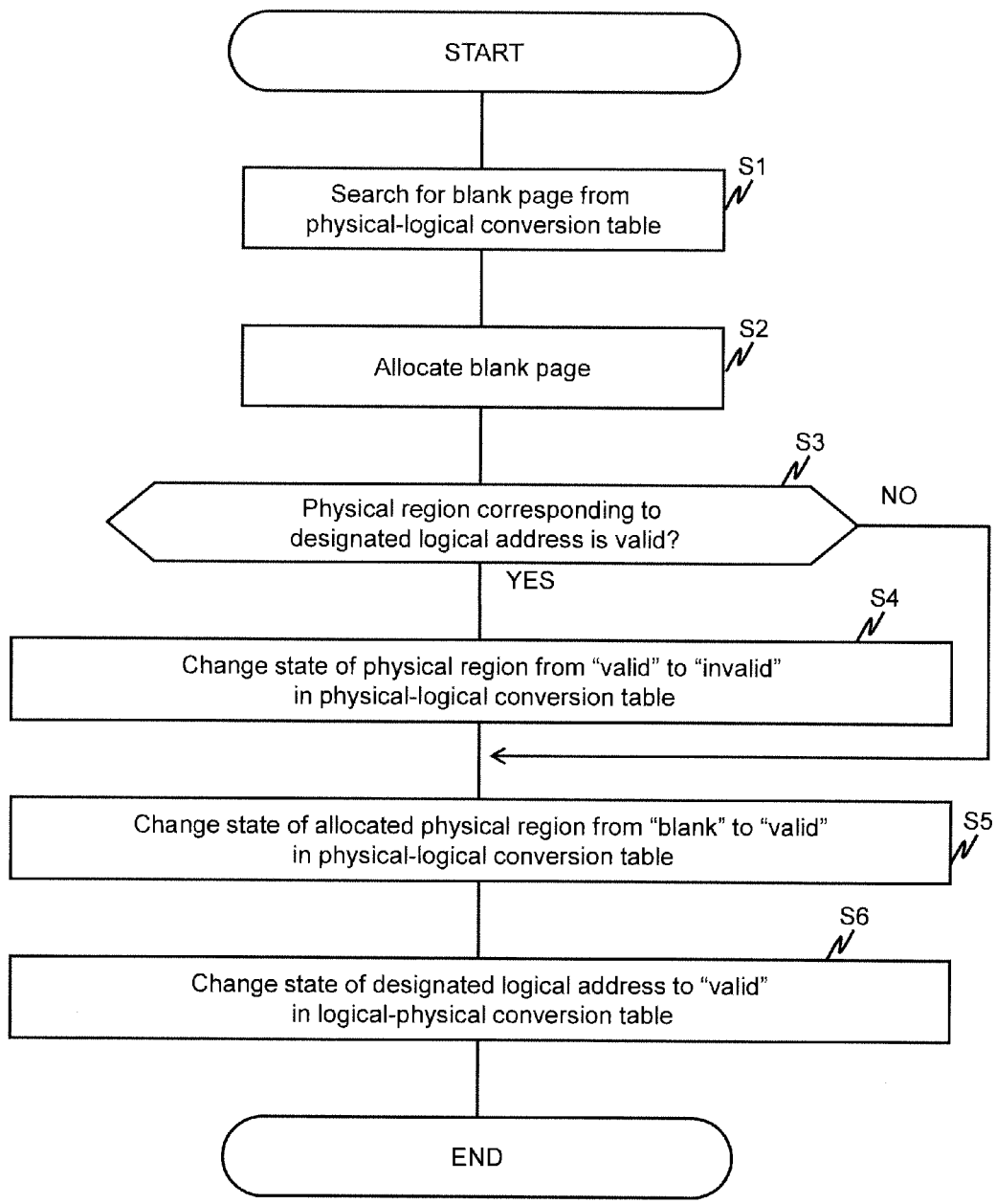
FIG. 32 shows an example of a flowchart of a write process according to the embodiment.

FIG. 32 shows an example of a flowchart of a write process according to the embodiment.

The write process is executed in the case where the FM controller 20 of the flash memory package 10 of the SSD 400 receives from the RAID controller 301 a write request for writing data to a region indicated by a predetermined logical address (referred to as "designated logical address" in the description of FIG. 32).

Once the FM controller 20 receives the write request from the RAID controller 301, the FM controller 20 searches the physical-logical conversion table 111 for blank pages (step S1), allocates any of the blank pages to a page for storing data, stores corresponding data therein, and updates the FM number 110*c*, the block number 110*d*, and the page number 110*e* of the records corresponding to the designated logical address in the logical-physical conversion table 110, to values corresponding to the allocated page (step S2). Subsequently, the FM controller 20 refers to the physical-logical conversion table 111 to determine whether the state 111*d* of the record in which the value of the logical address 111*e* indicates the designated logical address, is "valid" or not (step S3).

In the case where the state is "valid" (YES in step S3), the data of the page (physical region) shown by the record is data obtained prior to rewriting (old data) and hence invalid data. Therefore, the FM controller 20 changes the state 111*d* of the corresponding record from "valid" to "invalid" (step S4), and advances the process to step S5. As a result, the page storing the data of the designated logical address is managed as an invalid page. In the case where the state is not "valid" (NO in step S3), the FM controller 20 advances the process to step S5.

In step S5, the FM controller 20 changes the state 111*d* of the record in the physical-logical conversion table 111, which corresponds to the page allocated in step S2, from "blank" to "valid" (step S5), changes the validity 110*b* of the record in the logical-physical conversion table 110, which corresponds to the designated logical address, to "valid," and then ends the process.

Next is described a block erase process for erasing data of a block in the FM chip 32 of the SSD 400.

Figure 33:
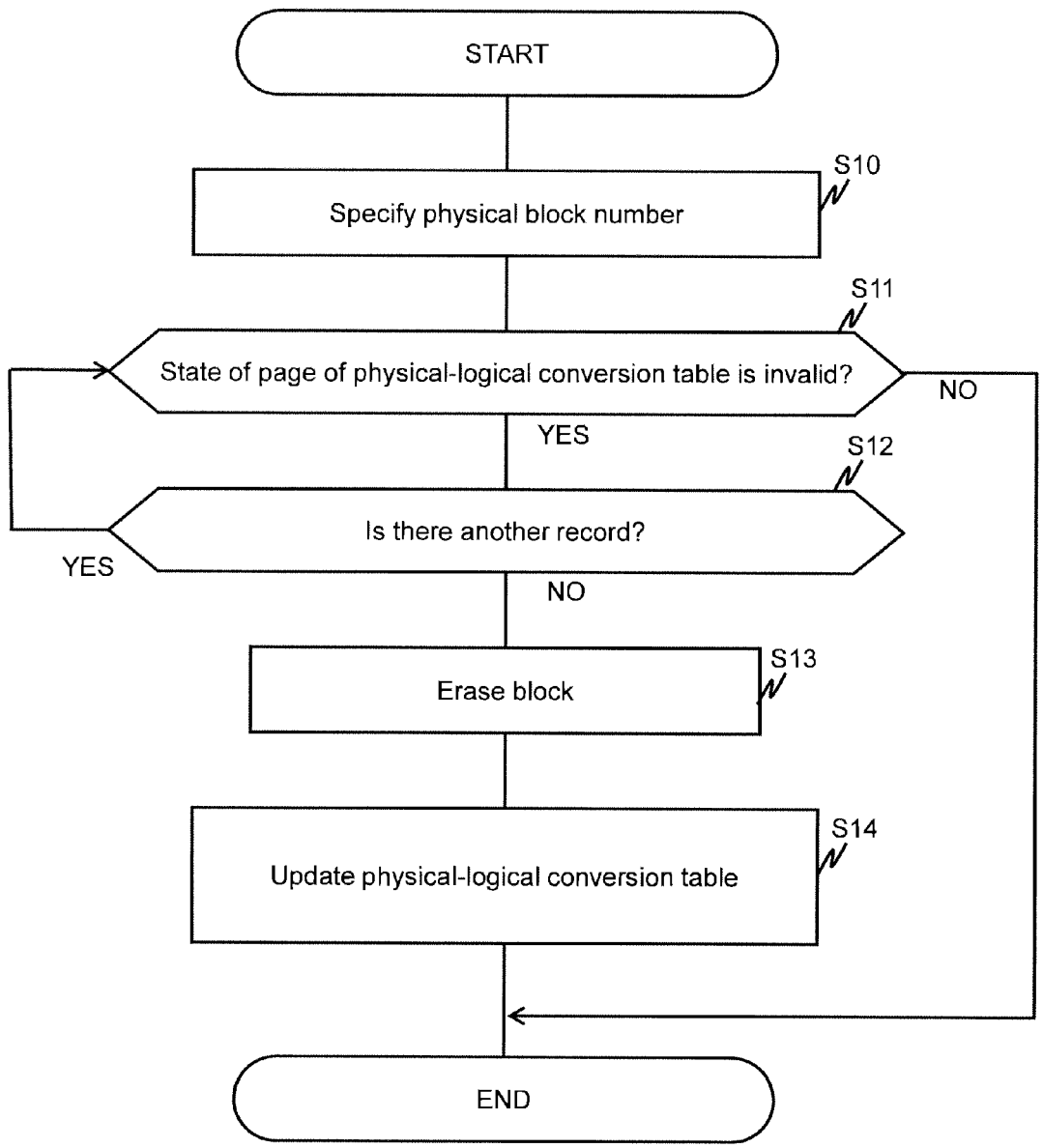
FIG. 33 shows an example of a flowchart of a block erase process according to the embodiment.

FIG. 33 shows an example of a flowchart of the block erase process according to the embodiment.

The block erase process is executed by the FM controller 20 when, for example, the FM controller 20 detects the depletion of a capacity available in the FM chip 32. Depletion of a capacity means that the number of empty blocks becomes less than a predetermined ratio (predetermined number). The capacity depletion may be detected by any unit. Furthermore, the block erase process may be executed on a regular basis by the FM controller 20 every predetermined time interval.

The FM controller 20 specifies a physical block number to be processed (step S10). The physical block number to be processed may be the number of a block following a block subjected to a previous block erase process.

Next, the FM controller 20 refers to the record corresponding to the specified physical block number in the physical-logical conversion table 111, to determine whether the state 111*d* of the record is invalid or not, or, in other words, whether the corresponding page is invalid or not (step S11). In the case where the corresponding page is not invalid (NO in step S11), it means that a valid page exists in the block and that therefore the block cannot be erased. Thus, the FM controller 20 ends the block erase process.

On the other hand, in the case where the corresponding page is invalid (YES in step S11), the FM controller 20 determines whether or not there exists a subsequent record corresponding to the block (step S12).

As a result of the determination, in the case where there exists a subsequent record corresponding to the block (YES in step S12), the state of the same page or the subsequent page needs to be confirmed. Therefore, the FM controller 20 advances the process to step S11. On the other hand, in the case where there does not exist any subsequent record corresponding to the block (NO in step S12), it means that all of the pages of the block are invalid. Thus, the FM controller 20 erases the data of the block (step S13).

The FM controller 20 then updates the physical-logical conversion table 111 (step S14) and ends the process. More specifically, the FM controller 20 changes the states 111d on the physical-logical conversion table 111 that correspond to the records of all of the pages of the block from which the data are erased, to "blank." Consequently, the free capacity of the FM chip 32 can be increased.

Next is described a reclamation process, a process for generating a block that can be subjected to the erase process.

Figure 34:
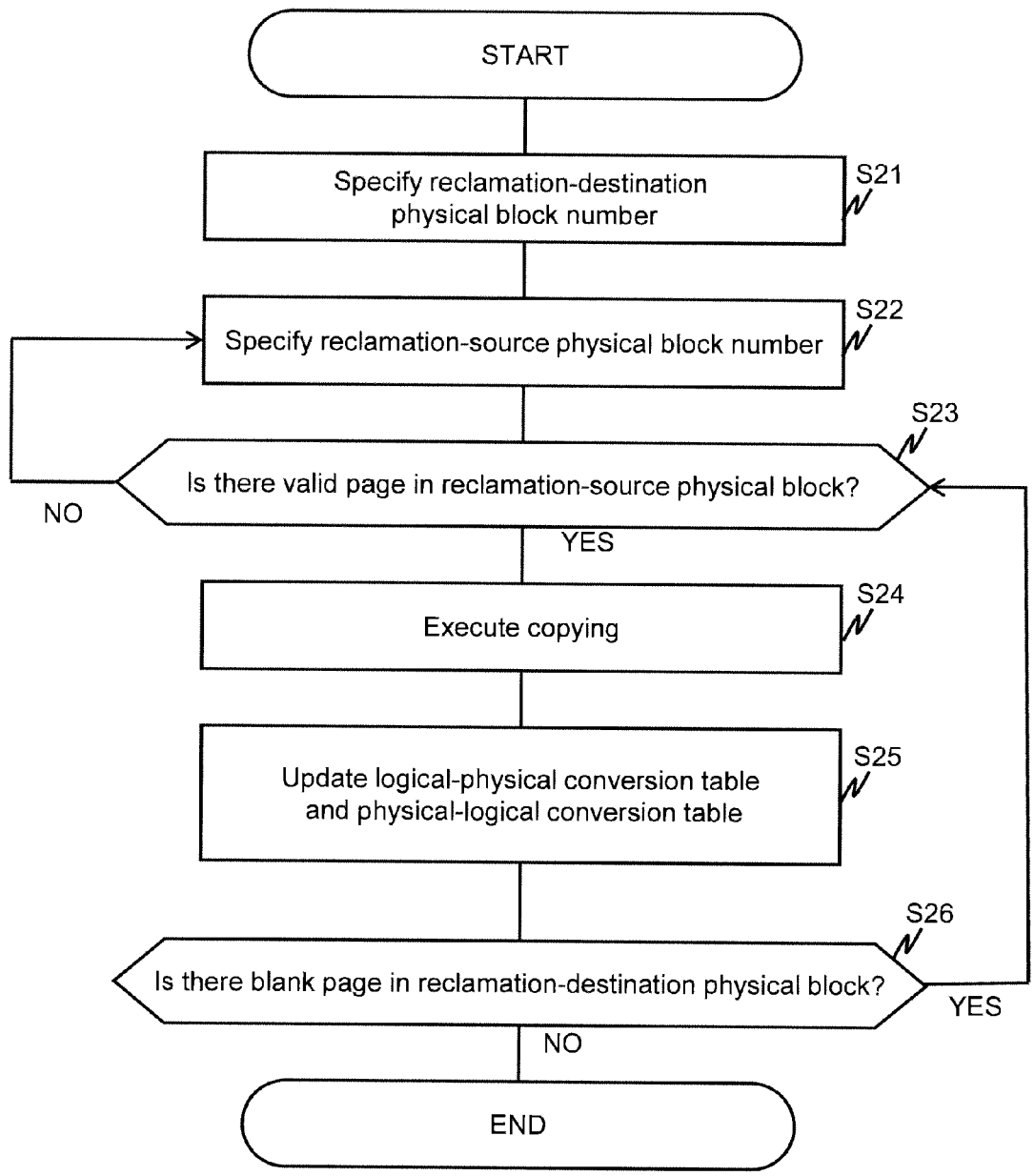
FIG. 34 shows an example of a flowchart of the reclamation according to the embodiment.

FIG. 34 shows an example of a flowchart of the reclamation according to the embodiment.

Reclamation is executed by the FM controller 20 when, for example, the FM controller 20 detects the depletion of a capacity available in the FM chip 32. Depletion of a capacity means that the number of empty blocks becomes less than a predetermined ratio (predetermined number). The capacity depletion may be detected by any unit. Furthermore, the reclamation may be executed on a regular basis by the FM controller 20 every predetermined time interval.

The FM controller 20 specifies a physical block number of a destination block (also referred to as "reclamation-destination block") to which a valid page is to be stored (step S21). The reclamation-destination block may be, for example, a block with no invalid pages and many blank pages.

Next, the FM controller 20 specifies a physical block number of a source block (also referred to as "reclamation-source block") from which the valid page is moved (step S22). The reclamation-source block may be, for example, a block with no blank pages and with a predetermined number or few valid pages.

The FM controller 20 then determines whether the reclamation-source block has a valid page or not (step S23). When there are no valid pages as a result of the determination (NO in step S23), the FM controller 20 advances the process to step S22.

When, on the other hand, the reclamation-source block has a valid page (YES in step S23), the FM controller 20 copies the data stored in this valid page (copy-source page) to a page of the reclamation-destination block (copy-destination page) (step S24), and updates the logical-physical conversion table 110 and the physical-logical conversion table 111 (step S25). More specifically, the FM controller 20 sets the state 111d on the physical-logical conversion table 111 that corresponds to the record of the copy-source page to "invalid," its logical address 111e to "NULL," the state 111d of the record corresponding to the copy-destination page to "valid," and its logical address 111e to a logical address stored in the logical address 111e of the copy source. The FM controller 20 further sets the FM number, the block number, and the page number of the copy-destination page with respect to the records with a set copy-source page on the logical-physical conversion table 110.

Subsequently, the FM controller 20 determines whether the reclamation-destination block has a blank page or not (step S26). In the case where the reclamation-destination block has a blank page (YES in step S26), the FM controller 20 advances the process to step S23. In the case where the reclamation-destination block has no blank pages (NO in step S26), the FM controller 20 ends the reclamation process.

This reclamation process can generate a block in which all of the pages are invalid, and the block erase process can change the block into an empty block and increase the free capacity of the FM chip.

Next, the dynamic region allocation process is described in detail. The dynamic region allocation process is the process shown in FIG. 11.

Figure 35:
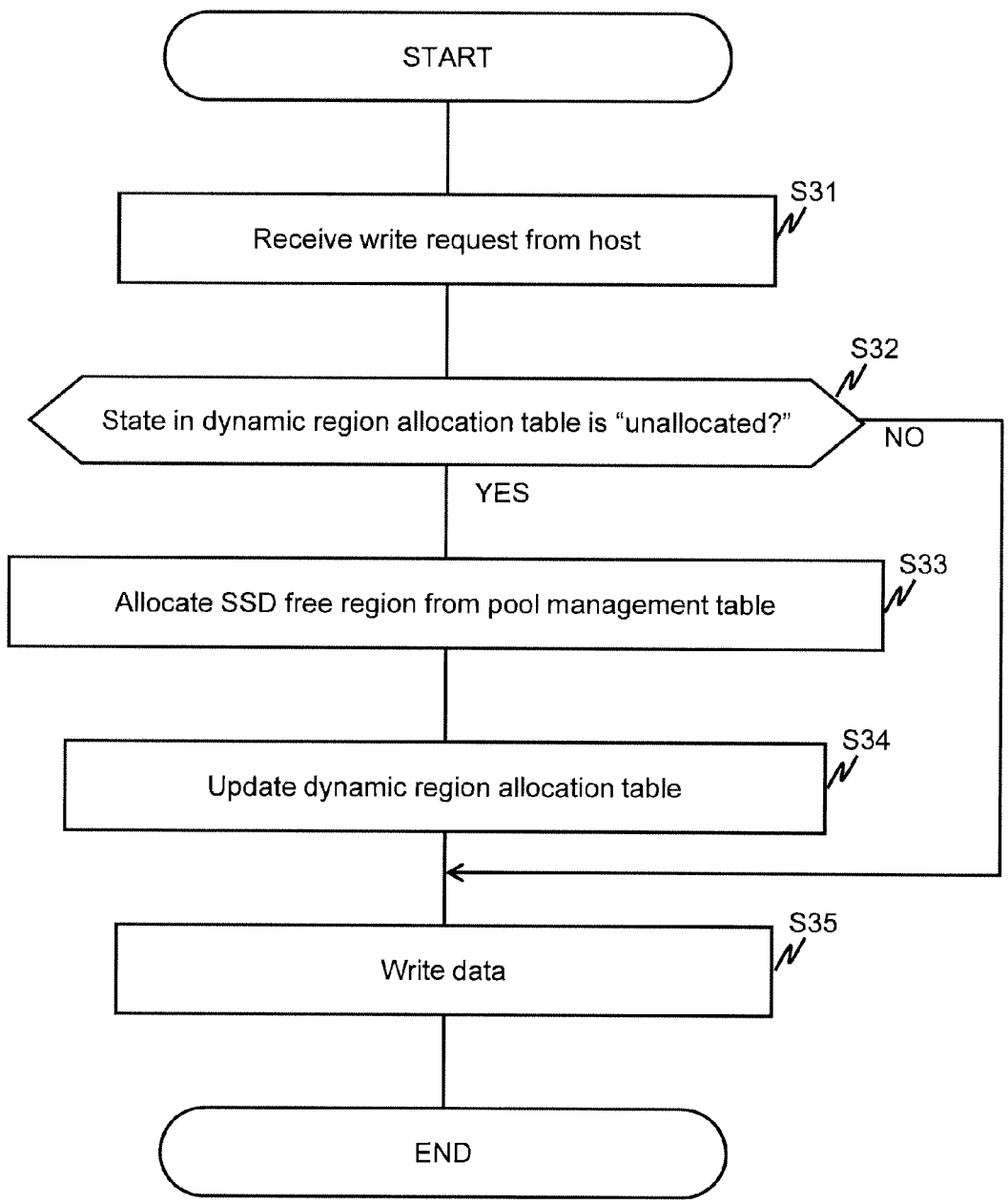
FIG. 35 shows an example of a flowchart of the dynamic region allocation process according to the embodiment.

FIG. 35 shows an example of a flowchart of the dynamic region allocation process according to the embodiment.

Once the RAID controller 301 receives from the host 200 a write request for writing data (write data) (step S31), the RAID controller 301 determines whether the state 352c of the record corresponding to the host logical address of the virtual VOL number designated based on the write request in the dynamic region allocation table 352, is "unallocated" or not. In other words, the RAID controller 301 determines whether an extent is allocated to the corresponding region or not (step S32).

In the case where the state 352c of the record does not indicate "unallocated" (NO in step S32), it means that an extent is allocated to the region. Therefore, the RAID controller 301 advances the process to step S35.

In the case where the state 352c of the record indicates "unallocated" (YES in step S32), it means that no extents are allocated to the region. Therefore, the RAID controller 301 specifies, from the pool management table 351, a record that shows that the device type 351b is the SSD and that the state 351g is "blank." The RAID controller 301 also allocates, as the write-destination extent, an extent corresponding to the logical address shown by the logical address 351d, the extent belonging to the logical volume having the logical VOL number shown by the logical VOL number 351c of the record (step S33), and updates the dynamic region allocation table 352 based on the allocation (step S34). More specifically, the RAID controller 301 sets values corresponding to the allocated extent, in the pool number 352e, the logical volume number 352f, and the logical address 352g of the record on the dynamic region allocation table 352, and sets the state 352c to "allocated." The RAID controller 301 thereafter advances the process to step S35.

In step S35, the RAID controller 301 designates the logical VOL number and the logical address that indicate the allocated extent, and transmits to the FM controller 20 a write request for writing the write data into the SSD 400, and thereby writes the data into the SSD 400 (step S35). Note that the FM controller 20 of the SSD 400 executes the write process shown in FIG. 32 upon reception of the write request.

Next, the dynamic extent region allocation process is described in detail. The dynamic extent allocation process is the process shown in FIG. 12.

Figure 36:
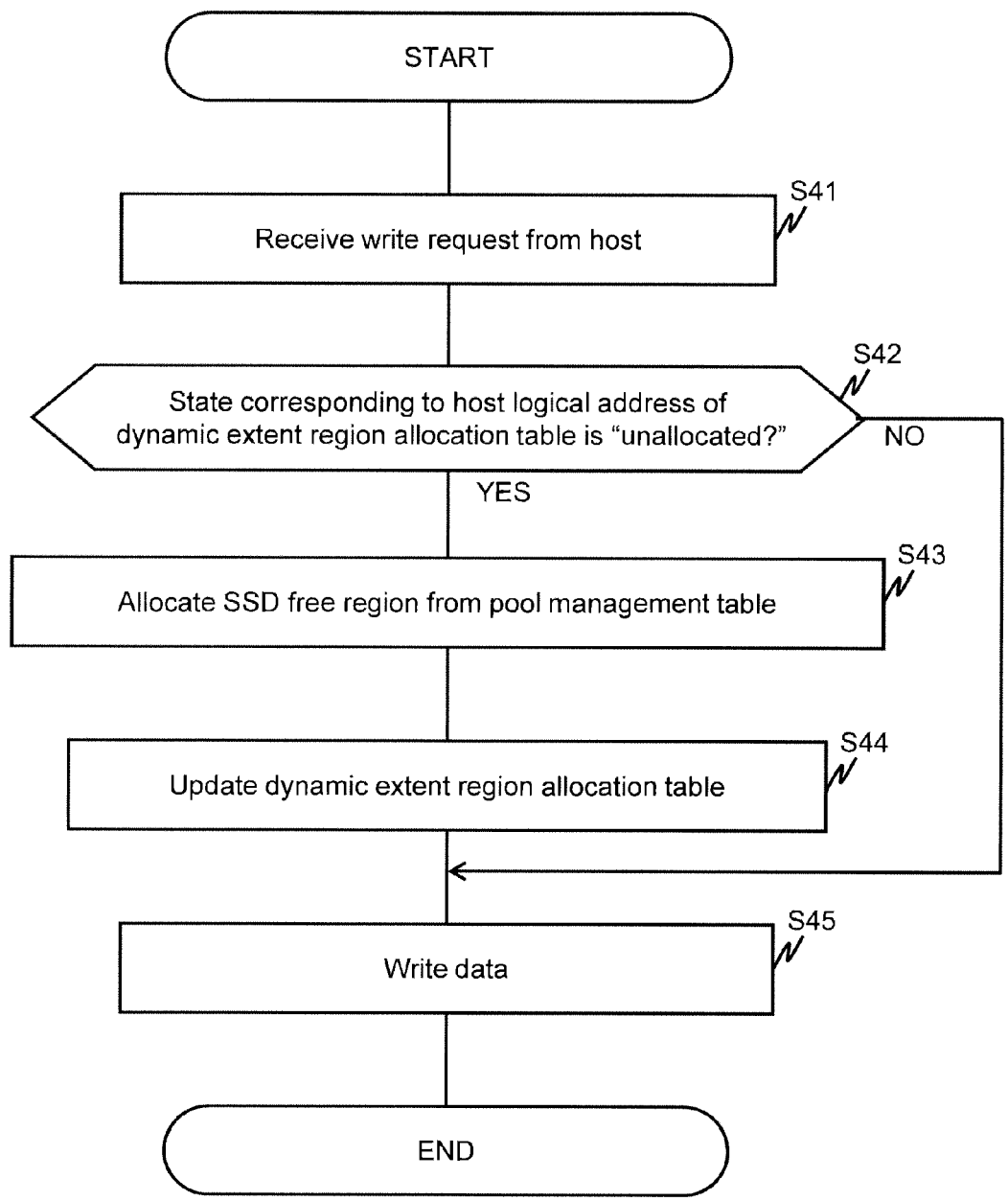
FIG. 36 shows an example of a flowchart of the dynamic extent region allocation process according to the embodiment.

FIG. 36 shows an example of a flowchart of the dynamic extent region allocation process according to the embodiment.

Once the RAID controller 301 receives from the host 200 a write request for writing data (write data) (step S41), the RAID controller 301 refers to the dynamic extent region allocation table 353 to determine whether the state 353c corresponding to the write-destination region indicates "unallocated" or not. In other words, the RAID controller 301 determines whether an extent is allocated to the write-destination region or not (step S42).

In the case where the state 353c of the record does not indicate "unallocated" (NO in step S42), it means that an extent is allocated to the write-destination region. Therefore, the RAID controller 301 advances the process to step S45.

On the other hand, in the case where the state 353c of the record indicates "unallocated" (YES in step S42), it means that no extents are allocated to the write-destination region. Therefore, the RAID controller 301 specifies, from the pool management table 351, a plurality of records that show that the device type 351b is the SSD and that the state 351g is "blank." The RAID controller 301 also allocates extents corresponding to the logical addresses shown by the logical address 351d, the extents belonging to the logical volumes having the logical VOL numbers shown by the logical VOL number 351c of the records (step S43), and updates the dynamic extent region allocation table 353 based on the allocation (step S44). More specifically, the RAID controller 301 sets values corresponding to the allocated extents, in the pool number 353e, the logical volume number 353f, and the logical address 353g of the records on the dynamic extent region allocation table 353, and sets the state 353c to "allocated." The RAID controller 301 thereafter advances the process to step S45.

In step S45, the RAID controller 301 designates the logical VOL numbers and the logical addresses corresponding to the logical addresses of the virtual VOL numbers, which indicate the allocated extents, and transmits to the FM controller 20 a write request for writing the write data into the SSD 400, and thereby writes the data into the SSD 400 (step S45). For example, in the case where the virtual VOL number is "0x0000" and the host logical address is "0x00002000," the RAID controller 301 refers to the record showing virtual VOL number "0x0000" and host logical address "0x00000000," and determines the logical volume with pool number "0" and logical VOL number "0x0000" as a destination of allocation. The RAID controller 301 also determines the address "0x10002000", which is obtained by adding a difference "0x00002000" between the host logical address "0x00002000" to be allocated and the host logical address "0x00000000" of the record to the logical address "0x10000000" of the record, as the logical address of the logical volume allocated to the virtual volume. Note that the FM controller 20 of the SSD 400 executes the write process shown in FIG. 32 upon reception of the write request.

Next, the inter-tier dynamic migration is described in detail. The inter-tier dynamic migration is the process shown in FIG. 13.

Figure 37:
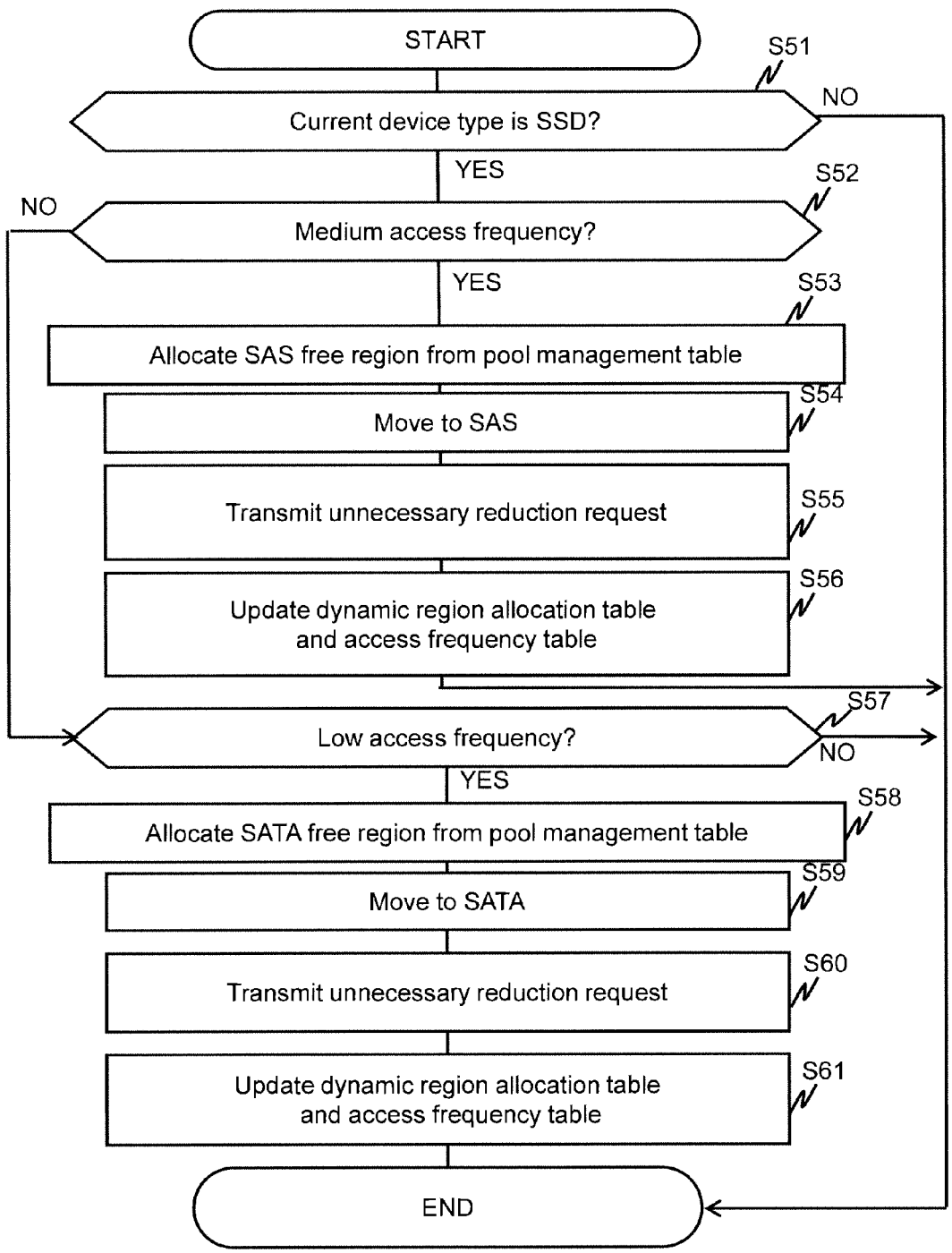
FIG. 37 shows an example of a flowchart of the inter-tier dynamic migration according to the embodiment.

FIG. 37 shows an example of a flowchart of the inter-tier dynamic migration according to the embodiment.

The inter-tier dynamic migration is executed on a regular basis, for example. The RAID controller 301 acquires one record from the access frequency table 354, and determines whether the current device type 354c in which is stored the data of the region of the virtual volume indicated by the record (a target virtual volume region) is the SSD (the device type of the SSD 400) or not (step S51). In the case where the device type is not the SSD (NO in step S51), the RAID controller 301 ends the inter-tier dynamic migration.

On the other hand, in the case where the device type is the SSD (YES in step S51), the RAID controller 301 determines whether the access frequency 354d of the corresponding record indicates "medium" or not (step S52). In the case where the access frequency 354d does not indicate "medium" (NO in step S52), the RAID controller 301 advances the process to step S57.

On the other hand, in the case where the access frequency 354d indicates "medium" (YES in step S52), the RAID controller 301 detects an empty extent of the HDD (SAS) 500 from the pool management table 351, allocates the empty extent as the destination extent (step S53), reads the data corresponding to the target virtual volume region from the SSD 400, and moves the data to the allocated extent of the HDD (SAS) 500 (step S54). Subsequently, the RAID controller 301 transmits an unnecessary reduction request for reducing the number of pages corresponding to an unnecessary region (the source extent, in this example), which is a region in which data unnecessary to the host is stored, to the SSD 400 having a page allocated to the unnecessary region (step S55). The unnecessary reduction request is, for example, a write request for writing the fixed-pattern data or an unmap request. The write request for writing the fixed-pattern data may be a write request that includes the fixed-pattern data of the write data size, or a write request that includes the partial data equivalent to the size of one page in the fixed-pattern data and the size information indicating the size of the fixed-pattern data. In the case where the unnecessary region belongs to a plurality of SSDs 400, the RAID group 301 transmits the unnecessary reduction request to the plurality of SSDs 400. Note that the FM controller 20 receiving the unnecessary reduction request executes any of the processes shown in FIGS. 40 to 44, as will be described hereinafter, and most of the unnecessary data in the flash memory package 10 become invalid data.

Next, the RAID controller 301 updates the dynamic region allocation table 352 and the access frequency table 354 (Step S56). More specifically, the RAID controller 301 sets values corresponding to the region of the HDD (SAS), which is allocated as the destination region, in the pool number 352e, the logical VOL number 352f, and the logical address 352g of the dynamic region allocation table 352, which correspond to the record of the target virtual volume region. The RAID controller 301 also sets "SAS" in the current device type 354c of the access frequency table 354 for the record corresponding to the target virtual volume region. The RAID controller 301 thereafter ends the inter-tier dynamic migration.

In step S57, the RAID controller 301 determines whether the access frequency 354d of the corresponding record indicates "low" or not (step S57). In the case where the access frequency 354d does not indicate "low" (NO in step S57), the RAID controller 301 ends the inter-tier dynamic migration.

On the other hand, in the case where the access frequency 354d indicates "low" (YES in step S57), the RAID controller 301 detects an empty extent of the HDD (SATA) 600 from the pool management table 351, allocates the empty extent as the destination extent (step S58), reads the data corresponding to the target virtual volume region from the SSD 400, and moves the data to the region of the HDD (SATA) 600 which corresponds to the allocated extent (step S59). The RAID controller 301 then transmits the unnecessary reduction request to the SSD 400 that is the basis of the source extent (step S60).

Subsequently, the RAID controller 301 updates the dynamic region allocation table 352 and the access frequency table 354. More specifically, the RAID controller 301 sets values for the region of the HDD (SATA) 600 which is allocated as the destination region, in the pool number 352e, the logical VOL number 352f, and the logical address 352g of the dynamic region allocation table 352 for the record corresponding to the target virtual volume region, and sets "SATA" as the current device type 354c of the access frequency table 354, for the record corresponding to the target virtual volume region. Thereafter, the RAID controller 301 ends the inter-tier dynamic migration.

Next, the snapshot creation process is described in detail. The snapshot creation process is the process shown in FIG. 21.

Figure 38:
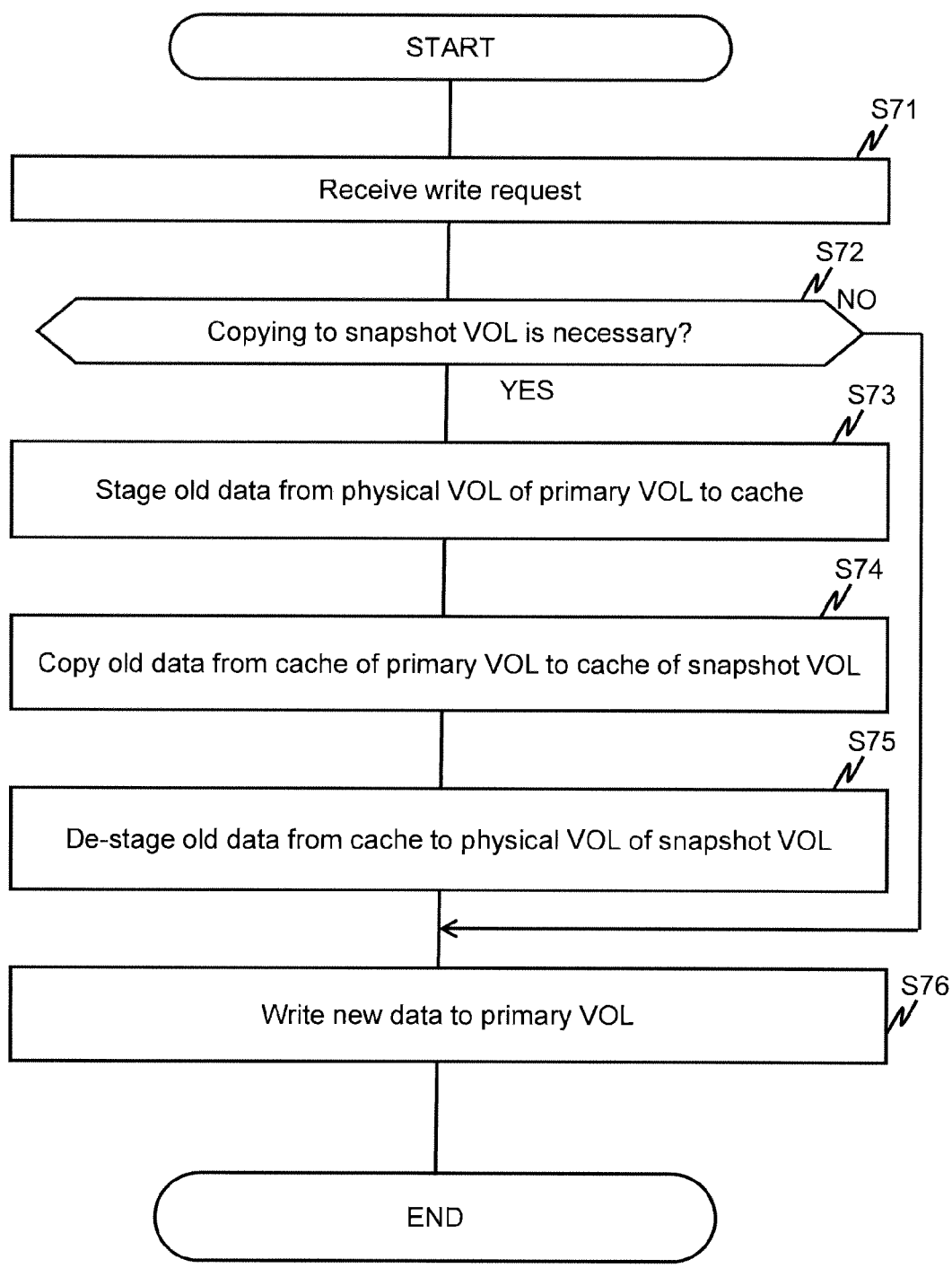
FIG. 38 shows an example of a flowchart of the snapshot creation process according to the embodiment.

FIG. 38 shows an example of a flowchart of the snapshot creation process according to the embodiment.

Upon reception of a write request for data (write data: new data) from the host 200 (step S71), the RAID controller 301 refers to the pair management table 355 to determine whether the virtual VOL number designated by the write request is registered as the primary VOL number 355a or not, and searches for a record showing "valid" as the validity 355b, to determine whether the data needs to be copied to the snapshot volume or not (step S72).

In the case where the data does not need to be copied (NO in step S72), the RAID controller 301 advances the process to step S76. On the other hand, in the case where the data needs to be copied (YES in step S72), the RAID controller 301 stages the stored data (old data) from the region of the SSD 400 to the cache 340, the region corresponding to the extent allocated to the region of the virtual volume (primary volume) designated by the write request (step S73).

The RAID controller 301 then acquires the snapshot VOL number from the record searched from the pair management table 355 in step S72, specifies a snapshot volume, and copies the old data from the primary volume to the snapshot volume between the caches 340 (step S74).

Thereafter, the RAID controller 301 de-stages the old data from the cache 340 to the physical region allocated to the snapshot volume (the storage region of the FM chip 32 of the SSD 400, in this example) (step S75), and advances the process to step S76. In step S76, the RAID controller 301 writes the new data into the region corresponding to the primary volume (step S76), and ends the process.

Next, the snapshot deletion process is described in detail. The snapshot deletion process is the process shown in FIG. 23.

Figure 39:
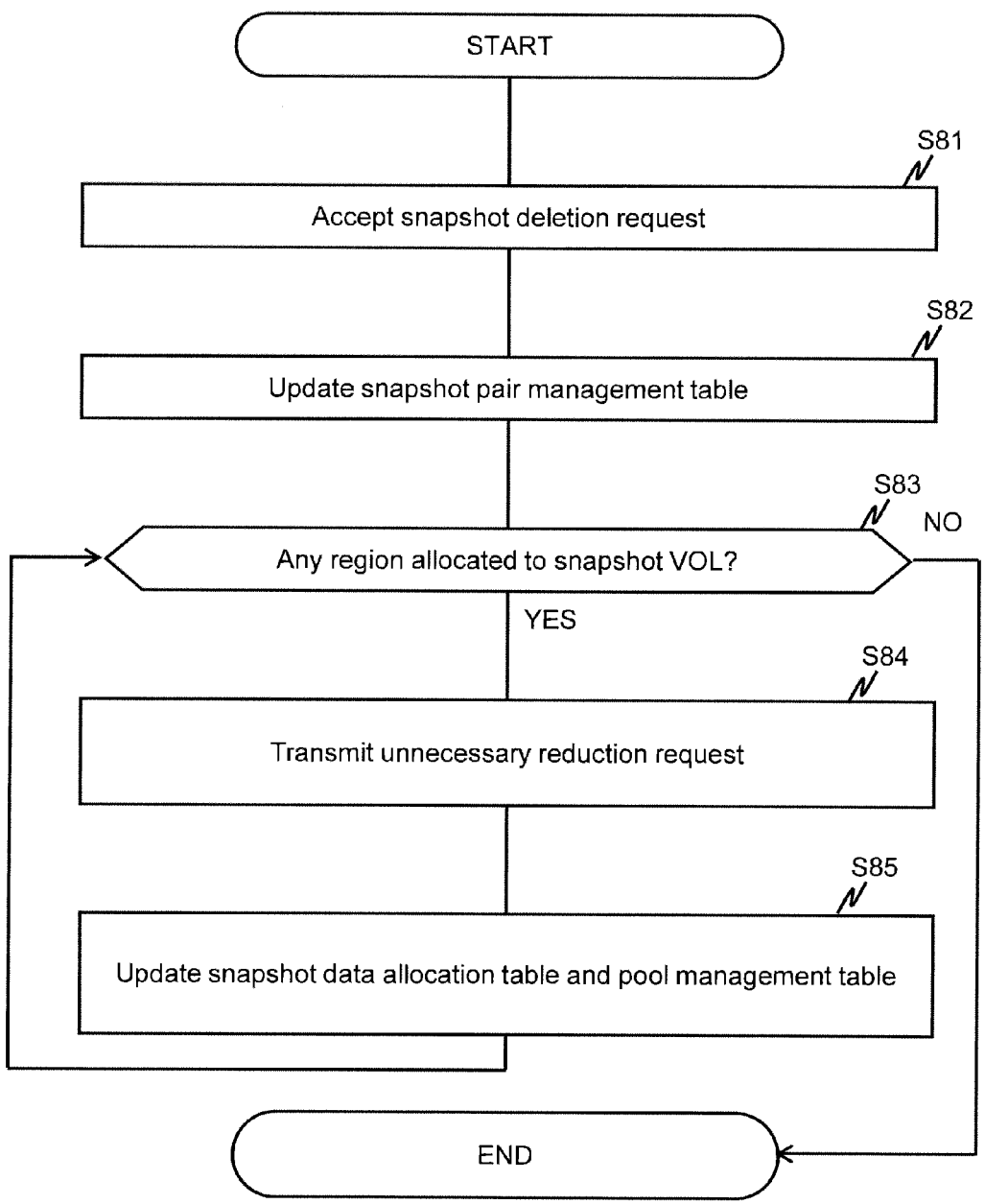
FIG. 39 shows an example of a flowchart of a snapshot deletion process according to the embodiment.

FIG. 39 shows an example of a flowchart of a snapshot deletion process according to the embodiment.

Upon reception of a request for deleting a snapshot, from the host 200 (a snapshot deletion request) (step S81), the RAID controller 301 specifies records corresponding to the pair management table 355 on the basis of the primary VOL number and the ID that are included in the snapshot deletion request, specifies the snapshot VOL numbers, and changes the validity 355b corresponding to each of the records to "invalid" (step S82).

Next, the RAID controller 301 specifies, from the snapshot data allocation table 356, one unprocessed record from among the records having the specified snapshot VOL numbers stored therein, and determines whether or not the state 356c of this record indicates "allocated." In other words, the RAID controller 301 determines whether a region of the pool is allocated to the snapshot volume corresponding to the snapshot VOL number (step S83).

In the case where the region of the pool is not allocated, that is, in the case where the state 356c indicates "unallocated" (NO in step S83), it means that the data of the snapshot volume is not stored in the SSD 400. Therefore, the RAID controller 301 ends the snapshot deletion process.

In the case where the region of the pool is allocated, that is, in the case where the state 356c indicates "allocated" (YES in step S83), it means that the data of the snapshot volume (i.e., unnecessary data) is stored in the SSD 400. Therefore, the RAID controller 301 acquires the pool number, the logical VOL number, and the logical address from the record, specifies a corresponding record from the pool management table 351 by using the pool number, the logical VOL number and the logical address, and transmits the unnecessary reduction request to the flash memory package 10 of the SSD 400 corresponding to the physical VOL number of the specified record (step S84). The unnecessary reduction request is, for example, a write request for writing the fixed-pattern data or an unmap request. The write request for writing the fixed-pattern data may be a write request that includes the fixed-pattern data of the write data size, or a write request that includes the partial data equivalent to the size of one page in the fixed-pattern data and the size information indicating the size of the fixed-pattern data. Note that the FM controller 20 of the flash memory package 10 that receives the unnecessary reduction request executes any of the processes shown in FIGS. 40 to 44, as will be described hereinafter, and the amount of unnecessary data in the flash memory package is reduced.

Subsequently, the RAID controller 301 deletes the record specified in step S83 from the snapshot data allocation table 356, changes the state 351g of the specified record to "blank" in the page management table 351 (step S85), advances the process to step S83, and repeatedly executes the similar process on other regions of the snapshot volume.

The snapshot deletion process described above can reduce the amount of data (unnecessary data) of the snapshot volume that is subjected to deletion of snapshots stored in the SSD 400.

Next, examples of the processes performed by the FM controller 20 receiving the unnecessary reduction request are described in detail with reference to FIGS. 40 to 44.

Figure 40:
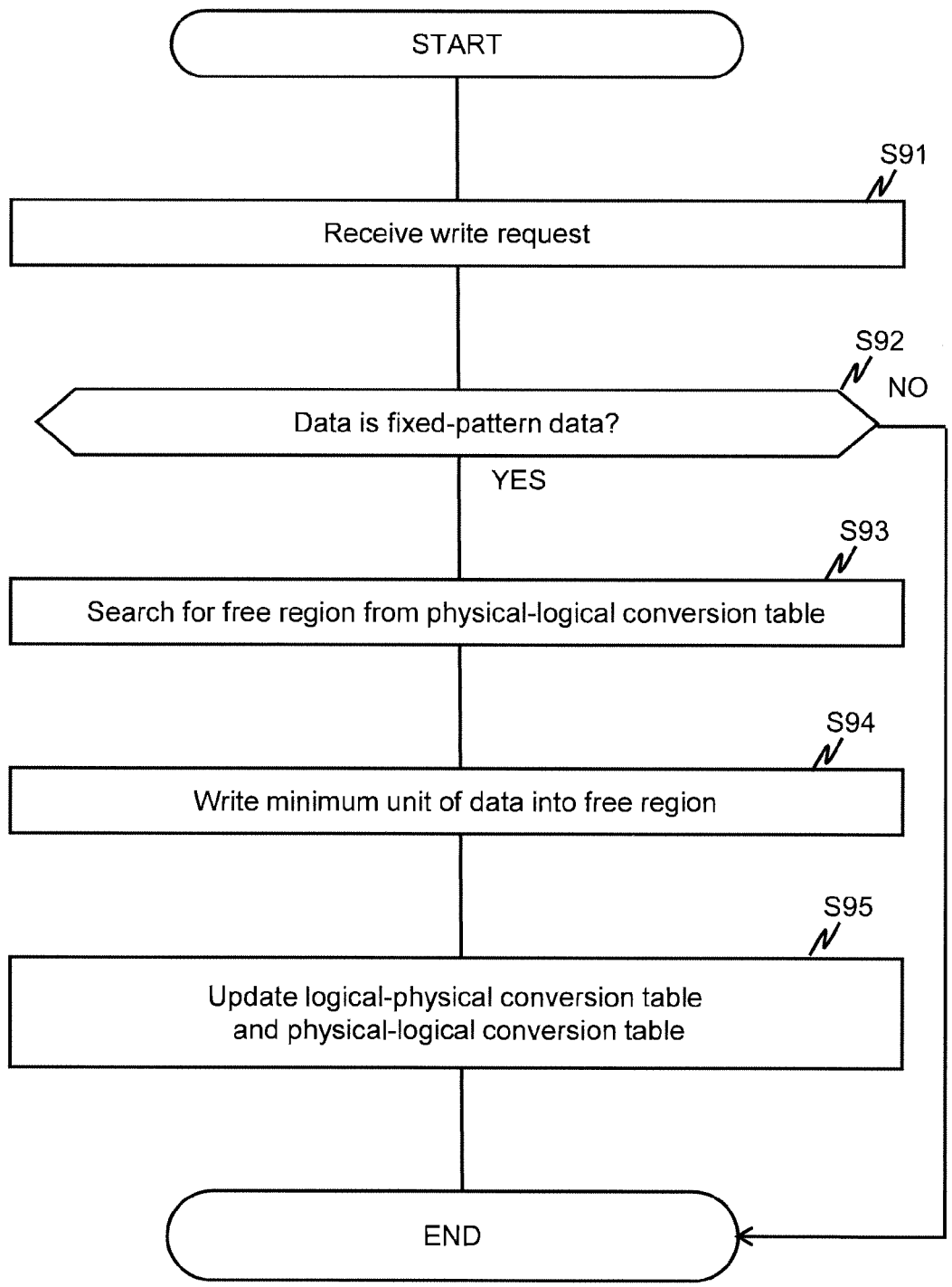
FIG. 40 shows an example of a flowchart of the first example of the fixed-pattern data write process according to the embodiment.

FIG. 40 shows an example of a flowchart of the first example of the fixed-pattern data write process according to the embodiment.

The first example of the fixed-pattern data write process is the fixed-pattern data write process shown in FIG. 15.

Suppose, in this example, that the RAID controller 301 transmits a write request for writing the fixed-pattern data 1051 of the size of write data (e.g., 24 KB) into a region of a logical volume.

Upon reception of the write request transmitted by the RAID controller 301 (step S91), the FM controller 20 of the flash memory package 10 of the SSD 400 determines whether data (the write data) requested to be written is the fixed-pattern data or not (step S92).

In the case where the write data is not the fixed-pattern data (NO in step S92), the FM controller 20 ends the fixed-pattern data write process. Note that a normal data write process is executed on this data.

On the other hand, in the case where the write data is the fixed-pattern data (YES in step S92), the FM controller 20 refers to the physical-logical conversion table 111 to search for a blank page (step S93), and writes data equivalent to the size of one page of the fixed-pattern data to the obtained blank page (write-destination shared page) (step S94). The FM controller 20 then updates the logical-physical conversion table 110 and the physical-logical conversion table 111 (step S95).

More specifically, the FM controller 20 invalidates the state 111d for the records corresponding to a plurality of pages (e.g., three pages) associated with the logical address belonging to the write-target logical region in the physical-logical conversion table 111. As a result, the plurality of pages allocated to the write-target logical region are managed as invalid pages. Thus, that data of the pages are prevented from being copied to other pages upon reclamation or refreshing, and the pages can be used as blank pages after a subsequent block erase process. In the case where all pages of the block including the pages are invalid, then the block is erased and all of the pages of the block may be changed to blank pages. In this manner, the free capacity can be increased rapidly.

Furthermore, the FM controller 20 sets the state 111d of each of the plurality of (three, in this example) records corresponding to the write-destination shared page in the physical-logical conversion table 111 to "valid," and sets a logical address for each of partial regions that are obtained by dividing the write-target logical region according to the page size, for the logical address 111e of each of the records. Consequently, the partial regions obtained by dividing the write-target logical region according to the page size are allocated to one page (write destination shared page) and managed.

The FM controller 20 also sets the FM number 110c, the block number 110d and the page number 110f for the plurality of (three, in this example) records corresponding to the logical address indicating the write-target logical region in the logical-physical conversion table 110, at values corresponding to the write-destination shared page. As a result, the data stored in the write-target logical region can be acquired from one page (the write-destination shared page). This can be realized based on the characteristics that the plurality of partial data equivalent to the page size in the fixed-pattern data are the same.

Subsequent to step S95, the FM controller 20 ends the process.

Figure 41:
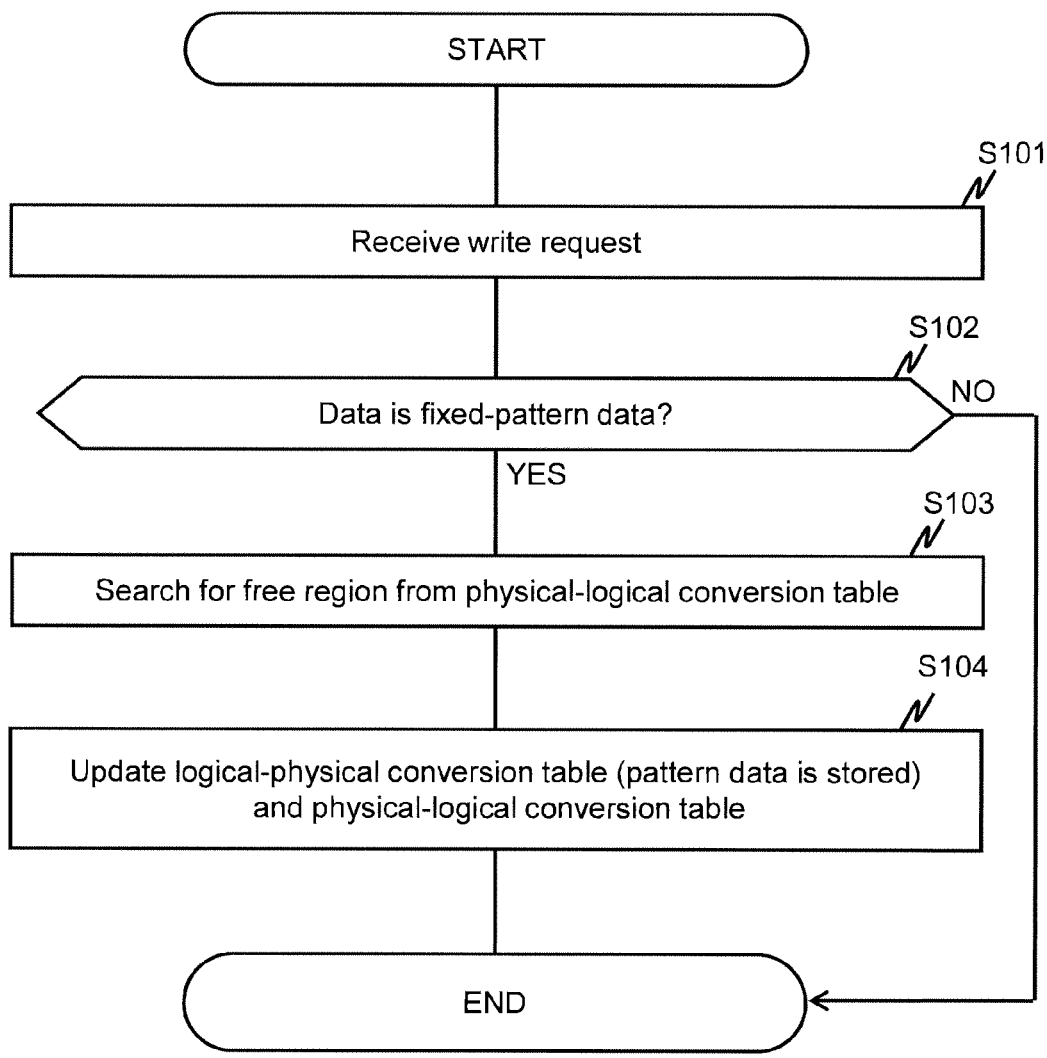
FIG. 41 shows an example of a flowchart of the second example of the fixed-pattern data write process according to the embodiment.

FIG. 41 shows an example of a flowchart of the second example of the fixed-pattern data write process according to the embodiment.

The second example of the fixed-pattern data write process is the fixed-pattern data write process shown in FIG. 16.

Suppose, in this example, that the RAID controller 301 transmits a write request for writing the fixed-pattern data 1051 of the size of write data (e.g., 24 KB) into a region of a logical volume.

Upon reception of the write request transmitted by the RAID controller 301 (step S101), the FM controller 20 of the flash memory package 10 of the SSD 400 determines whether data (the write data) requested to be written is the fixed-pattern data or not (step S102).

In the case where the write data is not the fixed-pattern data (NO in step S102), the FM controller 20 ends the fixed-pattern data write process. Note that a normal data write process is executed on this data.

On the other hand, in the case where the write data is the fixed-pattern data (YES in step S102), the FM controller 20 refers to the physical-logical conversion table 111 to search for a blank page and acquires the blank page (the write-destination shared page) (step S103). The FM controller 20 then updates the logical-physical conversion table 110 and the physical-logical conversion table 111 (step S104).

More specifically, the FM controller 20 invalidates the state 111d for the records corresponding to a plurality of pages (e.g., three pages) associated with the logical address belonging to the write-target logical region in the physical-logical conversion table 111. As a result, the plurality of pages allocated to the write-target logical region are managed as invalid pages. Thus, that data of the pages are prevented from being copied to other pages upon reclamation or refreshing, and the pages can be used as blank pages after a subsequent block erase process. In the case where all pages of the block including the pages are invalid, then the block is erased and all of the pages of the block may be changed to blank pages. In this manner, the free capacity can be increased rapidly.

Furthermore, the FM controller 20 sets the state 111d of each of the plurality of (three, in this example) records corresponding to the write-destination shared page in the physical-logical conversion table 111 to "valid," and sets a logical address for each of partial regions that are obtained by dividing the write-target logical region according to the page size, for the logical address 111e of each of the records. Consequently, the partial regions obtained by dividing the write-target logical region according to the page size are allocated to one page (write destination shared page) and managed.

The FM controller 20 also sets the FM number 110c, the block number 110d and the page number 110f for the plurality of (three, in this example) records corresponding to the logical address indicating the write-target logical region in the logical-physical conversion table 110, at values corresponding to the write-destination shared page, and stores pattern data ("0," in this example) for specifying the fixed-pattern data, in the data pattern 110f. As a result, the data stored in the write-target logical region can be associated with one page (the write-destination shared page). This can be realized based on the characteristics that the plurality of partial data equivalent to the page size in the fixed-pattern data are the same. In the case where a read request for reading the data of the corresponding logical region is received, one page of the fixed-pattern data is created based on the pattern data stored in the data pattern 110f of one record, and the entire fixed-pattern data is created based on a plurality of records.

Subsequent to step S104, the FM controller 20 ends the process.

Figure 42:
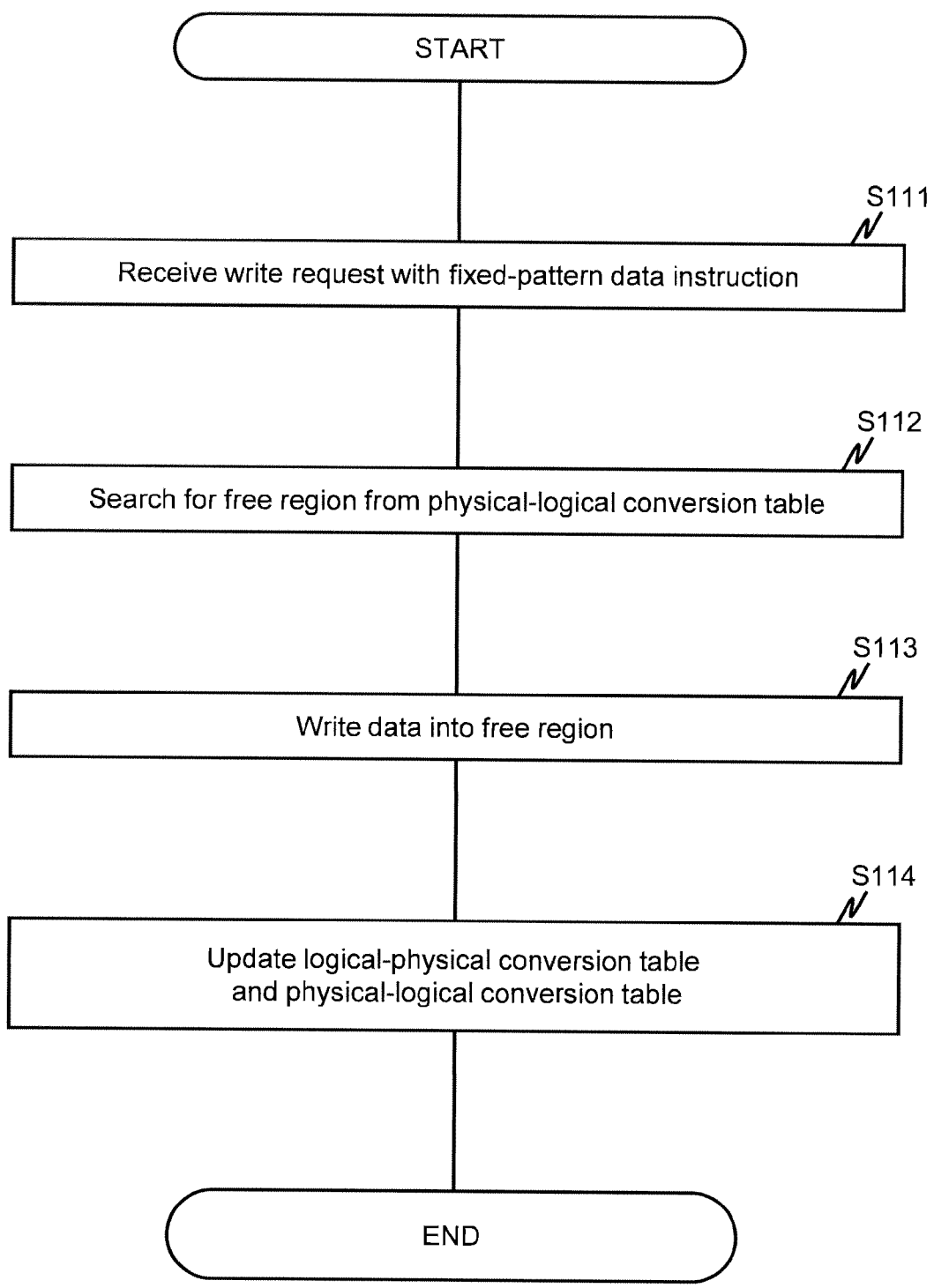
FIG. 42 shows an example of a flowchart of the third example of the fixed-pattern data write process according to the embodiment.

FIG. 42 shows an example of a flowchart of the third example of the fixed-pattern data write process according to the embodiment.

The third example of the fixed-pattern data write process is the fixed-pattern data write process shown in FIG. 17.

Suppose, in this example, that the RAID controller 301 transmits a write request that includes the partial data of page size obtained by dividing the fixed-pattern data 1051 and the size information indicating the total size of the fixed-pattern data 1051, as a request for writing the fixed-pattern data 1051 of the size of the write data (e.g., KB) into the region of the logical volume (the write request with fixed-pattern data instruction). Therefore, the amount of data transmitted from the RAID controller 301 to the SSD 400 can be reduced.

Upon reception of the write request with fixed-pattern data instruction transmitted by the RAID controller 301 (step S111), the FM controller 20 of the flash memory package 10 of the SSD 400 refers to the physical-logical conversion table 111 to search for a blank page (step S112), and writes data equivalent to the size of one page of the fixed-pattern data to the obtained blank page (write-destination shared page) (step S113). The FM controller 20 then updates the logical-physical conversion table 110 and the physical-logical conversion table 111 (step S114).

More specifically, the FM controller 20 specifies the write-target logical region based on the size information included in the write request, and invalidates the state 111d for the records corresponding to a plurality of pages (e.g., three pages, in this example) associated with the logical address belonging to the write-target logical region in the physical-logical conversion table 111. As a result, the plurality of pages allocated to the write-target logical region are managed as invalid pages. Thus, the data of the pages are prevented from being copied to other pages upon reclamation or refreshing, and the pages can be used as blank pages after a subsequent block erase process. In the case where all pages of the block including the pages are invalid, then the block is erased and all of the pages of the block may be changed to blank pages. In this manner, the free capacity can be increased rapidly.

Furthermore, the FM controller 20 sets the state 111d of each of the plurality of (three, in this example) records corresponding to the write-destination shared page in the physical-logical conversion table 111 to "valid," and sets a logical address for each of pages that are obtained by dividing the write-target logical region according to the page size, for the logical address 111e of each of the records. Consequently, the partial regions obtained by dividing the write-target logical region according to the page size are allocated to one page (write destination shared page) and managed.

The FM controller 20 also sets the FM number 110c, the block number 110d and the page number 110f for the plurality of (three, in this example) records corresponding to the logical address indicating the write-target logical region in the logical-physical conversion table 110, at values corresponding to the write-destination shared page. As a result, the data stored in the write-target logical region can be acquired from one page (the write-destination shared page). This can be realized based on the characteristics that the plurality of partial data equivalent to the page size in the fixed-pattern data are the same.

Figure 43:
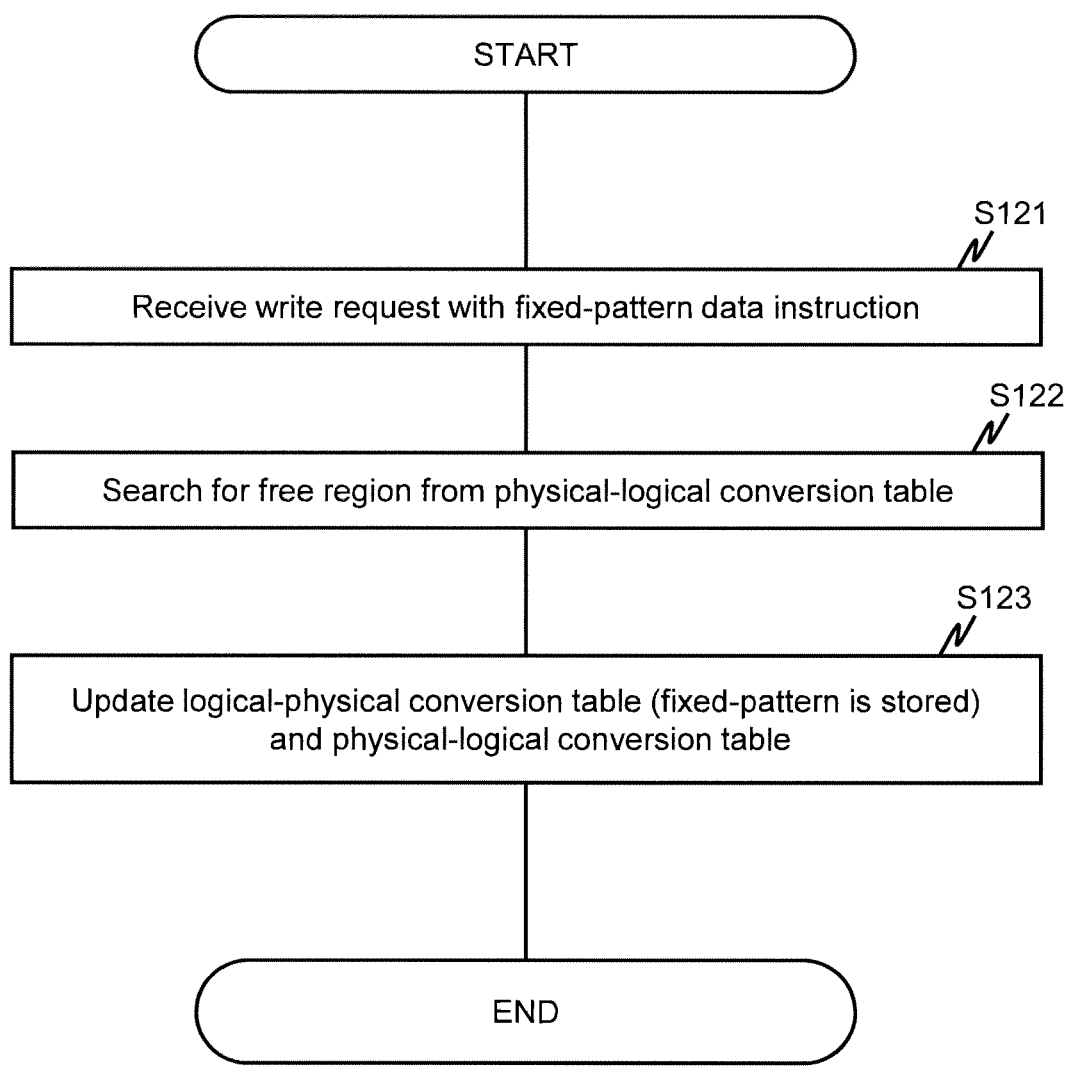
FIG. 43 shows an example of a flowchart of the fourth example of the fixed-pattern data write process according to the embodiment.

FIG. 43 shows an example of a flowchart of the fourth example of the fixed-pattern data write process according to the embodiment.

The fourth example of the fixed-pattern data write process is the fixed-pattern data write process shown in FIG. 18.

Suppose, in this example, that the RAID controller 301 transmits a write request that includes the partial data of page size obtained by dividing the fixed-pattern data 1051 and the size information indicating the size of the fixed-pattern data 1051, as a request for writing the fixed-pattern data 1051 of the size of the write data (e.g., 24 KB) into the region of the logical volume (the write request with fixed-pattern data instruction). Therefore, the amount of data transmitted from the RAID controller 301 to the SSD 400 can be reduced.

Upon reception of the write request with fixed-pattern data instruction transmitted by the RAID controller 301 (step S121), the FM controller 20 of the flash memory package 10 of the SSD 400 refers to the physical-logical conversion table 111 to search for a blank page, and acquires the blank page (the write-destination shared page) (step S122). The FM controller 20 then updates the logical-physical conversion table 110 and the physical-logical conversion table 111 (step S123).

More specifically, the FM controller 20 specifies the write-target logical region based on the size information included in the write request, and invalidates the state 111d for the records corresponding to a plurality of pages (e.g., three pages, in this example) associated with the logical address belonging to the write-target logical region in the physical-logical conversion table 111. As a result, the plurality of pages allocated to the write-target logical region are managed as invalid pages. Thus, the data of the pages are prevented from being copied to other pages upon reclamation or refreshing, and the pages can be used as blank pages after a subsequent block erase process. In the case where all pages of the block including the pages are invalid, then the block is erased and all of the pages of the block may be changed to blank pages. In this manner, the free capacity can be increased rapidly.

Furthermore, the FM controller 20 sets the state 111d of each of the plurality of (three, in this example) records corresponding to the write-destination shared page in the physical-logical conversion table 111 to "valid," and sets a logical address for each of the plurality of partial regions that are obtained by dividing the write-target logical region according to the page size, for the logical address 111e of each of the records. Consequently, the plurality of partial regions obtained by dividing the write-target logical region according to the page size are allocated to one page (write destination shared page) and managed.

The FM controller 20 also sets the FM number 110c, the block number 110d and the page number 110f for the plurality of (three, in this example) records corresponding to the logical address indicating the write-target logical region in the logical-physical conversion table 110, at values corresponding to the write-destination shared page, and stores pattern data ("0," in this example) for specifying the fixed-pattern data, in the data pattern 110f. As a result, the data stored in the write-target logical region can be associated with one page (the write-destination shared page). This can be realized based on the characteristics that the plurality of partial data equivalent to the page size in the fixed-pattern data are the same. In the case where a read request for reading the data of the corresponding logical region is received, one page of the fixed-pattern data is created based on the pattern data stored in the data pattern 110f of one record, and the entire fixed-pattern data is created based on a plurality of records.

Figure 44:
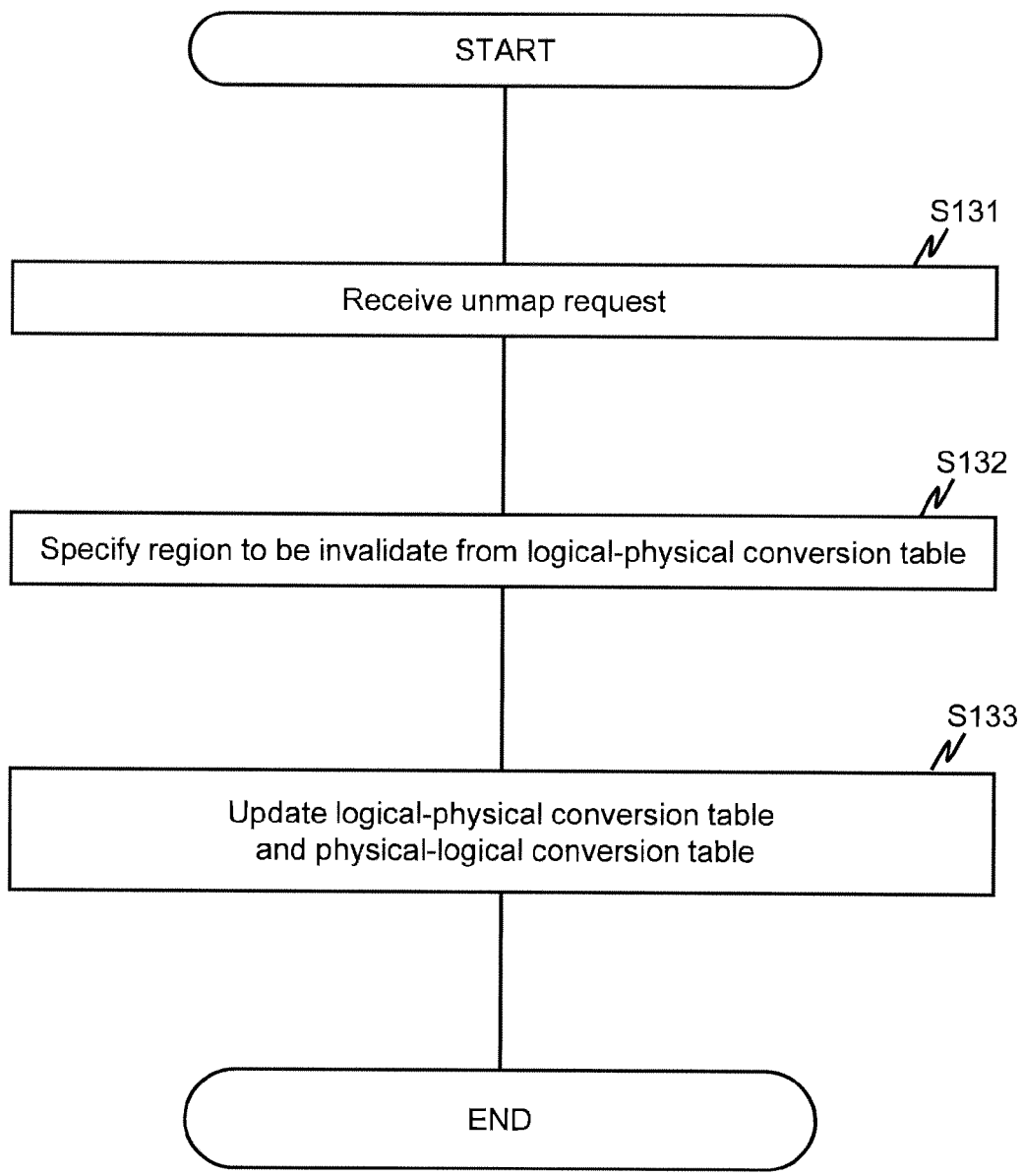
FIG. 44 shows an example of a flowchart of an unmap request process according to the embodiment.

FIG. 44 shows an example of a flowchart of the unmap request process according to the embodiment.

Upon reception of an unmap request transmitted by the RAID controller 301 (S131), the FM controller 20 of the flash memory package 10 of the SSD 400 specifies a range of storage regions of a corresponding logical address (invalidation region) based on the values of the logical address 1902 and the data length 1903 of the unmap request 1901 (step S132), and updates the logical-physical conversion table 110 and the physical-logical conversion table 111 (step S133).

More specifically, the FM controller 20 sets the state 111d for the plurality of records associated with the logical addresses indicating the regions belonging to the invalidation range in the physical-logical conversion table 111, to "invalid." As a result, the plurality of pages belonging to the invalidation region are managed as invalid pages. Thus, that data of the pages are prevented from being copied to other pages upon reclamation or refreshing, and the pages can be used as blank pages after a subsequent block erase process.

The FM controller 20 further sets the state 111d for the records corresponding to the logical addresses indicating the regions belonging to the invalidation range in the logical-physical conversion table 110, to "invalid." Thus, the logical addresses of the regions belonging to the invalidation range are managed as the addresses to which no pages are allocated.

This unmap request process can set the pages in which the unnecessary data are stored as invalid pages, and use these pages as blank pages after the subsequent block erase process.

The above has described an embodiment, the present invention is not limited thereto, and various changes can be made without departing from the scope of the present invention.

For instance, in the embodiment described above, the NAND-type flash memory is adopted as an example of a nonvolatile semiconductor memory, but the nonvolatile semiconductor memory is not limited thereto. For example, the nonvolatile semiconductor memory may be a phase-change memory.

Furthermore, the embodiment has described the inter-tier dynamic migration and the snapshot deletion process as the examples where unnecessary data is generated in the SSD 400. However, in addition to this embodiment, the present invention can be applied to any situation where unnecessary data is generated.

In addition, in place of the example where the RAID controller 301 transmits the fixed-pattern data or the partial data to the flash memory package 10, a logical address of a write-destination region to which the fixed-pattern data is written may be sent, and the FM controller 20 may create the fixed-pattern data or the partial data and write the created data into a physical region that is allocated to a region designated by the sent logical address.

REFERENCE SIGNS LIST

1 Storage system
10 Flash memory PKG
400 SSD

The invention claimed is:

1. A storage system coupled to a host, comprising:
a nonvolatile semiconductor storage device, which includes a nonvolatile semiconductor memory configured by a plurality of pages, a storage medium storing page management information indicating a state of each page, and a memory controller coupled to the nonvolatile semiconductor memory and the storage medium; and
a storage controller, which is coupled to the nonvolatile semiconductor storage device and is configured to control access to a logical volume that is based on the nonvolatile semiconductor memory, wherein
the state of each page includes valid, which means that the page is allocated to a region of the logical volume and has data stored therein, and invalid, which means that the page is not allocated to the region of the logical volume but has data stored therein, wherein
the storage system is configured to manage a plurality of snapshot volumes which are respectively paired with a primary volume, wherein each snapshot volume is a virtual logical volume, and wherein
the storage controller is configured to send, in a case where one of the plurality of snapshot volumes is deleted, unnecessary reduction requests to the semiconductor storage device, wherein each unnecessary reduction request is a write request for writing fixed-pattern data or an unmap request, and wherein
in a case where the data stored in the plurality of pages become unnecessary to the host, with these plurality of pages being a basis of a region of the logical volume, (A) and (B) described hereinafter are performed:
(A) the storage controller is configured to transmit an unnecessary reduction request for reducing a number of pages that are the basis of the region having the unnecessary data stored therein; and
(B) the memory controller is configured to invalidate the plurality of pages that are the basis of the region having the unnecessary data stored therein, based on the unnecessary reduction request, with regard to the page management information, and store partial data of a fixed-pattern data into a single page of the plurality of pages, wherein fixed-pattern data size is that of write data and partial data size is that of one page.

2. A storage system according to claim 1, wherein
the page management information stores correspondence relationship between each of the plurality of pages and the region of the logical volume to which the plurality of pages are allocated,
in (A) described above, the storage controller is configured to transmit, as the unnecessary reduction request, a write request for writing fixed-pattern data into the region of the logical volume to which are allocated the plurality of pages in which the unnecessary data are stored,
the fixed-pattern data has a plurality of partial data of a common pattern, a size of the partial data being equivalent to a size of the page, and wherein in (B) described above, the memory controller is configured to:
(b1) specify a plurality of pages that are associated with the region of the logical volume indicated by the write request;
(b2) invalidate a plurality of specified pages with regard to the page management information;
(b3) write the partial data of the fixed-pattern data into one page different from the plurality of pages; and
(b4) associate a plurality of regions in units of page size in the region of the logical volume with the one page into which the partial data are written, with regard to the page management information.

3. A storage system according to claim 2, further comprising one or more other storage devices different from the nonvolatile semiconductor storage device, wherein
in a case where regions of the other storage devices are allocated to the region of the logical volume to which one or more of the pages of the nonvolatile semiconductor storage device are allocated, the storage system, in (A) described above, is configured to transmit the unnecessary reduction request to a nonvolatile storage device that has a plurality of pages which are the basis of the region of the logical volume.

4. A storage system according to claim 2, wherein
upon reception of a request for deleting the snapshot volume, the storage controller is configured to perform (A) described above on the nonvolatile storage device that has a page which is allocated to the snapshot volume and is the basis of the region of the logical volume.

5. A storage system according to claim 2, wherein
the write request for writing the fixed-pattern data into the region of the logical volume to which are allocated the plurality of pages in which the unnecessary data are stored, includes the partial data of the fixed-pattern data that has the plurality of partial data of a common pattern, and size information with which the size of the fixed-pattern data can be specified,
a size of each partial data is equivalent to the size of the page, and wherein
in (B) described above, the memory controller is configured to specify a range of regions of the logical volume indicated by the write request and specify a plurality of pages associated with the specified range of regions of the logical volume, on a basis of the size information.

6. A storage system according to claim 1, wherein
the page management information stores correspondence relationship between each of the plurality of pages and the region of the logical volume to which the plurality of pages are allocated,
in (A) described above, the storage controller is configured to transmit, as the unnecessary reduction request, a write request for writing fixed-pattern data having a plurality of partial data of a common pattern into the region of the logical volume to which are allocated the plurality of pages in which the unnecessary data are stored,
a size of each partial data is equivalent to a size of the page, and wherein
in (B) described above, the memory controller is configured to:
(b1) specify a plurality of pages that are indicated by the write request and associated with the region of the logical volume;
(b2) invalidate a plurality of specified pages with regard to the page management information; and
(b3) associate a plurality of regions in units of page size in the region of the logical volume with one page different from the plurality of pages, and associates a data pattern, with which the fixed-pattern data can be specified, with the one page.

7. A storage system according to claim 6, further comprising one or more other storage devices different from the nonvolatile semiconductor storage device, wherein
in a case where regions of the other storage devices are allocated to the region of the logical volume to which one or more of the pages of the nonvolatile semiconductor storage device are allocated, the storage system, in (A) described above, is configured to transmit the unnecessary reduction request to a nonvolatile storage device that has a plurality of pages which are the basis of the region of the logical volume.

8. A storage system according to claim 6, wherein
upon reception of a request for deleting the snapshot volume, the storage controller is configured to perform (A) described above on the nonvolatile storage device that has a page which is allocated to the snapshot volume and is the basis of the region of the logical volume.

9. A storage system according to claim 6, wherein
the write request for writing the fixed-pattern data into the region of the logical volume to which are allocated the plurality of pages in which the unnecessary data are stored, includes the partial data of the fixed-pattern data that has the plurality of partial data of a common pattern, and size information with which the size of the fixed-pattern data can be specified, wherein
a size of each partial data is equivalent to the size of the page, and wherein
in (B) described above, the memory controller is configured to specify a range of regions of the logical volume indicated by the write request and specify a plurality of pages associated with the specified range of regions of the logical volume, on a basis of the size information.

10. A storage system according to claim 1, wherein
the page management information stores correspondence relationship between each of the plurality of pages and the region of the logical volume to which the plurality of pages are allocated,
in (A) described above, the storage controller s configured to transmit, as the unnecessary reduction request, an unmap request which includes range information indicating a range of regions of the logical volume to which are allocated the plurality of pages in which the unnecessary data are stored, and wherein
in (B) described above, the memory controller is configured to specify a plurality of pages belonging to the range of regions indicated by the range information and invalidate a plurality of specified pages with respect to the page management information, based on the range information included in the unmap request and the page management information.

11. A storage system according to claim 10, further comprising one or more other storage devices different from the nonvolatile semiconductor storage device, wherein
in a case where regions of the other storage devices are allocated to the region of the logical volume to which one or more of the pages of the nonvolatile semiconductor storage device are allocated, the storage system, in (A) described above, is configured to transmit the unnecessary reduction request to a nonvolatile storage device that has a plurality of pages which are the basis of the region of the logical volume.

12. A storage system according to claim 10, wherein
upon reception of a request for deleting the snapshot volume, the storage controller is configured to perform (A) described above on the nonvolatile storage device that has a page which is allocated to the snapshot volume and is the basis of the region of the logical volume.

13. A storage system according to claim 1, further comprising one or more other storage devices different from the nonvolatile semiconductor storage device, wherein
in a case where regions of the other storage devices are allocated to the region of the logical volume to which one or more of the pages of the nonvolatile semiconductor storage device are allocated, the storage system, in (A) described above, is configured to transmit the unnecessary reduction request to a nonvolatile storage device that has a plurality of pages which are the basis of the region of the logical volume.

14. A storage system according to claim 1, wherein
upon reception of a request for deleting the snapshot volume, the storage controller is configured to perform (A) described above on the nonvolatile storage device that has a page which is allocated to the snapshot volume and is the basis of the region of the logical volume.

15. A storage control method of a storage system coupled to a host,
in a case where a snapshot volume has been deleted or data stored in a plurality of pages become unnecessary to the host, with the plurality of pages being the basis of a region of a logical volume based on a nonvolatile semiconductor storage device that includes a nonvolatile semiconductor memory configured by a plurality of pages,
the method comprising: transmitting, to the nonvolatile semiconductor storage device via a storage controller, an unnecessary reduction request for reducing a number of pages that are a basis of the region having an unnecessary data stored therein; and
invalidating, based on the unnecessary reduction request from the storage controller to the nonvolatile semiconductor storage device, the plurality of pages that are the basis of the region having the unnecessary data stored therein, and storing partial data of a fixed-pattern data into a single page of the plurality of pages, wherein fixed-pattern data size is that of write data and partial data size is that of one page.

* * * * *